US 8,139,250 B2

(12) United States Patent
Honda et al.

(10) Patent No.: US 8,139,250 B2
(45) Date of Patent: Mar. 20, 2012

(54) IMAGE PROCESSING APPARATUS AND IMAGE PROCESSING METHOD FOR PRINTING AN ACQUIRED IMAGE

(75) Inventors: Tadashi Honda, Kanagawa (JP); Naoki Kozuka, Kanagawa (JP); Hirofumi Horikawa, Kanagawa (JP); Yuuta Hamada, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 999 days.

(21) Appl. No.: 12/031,109

(22) Filed: Feb. 14, 2008

(65) Prior Publication Data

US 2008/0192291 A1  Aug. 14, 2008

(30) Foreign Application Priority Data

Feb. 14, 2007 (JP) ................................ 2007-033817

(51) Int. Cl.
  *G06F 3/12* (2006.01)
(52) U.S. Cl. ...... 358/1.15; 358/1.14; 358/403; 358/468; 709/203; 709/217; 709/218; 709/219; 709/228; 707/999.002; 707/999.104
(58) Field of Classification Search ............... 358/1.15, 358/1.14, 1.13, 1.18, 1.1, 1.2, 403, 468; 709/203, 709/217, 218, 219, 223; 707/999.102, 999.104
See application file for complete search history.

(56) References Cited

U.S. PATENT DOCUMENTS

| 6,118,468 | A | 9/2000 | Ando et al. |
| 6,634,559 | B2 | 10/2003 | Shioda et al. |
| 6,866,404 | B2 | 3/2005 | Yamauchi et al. |
| 6,948,654 | B2 | 9/2005 | Shioda et al. |
| 7,077,546 | B2 | 7/2006 | Yamauchi et al. |
| 7,215,815 | B2 | 5/2007 | Honda |
| 7,225,227 | B2 | 5/2007 | Omura et al. |
| 2001/0029513 | A1 | 10/2001 | Kuwano et al. |
| 2002/0176107 | A1 | 11/2002 | Manico et al. |
| 2003/0110242 | A1* | 6/2003 | Brown et al. ............ 709/222 |
| 2003/0225894 | A1* | 12/2003 | Ito ............................. 709/227 |
| 2004/0174556 | A1* | 9/2004 | Lapstun et al. ........... 358/1.14 |
| 2005/0219616 | A1 | 10/2005 | Furuta et al. |
| 2007/0067370 | A1 | 3/2007 | Honda et al. |

(Continued)

FOREIGN PATENT DOCUMENTS

EP  0 858 042 A2  8/1998

(Continued)

OTHER PUBLICATIONS

U.S. Appl. No. 12/031,257, filed Feb. 14, 2008, Honda, et al.

(Continued)

*Primary Examiner* — Benny Tieu
*Assistant Examiner* — Paul F Payer
(74) *Attorney, Agent, or Firm* — Oblon, Spivak, McClelland, Maier & Neustadt, L.L.P.

(57) ABSTRACT

In a copying operation, an MFP reads a code image printed on the paper, acquires a paper ID from the code image, acquires paper information associated with the paper ID, specifies an electronic document as a print source, and acquires the specified electronic document. The MFP prints a paper ID on the paper with the code image and the acquired electronic document, and stores paper information including a paper ID of a copy source in association with the paper ID. When a first MFP leaves an image processing system, respective information concerning electronic document acquisition managed by the first MFP is transferred to a second MFP.

20 Claims, 44 Drawing Sheets

U.S. PATENT DOCUMENTS

2007/0198638 A1  8/2007  Omura et al.
2007/0239690 A1* 10/2007  Matsuda ........................... 707/3

FOREIGN PATENT DOCUMENTS

| | | |
|---|---|---|
| JP | 2005-11226 | 1/2005 |
| JP | 2005-151127 | 6/2005 |
| JP | 2007-87322 | 4/2007 |
| JP | 2007-102545 | 4/2007 |

OTHER PUBLICATIONS

J. P. Louvet, "Internet: attaques multiples de serveurs DNS par cache poisoning", Future-Sciences, http://www.futura-sciences.com/fr/sinformer/actualites/news/t/internet/d/internet-attaques-multiples-de-serveurs-dns-par-cache-poisoning_5712/>, XP 002478058, Mar. 8, 2005, 1 Page.

* cited by examiner

FIG. 5

| NAME | EXPLA-NATION | NAME SPACE | VER-SION | URI | UUID OF SERVICE | LOCAL ID | MASTER UUID | ROOT ID | GENE-RATION | REGIS-TRATION DATE AND TIME | UPDATE DATE AND TIME |
|---|---|---|---|---|---|---|---|---|---|---|---|
| SRMS 200_4 | EXPLA-NATION | jp.co.xxxxx.srms | 1.00 | http://192.168.1.14/srms/ | S004 | 1 | S004 | S004 | 0 | 2006/8/4 9:00 | 2006/8/4 9:00 |
| PIDS 201_4 | EXPLA-NATION | jp.co.xxxxx.pids | 1.10 | http://192.168.1.14/pids/ | P004 | 2 | S004 | P004 | 0 | 2006/8/4 9:00 | 2006/8/4 9:00 |
| EIDS 202_4 | EXPLA-NATION | jp.co.xxxxx.eids | 1.20 | http://192.168.1.14/eids/ | E004 | 3 | S004 | E004 | 0 | 2006/8/4 9:00 | 2006/8/4 9:00 |
| SRMS 200_2 | EXPLA-NATION | jp.co.xxxxx.srms | 2.00 | http://192.168.0.12/srms/ | S002 | 1 | S002 | S002 | 0 | 2006/8/2 9:00 | 2006/8/2 9:00 |
| PIDS 201_2 | EXPLA-NATION | jp.co.xxxxx.pids | 2.10 | http://192.168.0.12/pids/ | P002 | 2 | S002 | P002 | 0 | 2006/8/2 9:00 | 2006/8/2 9:00 |
| EIDS 202_2 | EXPLA-NATION | jp.co.xxxxx.eids | 2.20 | http://192.168.0.12/eids/ | E002 | 3 | S002 | E002 | 0 | 2006/8/2 9:00 | 2006/8/2 9:00 |
| SRMS 200_5 | EXPLA-NATION | jp.co.xxxxx.srms | 3.00 | http://192.168.1.15/srms/ | S005 | 1 | S005 | S005 | 0 | 2006/8/5 9:00 | 2006/8/5 9:00 |
| PIDS 201_5 | EXPLA-NATION | jp.co.xxxxx.pids | 3.10 | http://192.168.1.15/pids/ | P005 | 2 | S005 | P005 | 0 | 2006/8/5 9:00 | 2006/8/5 9:00 |
| EIDS 202_5 | EXPLA-NATION | jp.co.xxxxx.eids | 3.20 | http://192.168.1.15/eids/ | E005 | 3 | S005 | E005 | 0 | 2006/8/5 9:00 | 2006/8/5 9:00 |

| UUID |
|---|
| S002 |
| S007 |

INTERFACE SECTION (PI1)

| PAPER REGISTRATION | PAPER CHANGE | PAPER DELETION | PAPER ACQUISITION | PAPER MERGE |
|---|---|---|---|---|

PROCESSING FUNCTION SECTION (PI2)

| PAPER-REGISTRATION PROCESSING SECTION (PI20) | PAPER-CHANGE PROCESSING SECTION (PI21) | PAPER-DELETION PROCESSING SECTION (PI22) | PAPER-ACQUISITION PROCESSING SECTION (PI23) | PAPER-MERGE PROCESSING SECTION (PI24) |
|---|---|---|---|---|

201

PAPER-INFORMATION DB (301)

PAPER-INFORMATION TABLE (301A)

FIG. 8

| NAME | EXPLA-NATION | UUID OF PIDS | LOCAL ID | REGISTRATION DATE AND TIME | UPDATE DATE AND TIME | LINK TO ORIGINAL DOCUMENT | PRINT CONDITION |
|---|---|---|---|---|---|---|---|
|  |  |  |  |  |  |  |  |
|  |  |  |  |  |  |  |  |
|  |  |  |  |  |  |  |  |
|  |  |  |  |  |  |  |  |

301A

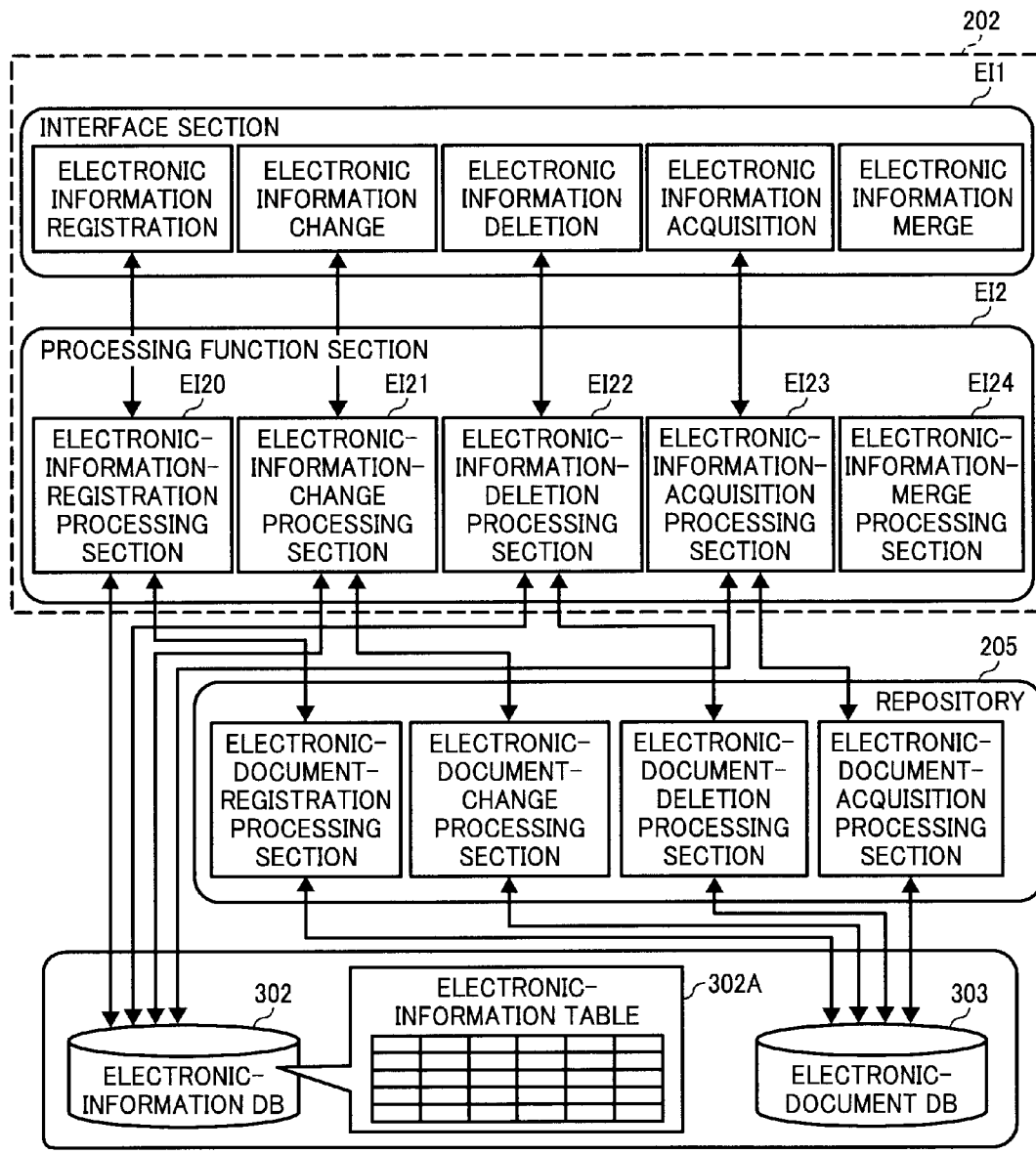

FIG. 18

| NAME | EXPLA-NATION | NAME SPACE | VERSION | URI | UUID OF SERVICE | LOCAL ID | MASTER UUID | REGISTRATION DATE AND TIME | UPDATE DATE AND TIME |
|---|---|---|---|---|---|---|---|---|---|
| SRMS 200_3 | EXPLA-NATION | jp.co.xxxxx.srms | 1.00 | http://192.168.0.13/srms/ | S003 | 1 | S003 | 2006/8/3 9:00 | 2006/8/3 9:00 |
| PIDS 201_3 | EXPLA-NATION | jp.co.xxxxx.pids | 1.10 | http://192.168.0.13/pids/ | P003 | 2 | S003 | 2006/8/3 9:00 | 2006/8/3 9:00 |
| EIDS 202_3 | EXPLA-NATION | jp.co.xxxxx.eids | 1.20 | http://192.168.0.13/eids/ | E003 | 3 | S003 | 2006/8/3 9:00 | 2006/8/3 9:00 |
| SRMS 200_2 | EXPLA-NATION | jp.co.xxxxx.srms | 2.00 | http://192.168.0.12/srms/ | S002 | 1 | S002 | 2006/8/4 9:00 | 2006/8/4 9:00 |
| PIDS 201_2 | EXPLA-NATION | jp.co.xxxxx.pids | 2.10 | http://192.168.0.12/pids/ | P002 | 2 | S002 | 2006/8/4 9:00 | 2006/8/4 9:00 |
| EIDS 202_2 | EXPLA-NATION | jp.co.xxxxx.eids | 2.20 | http://192.168.0.12/eids/ | E002 | 3 | S002 | 2006/8/4 9:00 | 2006/8/4 9:00 |
| SRMS 200_7 | EXPLA-NATION | jp.co.xxxxx.srms | 3.00 | http://192.168.2.17/srms/ | S007 | 1 | S007 | 2006/8/7 9:00 | 2006/8/7 9:00 |
| PIDS 201_7 | EXPLA-NATION | jp.co.xxxxx.pids | 3.10 | http://192.168.2.17/pids/ | P007 | 2 | S007 | 2006/8/7 9:00 | 2006/8/7 9:00 |
| EIDS 202_7 | EXPLA-NATION | jp.co.xxxxx.eids | 3.20 | http://192.168.2.17/eids/ | E007 | 3 | S007 | 2006/8/7 9:00 | 2006/8/7 9:00 |

| NAME | EXPLA-NATION | NAME SPACE | VERSION | URI | UUID OF SERVICE | LOCAL ID | MASTER UUID | REGISTRATION DATE AND TIME | UPDATE DATE AND TIME |
|---|---|---|---|---|---|---|---|---|---|
| SRMS 200_7 | EXPLA-NATION | jp.co.xxxxx.srms | 3.00 | http://192.168.2.17/srms/ | S007 | 1 | S007 | 2006/8/7 9:00 | 2006/8/7 9:00 |
| PIDS 201_7 | EXPLA-NATION | jp.co.xxxxx.pids | 3.10 | http://192.168.2.17/pids/ | P007 | 2 | S007 | 2006/8/7 9:00 | 2006/8/7 9:00 |
| EIDS 202_7 | EXPLA-NATION | jp.co.xxxxx.eids | 3.20 | http://192.168.2.17/eids/ | E007 | 3 | S007 | 2006/8/7 9:00 | 2006/8/7 9:00 |
| SRMS 200_3 | EXPLA-NATION | jp.co.xxxxx.srms | 1.00 | http://192.168.0.13/srms/ | S003 | 1 | S003 | 2006/8/8 9:00 | 2006/8/8 9:00 |
| PIDS 201_3 | EXPLA-NATION | jp.co.xxxxx.pids | 1.10 | http://192.168.0.13/pids/ | P003 | 2 | S003 | 2006/8/8 9:00 | 2006/8/8 9:00 |
| EIDS 202_3 | EXPLA-NATION | jp.co.xxxxx.eids | 1.20 | http://192.168.0.13/eids/ | E003 | 3 | S003 | 2006/8/8 9:00 | 2006/8/8 9:00 |
| SRMS 200_8 | EXPLA-NATION | jp.co.xxxxx.srms | 4.00 | http://192.168.2.18/srms/ | S008 | 1 | S008 | 2006/8/9 9:00 | 2006/8/9 9:00 |
| PIDS 201_8 | EXPLA-NATION | jp.co.xxxxx.pids | 4.10 | http://192.168.2.18/pids/ | P008 | 2 | S008 | 2006/8/9 9:00 | 2006/8/9 9:00 |
| EIDS 202_8 | EXPLA-NATION | jp.co.xxxxx.eids | 4.20 | http://192.168.2.18/eids/ | E008 | 3 | S008 | 2006/8/9 9:00 | 2006/8/9 9:00 |

| NAME | EXPLA-NATION | NAME SPACE | VER-SION | URI | UUID OF SERVICE | LOCAL ID | MASTER UUID | ROOT ID | GENE-RATION | REGIS-TRATION DATE AND TIME | UPDATE DATE AND TIME |
|---|---|---|---|---|---|---|---|---|---|---|---|
| SRMS 200_5 | EXPLA-NATION | jp.co.xxxxx.srms | 3.00 | http://192.168.1.15/srms/ | S005 | 1 | S005 | S005 | 0 | 2006/8/5 9:00 | 2006/8/5 9:00 |
| PIDS 201_5 | EXPLA-NATION | jp.co.xxxxx.pids | 3.10 | http://192.168.1.15/pids/ | P005 | 2 | S005 | P005 | 0 | 2006/8/5 9:00 | 2006/8/5 9:00 |
| EIDS 202_5 | EXPLA-NATION | jp.co.xxxxx.eids | 3.20 | http://192.168.1.15/eids/ | E005 | 3 | S005 | E005 | 0 | 2006/8/5 9:00 | 2006/8/5 9:00 |

FIG. 27

| NAME | EXPLA-NATION | NAME SPACE | VER-SION | URI | UUID OF SERVICE | LOCAL ID | MASTER UUID | ROOT ID | GENER-ATION | REGIS-TRATION DATE AND TIME | UPDATE DATE AND TIME |
|---|---|---|---|---|---|---|---|---|---|---|---|
| SRMS 200_4 | EXPLA-NATION | jp.co.xxxxx.srms | 1.00 | http://192.168.1.14/srms/ | S004 | 1 | S004 | S004 | 1 | 2006/8/4 9:00 | 2006/8/4 9:00 |
| SRMS 200_5 | EXPLA-NATION | jp.co.xxxxx.srms | 3.00 | http://192.168.1.15/srms/ | S005 | 1 | S004 | S004 | 0 | 2006/8/5 9:00 | 2006/8/5 9:00 |
| PIDS 201_4 | EXPLA-NATION | jp.co.xxxxx.pids | 1.10 | http://192.168.1.14/pids/ | P004 | 2 | S004 | P004 | 1 | 2006/8/4 9:00 | 2006/8/4 9:00 |
| PIDS 201_5 | EXPLA-NATION | jp.co.xxxxx.pids | 3.10 | http://192.168.1.15/pids/ | P005 | 2 | S004 | P004 | 0 | 2006/8/5 9:00 | 2006/8/5 9:00 |
| EIDS 202_4 | EXPLA-NATION | jp.co.xxxxx.eids | 1.20 | http://192.168.1.14/eids/ | E004 | 3 | S004 | E004 | 1 | 2006/8/4 9:00 | 2006/8/4 9:00 |
| EIDS 202_5 | EXPLA-NATION | jp.co.xxxxx.eids | 3.20 | http://192.168.1.15/eids/ | E005 | 3 | S004 | E004 | 0 | 2006/8/5 9:00 | 2006/8/5 9:00 |
| SRMS 200_2 | EXPLA-NATION | jp.co.xxxxx.srms | 2.00 | http://192.168.0.12/srms/ | S002 | 1 | S002 | S002 | 0 | 2006/8/2 9:00 | 2006/8/2 9:00 |
| PIDS 201_2 | EXPLA-NATION | jp.co.xxxxx.pids | 2.10 | http://192.168.0.12/pids/ | P002 | 2 | S002 | P002 | 0 | 2006/8/2 9:00 | 2006/8/2 9:00 |
| EIDS 202_2 | EXPLA-NATION | jp.co.xxxxx.eids | 2.20 | http://192.168.0.12/eids/ | E002 | 3 | S002 | E002 | 0 | 2006/8/2 9:00 | 2006/8/2 9:00 |

| NAME | EXPLA-NATION | NAME SPACE | VER-SION | URI | UUID OF SERVICE | LOCAL ID | MASTER UUID | ROOT ID | GENER-ATION | REGIS-TRATION DATE AND TIME | UPDATE DATE AND TIME |
|---|---|---|---|---|---|---|---|---|---|---|---|
| SRMS 200_6 | EXPLA-NATION | jp.co.xxxxx.srms | 6.00 | http://192.168.2.16/srms/ | S006 | 1 | S006 | S006 | 0 | 2006/8/6 9:00 | 2006/8/6 9:00 |
| PIDS 201_6 | EXPLA-NATION | jp.co.xxxxx.pids | 6.10 | http://192.168.2.16/pids/ | S006 | 2 | S006 | P006 | 0 | 2006/8/6 9:00 | 2006/8/6 9:00 |
| EIDS 202_6 | EXPLA-NATION | jp.co.xxxxx.eids | 6.20 | http://192.168.2.16/eids/ | S006 | 3 | S006 | E006 | 0 | 2006/8/6 9:00 | 2006/8/6 9:00 |

| NAME | EXPLA-NATION | NAME SPACE | VER-SION | URI | UUID OF SERVICE | LOCAL ID | MAS-TER UUID | ROOT ID | GENER-ATION | REGISTRATION DATE AND TIME | UPDATE DATE AND TIME |
|---|---|---|---|---|---|---|---|---|---|---|---|
| SRMS 200_4 | EXPLA-NATION | jp.co.xxxxx.srms | 1.00 | http://192.168.1.14/srms/ | S004 | 1 | S004 | S004 | 2 | 2006/8/4 9:00 | 2006/8/4 9:00 |
| SRMS 200_6 | EXPLA-NATION | jp.co.xxxxx.srms | 6.00 | http://192.168.2.16/srms/ | S006 | 1 | S004 | S004 | 1 | 2006/8/6 9:00 | 2006/8/6 9:00 |
| SRMS 200_5 | EXPLA-NATION | jp.co.xxxxx.srms | 3.00 | http://192.168.1.15/srms/ | S005 | 1 | S004 | S004 | 1 | 2006/8/5 9:00 | 2006/8/5 9:00 |
| PIDS 201_4 | EXPLA-NATION | jp.co.xxxxx.pids | 1.10 | http://192.168.1.14/pids/ | P004 | 2 | S004 | P004 | 2 | 2006/8/4 9:00 | 2006/8/4 9:00 |
| PIDS 201_6 | EXPLA-NATION | jp.co.xxxxx.pids | 6.10 | http://192.168.2.16/pids/ | P006 | 2 | S004 | P004 | 1 | 2006/8/6 9:00 | 2006/8/6 9:00 |
| PIDS 201_5 | EXPLA-NATION | jp.co.xxxxx.pids | 3.10 | http://192.168.1.15/pids/ | P005 | 2 | S004 | P004 | 0 | 2006/8/5 9:00 | 2006/8/5 9:00 |
| EIDS 202_4 | EXPLA-NATION | jp.co.xxxxx.eids | 1.20 | http://192.168.1.14/eids/ | E004 | 3 | S004 | E004 | 2 | 2006/8/4 9:00 | 2006/8/4 9:00 |
| EIDS 202_6 | EXPLA-NATION | jp.co.xxxxx.eids | 6.20 | http://192.168.2.16/eids/ | E006 | 3 | S004 | E004 | 1 | 2006/8/6 9:00 | 2006/8/6 9:00 |
| EIDS 202_5 | EXPLA-NATION | jp.co.xxxxx.eids | 3.20 | http://192.168.1.15/eids/ | E005 | 3 | S004 | E004 | 0 | 2006/8/5 9:00 | 2006/8/5 9:00 |
| SRMS 200_2 | EXPLA-NATION | jp.co.xxxxx.srms | 2.00 | http://192.168.0.12/srms/ | S002 | 1 | S002 | S002 | 0 | 2006/8/2 9:00 | 2006/8/2 9:00 |
| PIDS 201_2 | EXPLA-NATION | jp.co.xxxxx.pids | 2.10 | http://192.168.0.12/pids/ | P002 | 2 | S002 | P002 | 0 | 2006/8/2 9:00 | 2006/8/2 9:00 |
| EIDS 202_2 | EXPLA-NATION | jp.co.xxxxx.eids | 2.20 | http://192.168.0.12/eids/ | E002 | 3 | S002 | E002 | 0 | 2006/8/2 9:00 | 2006/8/2 9:00 |

IMAGE PROCESSING APPARATUS AND IMAGE PROCESSING METHOD FOR PRINTING AN ACQUIRED IMAGE

CROSS-REFERENCE TO RELATED APPLICATIONS

The present application claims priority to and incorporates by reference the entire contents of Japanese priority document 2007-033817 filed in Japan on Feb. 14, 2007.

BACKGROUND OF THE INVENTION

1. Field of the Invention

The present invention relates to a technology for acquiring an electronic document through a network and printing an image using the acquired electronic document.

2. Description of the Related Art

In the past, there is a technology for scanning, in copying paper having point information indicating an address and the like of a server printed thereon as a barcode, the paper as an image (a scan image) with a scanner and scanning the barcode printed on the paper, accessing the server corresponding to the address indicated by the point information obtained by decoding the barcode, and acquiring an electronic document printed on the paper as an image (see, for example, Japanese Patent Application Laid-Open No. 2005-151127). The acquisition of the electronic document is performed by extracting a characteristic of the scanned scan image and retrieving an electronic document stored in the server using the extracted characteristic. For example, due to a change in a connection environment of a location or the like of the server on a network, it may be impossible to access the server corresponding to the address indicated by the point information. In such a case, the electronic document is retrieved out of electronic documents stored in all servers connected to an image processing system using the characteristic extracted from the scan image.

In the technology disclosed in Japanese Patent Application Laid-Open No. 2005-151127, when the connection environment such as the location of the server on the network is changed, it is likely that the server corresponding to the address indicated by the point information cannot be accessed and the server itself cannot be specified. Even if the server in which the electronic document printed on the paper as the image is stored can be uniquely specified, the electronic document is retrieved using the characteristic of the scan image. Therefore, it is likely that it takes a lot of time to retrieve the electronic document. A plurality of electronic documents similar to the characteristic extracted from the processing object electronic document may be obtained as a retrieval result. Therefore, it is likely that the electronic document printed on the paper as the image cannot be uniquely specified.

SUMMARY OF THE INVENTION

It is an object of the present invention to at least partially solve the problems in the conventional technology.

According to an aspect of the present invention, there is provided an image processing apparatus including a reading unit that acquires an image read by scanning a first paper medium with a scanning unit; a code acquiring unit that extracts a predetermined code image from the image acquired by the reading unit, and acquires paper identification information for identifying the first paper medium from the code image; an electronic-information control unit that manages electronic information that specifies a print object electronic document stored in an electronic-document storing unit and is stored in an electronic-information storing unit in association with electronic identification information for identifying the electronic information; a paper-information control unit that manages paper information for specifying a paper medium and is stored in a paper-information storing unit in association with paper identification information for identifying the paper information; a service-information storing unit that stores first service information including first control identification information for identifying the electronic-information control unit and second service information including second control identification information for identifying the paper-information control unit; a service-information control unit that manages the first service information and the second service information stored in the service-information storing unit; and a printing unit that forms a print image based on the image acquired by the reading unit and prints the print image on a second paper medium. The reading unit acquires the second service information from the service-information control unit using the paper identification information acquired by the code acquiring unit, acquires the paper information from the paper-information control unit using the second service information, acquires, using the paper information, the first service information specifying the electronic-information control unit that manages electronic information specifying the electronic document as a print source of the first paper medium, acquiring the electronic document from the electronic-information control unit using the first service information, and requests the printing unit to perform printing using the electronic document. The image processing apparatus further includes an information integrating unit that acquires at least one of the electronic information, the paper information, and the first service information and the second service information managed by other electronic-information control unit, other paper-information control unit, and other service-information control unit included in other image processing apparatus and integrates the information in the image processing apparatus.

Furthermore, according to another aspect of the present invention, there is provided an image processing method using an image processing apparatus that includes a reading unit that acquires an image read by scanning a first paper medium with a scanning unit, a code acquiring unit that extracts a predetermined code image from the image acquired by the reading unit, and acquires paper identification information for identifying the first paper medium from the code image, an electronic-information control unit that manages electronic information that specifies a print object electronic document stored in an electronic-document storing unit and is stored in an electronic-information storing unit in association with electronic identification information for identifying the electronic information, a paper-information control unit that manages paper information for specifying a paper medium and is stored in a paper-information storing unit in association with paper identification information for identifying the paper information, a service-information storing unit that stores first service information including first control identification information for identifying the electronic-information control unit and second service information including second control identification information for identifying the paper-information control unit, a service-information control unit that manages the first service information and the second service information stored in the service-information storing unit, and a printing unit that forms a print image based on the image acquired by the reading unit and prints the print image on a second paper medium. The image processing method includes print requesting including acquiring the second service information from the service-information control unit using the paper identification information acquired by the code acquiring unit, acquiring the paper information from the paper-information control unit using the second service information, acquiring, using the paper information, the first service information specifying the electronic-information control unit that manages electronic information specifying the electronic document as a print source of the first paper medium, acquiring the electronic document from the electronic-information control unit using the first service information, and requesting the printing unit to perform printing using the electronic document; and information integrating including acquiring at least one of the electronic information, the paper information, and the first service information and the second service information managed by other electronic-information control unit, other paper-information control unit, and other service-information control unit included in other image processing apparatus, and integrating the information in the image processing apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram of the data structure of a service-information table 300A according to the embodiment;

FIG. 6 is a diagram of the data structure of a trust-relationship-information table 300B according to the embodiment;

FIG. 7 is a block diagram of the structure of a paper ID service (PIDS) 201 according to the embodiment;

FIG. 8 is a diagram of the data structure of a paper-information table 301A according to the embodiment;

FIG. 9 is a block diagram of the structure of an electronic ID service (EIDS) 202 according to the embodiment;

FIG. 10 is a diagram of the data structure of an electronic-information table 302A according to the embodiment;

FIG. 18 is a diagram of a state of a service-information table 300A_3 of a multifunction peripheral MFP3 that has the trust relationship explained above in the image processing system according to the embodiment;

FIG. 19 is a diagram of a state of a service-information table 300A_7 of a multifunction peripheral MFP7 that has the trust relationship explained above in the image processing system according to the embodiment;

FIG. 26 is a diagram of the data structure of a list of integration object service information according to the embodiment;

FIG. 27 is a diagram of the data structure of a service-information table 300A_4 in which latest service information is updated and object service information is registered according to the embodiment;

FIG. 28 is a diagram of a list of service information received by a service-merge processing section SR30_4 at Step S600 according to the embodiment;

FIG. 29 is a diagram of the data structure of the service-information table 300A_4 in which latest service information is updated and object service information is registered as a result of service-merge processing according to the embodiment;

DETAILED DESCRIPTION OF THE PREFERRED EMBODIMENTS

Exemplary embodiments of the present invention are explained in detail below with reference to the accompanying drawings.

Figure 1:
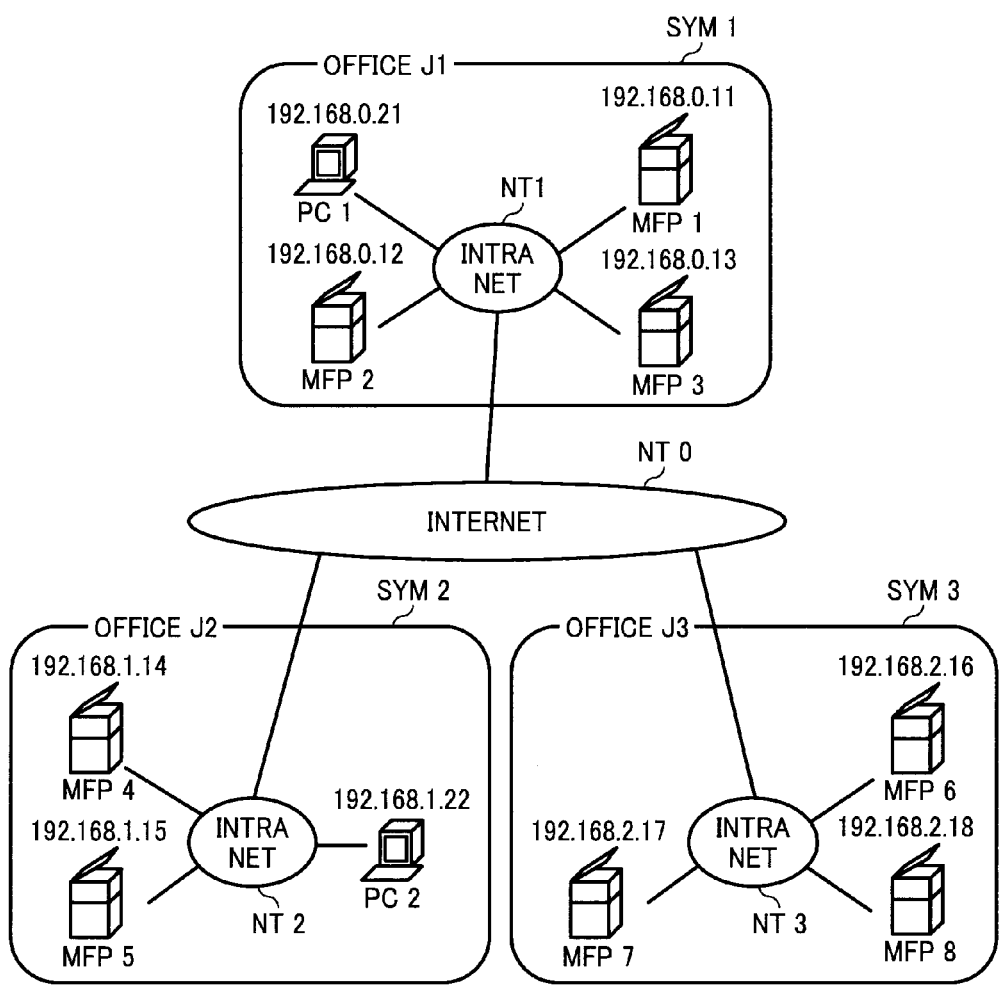
FIG. 1 is a block diagram of the structure of an overall image processing system according to an embodiment of the present invention.

FIG. 1 is a block diagram of the structure of an overall image processing system according to an embodiment of the present invention. As shown in the figure, for example, there are three offices J1, J2, and J3. In the respective offices, there are in-house systems SYM1, SYM2, and SYM3 connected to intranets NT1, NT2, and NT3, respectively. These in-house systems SYM1, SYM2, and SYM3 are connected to one another through the Internet NT0 to constitute the image processing system. In the in-house system SYM 1, three multifunction peripherals MFP1, MFP2, and MFP3 and one personal computer PC1 are connected. In the in-house system SYM2, two multifunction peripherals MFP4 and MFP5 and one personal computer PC2 are connected. In the in-house system SYM3, three multifunction peripherals MFP6, MFP7, and MFP8 are connected. The multifunction peripherals MFP1 to MFP8 and the personal computers PC1 and PC2 are allocated with IP addresses that can uniquely identify the multifunction peripherals and the personal computers. The multifunction peripherals MFP1 to MFP8 and the personal computers PC1 and PC2 are capable of communicating with each other according to network protocols such as HTTP, FTP, and UDP. Various known technologies can be used for establishment of such a network. A technology used for establishment of the network is not limited in this embodiment. In the following explanation, when it is unnecessary to distinguish the in-house systems SYM1 to SYM3, the in-house systems SYM1 to SYM3 are simply referred to as in-house system SYM with "1" to "3" of the reference signs omitted. When it is unnecessary to distinguish the personal computers PC1 and PC2, the personal computers PC1 and PC2 are simply referred to as personal computer PC with "1" and "2" of the reference signs omitted. When it is unnecessary to distinguish the multifunction peripherals MFP1 to MFP8, the multifunction peripherals MFP1 to MFP6 are simply referred to as multifunction peripheral MFP with "1" to "6" of the reference signs omitted. When it is unnecessary to distinguish the intranets NT1, NT2, and NT3 and the Internet NT0, the intranets NT1, NT2, and NT3 and the Internet NT0 are simply referred to as network NT.

In the image processing system according to this embodiment, when the multifunction peripheral MFP prints an electronic document on paper as an image, the multifunction peripheral MFP issues a paper ID that can uniquely identify the paper to the paper, prints a code image obtained by encoding the paper ID on the paper, and stores paper information including a print condition for the paper and information specifying an electronic document as a print source of the paper in association with the paper ID. On the other hand, when the multifunction peripheral MFP copies such paper, the multifunction peripheral MFP scans the code image printed on the paper, decodes the code image to acquire the paper ID, and acquires the paper information associated with the paper ID. The multifunction peripheral MFP acquires the electronic document through the network NT as the print source using the paper information and prints an image on the paper using the acquired electronic document. In printing the image on paper, the multifunction peripheral MFP issues a paper ID that can uniquely identify the paper to the paper, prints a code image obtained by encoding the paper ID on the paper, and stores paper information including the paper ID of a copy source in association with the issued paper ID. When any one of the multifunction peripherals MFP1 to MPF8 leaves the image processing system, information related to the electronic document acquisition and managed by the multifunction peripheral MFP (hereinafter, "leaving multifunction peripheral") is transferred to the multifunction peripheral MFP other than the leaving multifunction peripheral.

The personal computer PC has the structure of a general computer including a central processing unit (CPU) that controls the entire personal computer PC, a read only memory (ROM) that stores various control programs, various data, and the like, a random access memory (RAM), a hard disk (HD) that stores various application programs and various data, a communication unit that controls data communication with an external apparatus, and a bus that connects the CPU, the ROM, the RAM, the HDD, and the communication unit (all of these components are not shown in the figure). A display unit such as a monitor and an operation unit such as a keyboard (both the units are not shown in the figure) are connected to the personal computer PC through wire or wireless connecting means. A printer driver is stored in the ROM of the personal computer PC. When the printer driver is started by the CPU, the personal computer PC transmits a print command to the multifunction peripheral MFP in the same in-house system SYM through the communication unit.

Figure 2:
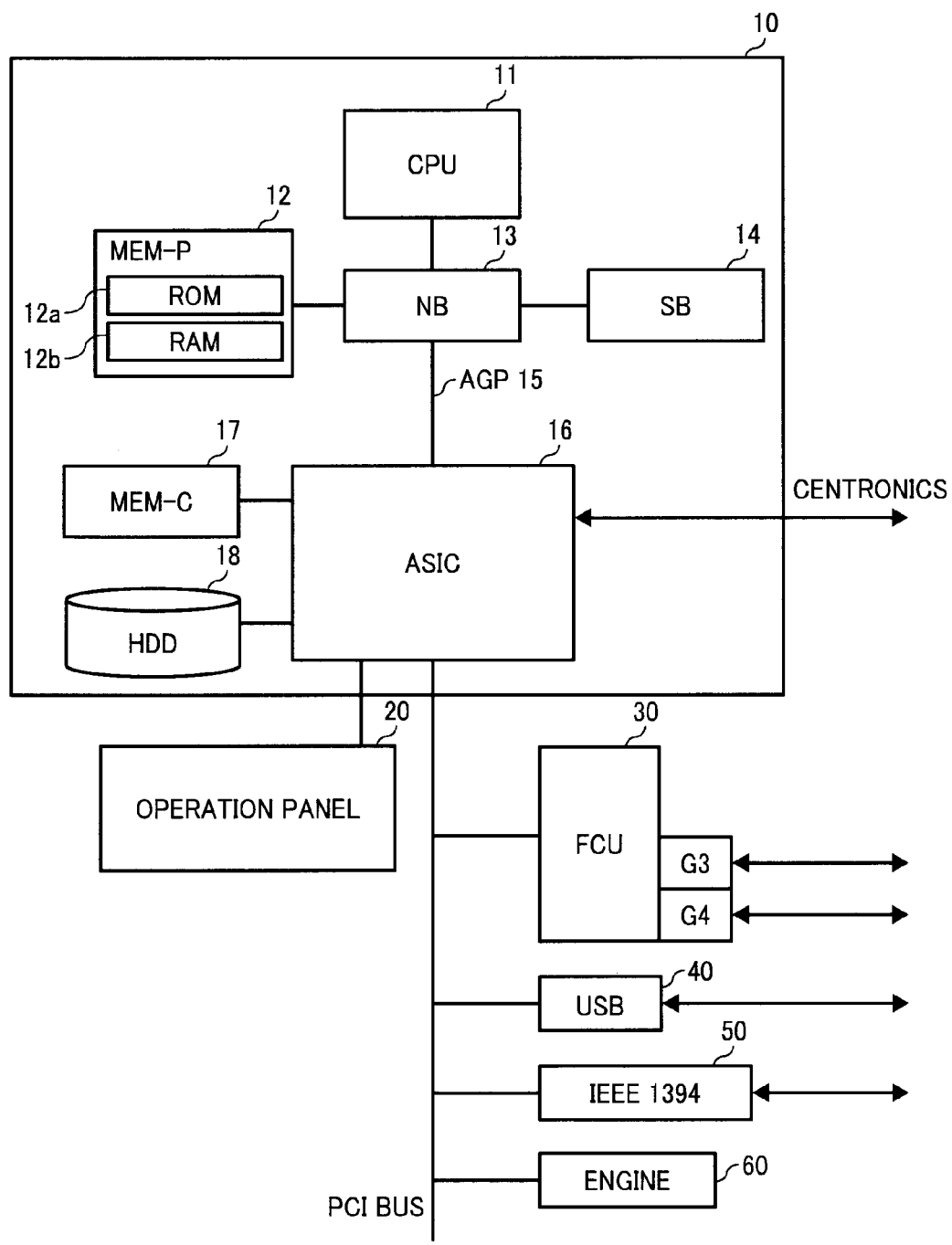
FIG. 2 is a block diagram of a hardware configuration of a multifunction peripheral MFP according to the embodiment.

FIG. 2 is a block diagram of the electrical structure of the multifunction peripheral MFP. As shown in FIG. 2, in the multifunction peripheral MFP, a controller 10 and an engine unit (engine) 60 are connected by a peripheral component interconnect (PCI) bus. The controller 10 is a controller that controls the entire multifunction peripheral MFP, rendering, communication, and input from a not-shown operation unit. The engine unit 60 is a printer engine or the like connectable to the PCI bus. The engine unit 60 includes a scanning unit such as a scanner and also includes a printing unit such as a black and white plotter, a one-drum color plotter, or a four-drum color plotter (both the scanner unit and the printing unit are not shown in the figure). An engine unit 40 includes, in addition to a so-called engine section of the plotters and the like, an image processing section for error diffusion, gamma conversion, and the like. The multifunction peripheral MFP also includes an operation panel 20 in which an operation device to which operation from the user is inputted and a display device that displays information are integrally formed. The operation panel 20 is connected to an application specific integrated circuit (ASIC) 16. A CPU 11 included in the controller 10 has a timing function and measures a present date and time. A detailed electrical structure of such a multifunction peripheral MFP is disclosed in, for example, Japanese Patent Application Laid-Open No. 2006-177990. Therefore, explanation of the detailed electrical structure is omitted. Functions realized by the CPU 11 executing various programs stored in a read only memory (ROM) 12a, i.e., the functional structure of the multifunction peripheral MFP is explained below.

Figure 3:
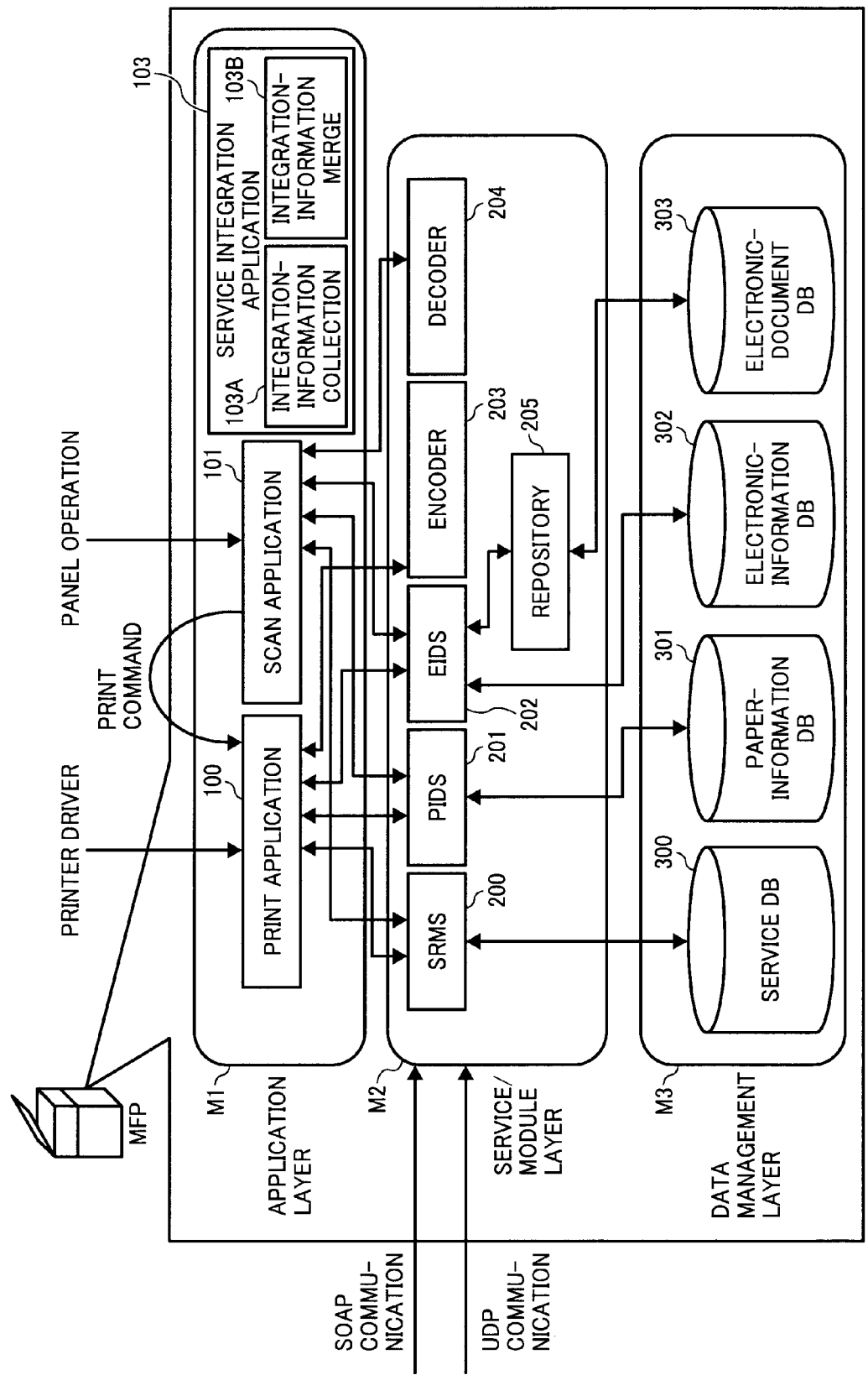
FIG. 3 is a block diagram of the functional structure of the multifunction peripheral MFP according to the embodiment.

FIG. 3 is a block diagram showing a functional structure of the multifunction peripheral MFP. Functions of the multifunction peripheral MFP are roughly divided into an application layer M1, a service/module layer M2, and a database layer M3. The application layer M1 has the print application 100, a scan application 101 and the service integration application 103. The service/module layer M2 has a service resource management service (SRMS) 200, a paper ID service (PIDS) 201, and an electronic ID service (EIDS) 202 as information processing services (hereinafter simply referred to as "services"). The service/module layer M2 further has an encoder 203, a decoder 204, and a repository 205 as modules. The database layer M3 has a service database (DB) 300, a paper-information DB 301, an electronic-information DB 302, and an electronic-document DB 303 that store electronic documents. The DBs 300 to 303 are stored in the HDD or the like.

The print application 100 acquires a print object electronic document using the SRMS 200, the PIDS 201, the EIDS 202, and the encoder 203 and prints the electronic document using the printing unit. The print application 100 prints an image using the printing unit according to a print command from the scan application 101. The scan application 101 acquires an electronic document as a print source with respect to scanned print object paper using the SRMS 200, the PIDS 201, the EIDS 202, and the decoder 204 and passes the electronic document to the print application 100 together with a print command. The service integration application 103 is further divided into two functions, i.e., a function of integration-information collection 103A and a function of integration-information merge 103B. The integration-information collection 103A is a function of collecting, when any one of the multifunction peripherals MFP leaves the image processing system, service information concerning the SRMS 200, the PIDS 201, and the EIDS 202 included in the multifunction peripheral MFP. The integration-information merge 103B is a function of registering the respective kinds of service information collected by the integration-information collection 103A in respective databases of the database layer M3 included in another multifunction peripheral MFP included in the image forming system. When the service integration application 103 is started, an operation button corresponding to the integration-information collection 103A and an operation button corresponding to the integration-information merge 103B are displayed on the operation panel 20. When the respective buttons are depressed by a user, the respective functions corresponding to the operation buttons are realized. Details of the respective functions are explained later.

The SRMS 200 manages information concerning the respective services of the SRMS 200, the PIDS 201, and the EIDS 202 using the service DB 300. The PIDS 201 manages information concerning a printed paper using the paper-information DB 301. The EIDS 202 manages information concerning a print object electronic document using the electronic-information DB 302 and the repository 205. The repository 205 manages an electronic document stored in the electronic-document DB 303. The repository 205 is a known document management system having a function of managing an electronic document. Therefore, explanation of details of the repository 205 is omitted. However, the repository 205 has functions of acquiring an electronic document, registering the electronic document in the electronic-document DB 303, and updating or deleting the electronic document stored in the electronic-document DB 303. The EIDS 202 performs processing for a body of an electronic document (registration, update, deletion, and acquisition of the electronic document) using these functions of the repository 205. The registration of the electronic document in the electronic-document DB 303 means the start of storage of the electronic document in the electronic-document DB 303. Registration of other information in the other DBs has a similar meaning.

The respective services of the SRMS 200, the PIDS 201, and the EIDS 202 perform various kinds of processing according to a processing command from the application layer M1 and a processing command from an external apparatus through SOAP communication. The SRMS 200 receives processing commands from the SRMSs 200 of the other multifunction peripherals MFP through UDP communication and performs various kinds of processing according to the processing commands.

The structure of detailed functions of the respective services and the respective modules and the structure of the respective databases are explained below. For convenience of explanation, in the respective multifunction peripherals MFP1 to MFP6, "1" to "6" of the reference signs MFP1 to MFP8 are attached to, together with underlines, the ends the reference numerals of the print application 100, the scan application 101, the service integration application 103, the SRMS 200, the PIDS 201, the EIDS 202, the encoder 203, the decoder 204, the repository 205, the service DB 300, the paper-information DB 301, the electronic-information DB 302, and the electronic documents DB 303. Specifically, the multifunction peripheral MFP1 has a print application 100_1, a scan application 101_1, a service integration application 103_1, an SRMS 200_1, a PIDS 201_1, an EIDS 202_1, an encoder 203_1, a decoder 204_1, a repository 205_1, a service DB 300_1, a paper-information DB 301_1, an electronic-information DB 302_1, and an electronic-document DB 303_1. The same holds true for the multifunction peripherals MFP2 to MFP8 and respective units explained below. In the following explanation, when it is unnecessary to distinguish these components, the underlines and the reference numerals "1" to "6" are omitted.

Figure 4:
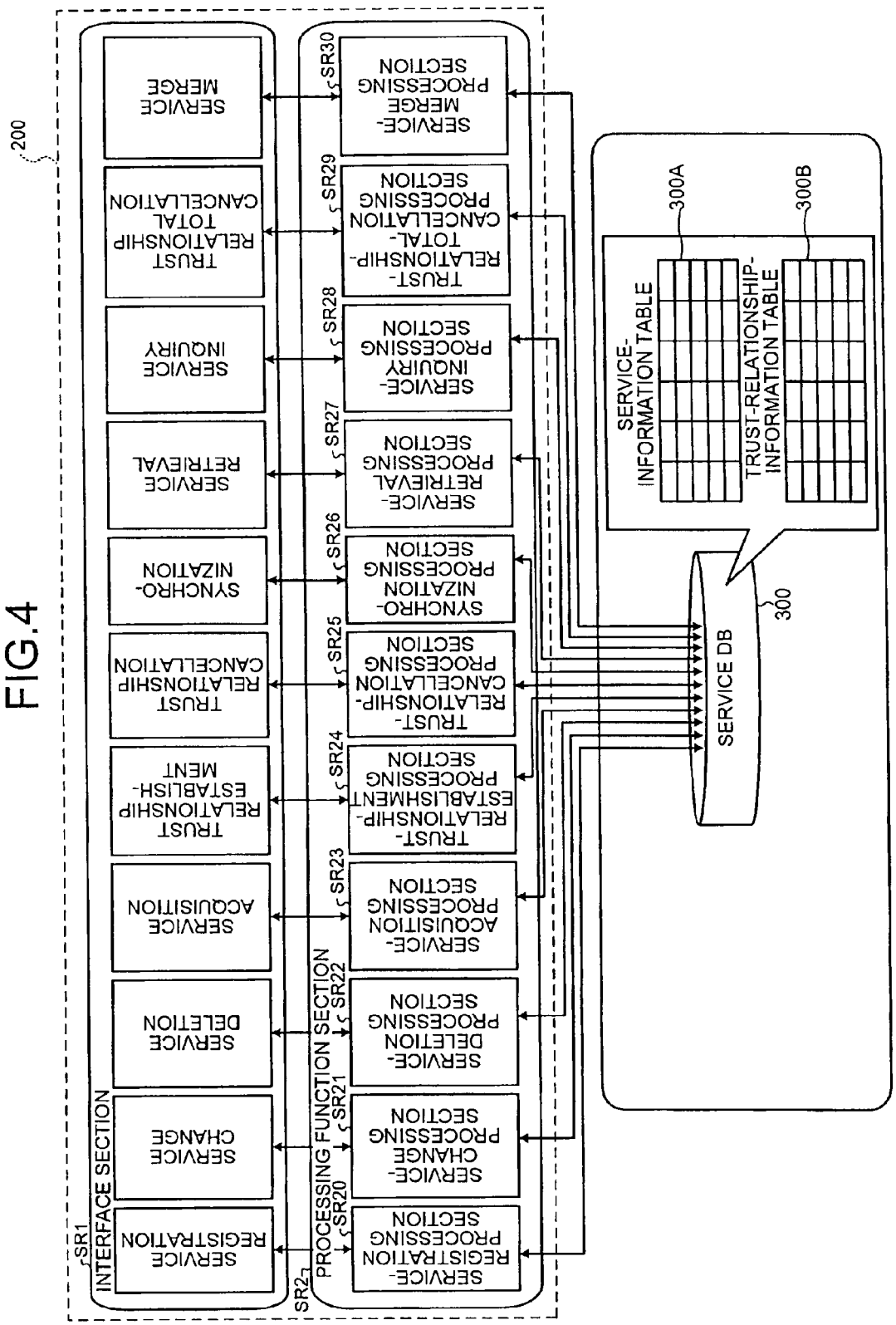
FIG. 4 is a block diagram of the structure of a service resource management service (SRMS) 200 according to the embodiment.

The SRMS 200 is a function of managing service information. FIG. 4 is a block diagram of the structure of the SRMS 200. The SRMS 200 has an interface section SR1 and a processing function section SR2. The interface section SR1 has nine interfaces. As shown in FIG. 4, the respective interfaces are interfaces for service registration, service change, service deletion, service acquisition, trust relationship establishment, trust relationship cancellation, synchronization, service retrieval, service inquiry, trust relationship total cancellation, and service merge. Among the interfaces, the interfaces for service registration, service change, service deletion, service acquisition, trust relationship establishment, trust relationship cancellation, synchronization, service retrieval, trust relationship total cancellation, and service merge are interfaces that can use a Web service. The Web service is one of services of network communication extremely often used presently and is a mechanism for transmitting structured data called standardized simple object access protocol (SOAP) message to a network or receiving the data from the network. As programming methods incorporating this mechanism, NET Framework (registered trademark) of Microsoft (registered trademark) in the C language/C# language/Basic language, AXIS of Apache in the Java (registered trademark) language, and the like are famous. These programming methods are often used. In this embodiment, the mechanism of the Web service may be established using any one of the programming methods. The interface for the service inquiry is an interface that uses user datagram protocol (UDP) communication. UDP is a transport layer protocol for realizing datagram communication in TCP/IP. Similarly, the processing function section SR2 includes eleven processing sections, i.e., a service-registration processing section SR20, a service-change processing section SR21, a service-deletion processing section SR22, a service-acquisition processing section SR23, a trust-relationship-establishment processing section SR24, a trust-relation-cancellation processing section SR25, a synchronization processing section SR26, a service-retrieval processing section SR27, a service-inquiry processing section SR28, trust-relationship-total-cancellation processing section SR29, and service-merge processing section SR30. Functions of the interface for service inquiry of the interface section SR1 and the service-inquiry processing section SR28 and functions of the interface for service retrieval of the interface section SR1 and the service-retrieval processing section SR27 have a broadcast function and transmit data to a large number of communication partners.

The interfaces of the interface section SR1 are connected to the processing sections SR20 to SR30 of the processing function section SR2 in the order explained above, respectively. When a request for processing is received from the external apparatus or the application layer M1, the interfaces pass parameters used for the processing to the processing sections corresponding to the requested processing, receive results of the processing performed by using the parameters from the corresponding processing sections, and return the processing results to the request source of the processing. When the parameters are passed from the corresponding interfaces, the respective processing sections access the service DB 300, execute the processing using the parameters, and return processing results to the corresponding interfaces. Processing performed by the respective processing units SR20 to SR30 is explained in detail later.

The service DB 300 has a service-information table 300A that stores service information representing the SRMS 200, service information representing the PIDS 201, and service information representing the EIDS 202 as records, respectively, and a trust-relationship-information table 300B that stores trust relationship information explained later.

FIG. 5 is a diagram of an example of the data structure of the service-information table 300A. Specifically, FIG. 5 is a diagram of the data structure of the service-information table 300A_4 held by the multifunction peripheral MFP4. In the service-information table 300A, service information representing the SRMS 200, service information representing the PIDS 201, and the service information representing the EIDS 202 are stored for each service ID. The service ID is an ID that can uniquely identify each of the kinds of service information. The SRMS 200 issues the service ID when the SRMS 200 registers each of the kinds of service information in the service-information table 300A according to a service registration function explained later. Specifically, the service ID includes a combination of a UUID of a service and a local ID explained below. Each of the kinds of service information stored in the service-information table 300A includes, as shown in FIG. 5, "name", "explanation", "name space", "version", "uniform resource identifier (URI)", "UUID of a service", "local ID", "master UUID", "Root ID", "Generation", "registration date and time", and "update date and time" as data. "Name" and "explanation" are character strings issued to allow the user to understand what the service is. "Name" is represented as, for example, "SRMS", "PIDS", or "EIDS". "Name space" is a character string that can uniquely identify a service. "Name space" is a character string for allowing the user to identify that, even if names of services are the same, the services are different if name spaces of the services are different. "Name space" is represented as, for example, "jp.co.ricoh.srms". "Version" is a character string indicating a version of the service. "URI" is a character string indicating where in the network the service exists. For example, "URI" of a PIDS 201_5 of the multifunction peripheral MFP5 shown in FIG. 1 is represented as "http://192.168.1.15/ids/".

"UUID of a service" is an ID for globally and uniquely identifying the respective services of the SRMS 200, the PIDS 201, and the EIDS 202. "UUID of a service" is, for example, a GUID, which is an object class ID used in Windows (registered trademark), and a MAC address allocated to a network card. A technology for issuing a UUID to a service is already known. As such a technology, there are a large number of technologies. In this embodiment, any one of the technologies may be used. As timing of the issuance, the UUID is issued when programs for realizing the functions of the SRMS 200, the PIDS 201, and the EIDS 202 are installed in the multifunction peripheral MFP. The UUID is not changed until the programs are uninstalled from the multifunction peripheral MFP. "Local ID" is an ID for uniquely identifying service information in an identical SRMS 200. "Local ID" makes it possible to globally and uniquely identify the service information according to a combination with the UUID of a service. "Master UUID" (management identification information) is a UUID issued to the SRMS 200 that manages the service information. "Master UUID" is used when a synchronization function explained later is realized.

"Root ID" indicates each service (any one of the SRMS 200, the PIDS 201, and the EIDS 202) (third belonging identification information, second belonging identification information, and first belonging identification information). In particular, when the respective kinds of service information is transferred by a service merge function explained later, "root ID" indicates a UUID of each service as a destination of the transfer. "Generation" indicates a history of integration of the respective kinds of service information in the service-information table 300A. In "generation", for example, "0" of service information in an oldest generation is set. A larger value is set for a newer generation. A latest generation indicates that service information can be used as latest information. "Root ID" and "generation" are used as retrieval key for finding out service information in the latest generation (hereinafter, "latest service information") as an object of processing explained later from the service-information table 300A. "Registration date and time" and "update data and time" respectively indicate a date and time when the service information is registered in the service-information table 300A and a date and time when the service information is updated. FIG. 6 is a diagram of an example of a data structure of the trust-relationship-information table 300B. In the trust-relationship-information table 300B, a UUID of the SRMS 200 that forms a trust relationship is stored as trust relationship information. Forming the trust relationship is sharing service information with the SRMSs 200 of the other multifunction peripherals MFP and making it possible to synchronize the service information. Details of the trust relationship are explained later.

FIG. 7 is a block diagram of the structure of the PIDS 201. The PIDS 201 is a function of managing paper information. The paper information is information concerning printed paper. The function of the PIDS 201 further has an interface section PI1 and a processing function section PI2. The interface section PI1 has five interfaces. The respective interfaces are interfaces for paper registration, paper change, paper deletion, paper acquisition, paper information merge. All of these interfaces are interfaces that can use the Web service. Similarly, the processing function section PI2 includes five processing sections, i.e., a paper-registration processing section PI20, a paper-change processing section PI21, a paper-deletion processing section PI22, a paper-acquisition processing section PI23, and a paper-information-merge processing section PI24.

The interfaces of the interface section PI11 are connected to the processing sections in the order explained above, respectively. When a request for processing is received from the external apparatus or the application layer M1, the interfaces pass parameters used for the processing to the processing sections corresponding to the requested processing, receive results of the processing performed by using the parameters from the corresponding processing sections, and return the processing results to the request source of the processing. When the parameters are passed from the corresponding interfaces, the respective processing sections access the paper-information DB 301, execute the processing using the parameters, and return processing results to the corresponding interfaces. The processing performed by the respective processing sections PI20 to PI24 is explained in detail later.

The paper-information DB 301 has a paper-information table 301A that stores paper information concerning one piece of printed paper as one record.

FIG. 8 is a diagram of an example of the data structure of the paper-information table 301A. Paper information is stored in the paper-information table 301A for each paper ID. The paper ID is an ID that can uniquely identify, for each print object paper, the paper. The PIDS 201 issues the paper ID when the PIDS 201 registers paper information in the paper-information table 301A using a paper registration function explained later. Specifically, the paper ID includes a combination of a UUID of the PIDS 201 and a local ID explained below. For example, when images are printed on three pieces of paper in one print processing, three paper IDs are issued and associated with the three pieces of paper. The paper information stored in the paper-information table 301A includes "name", "explanation", "UUID of a PIDS", "local ID", "registration date and time", "update date and time", "link to an original document", and "print condition" as data. "Name" and "explanation" are character strings issued to allow the user to understand what the paper is. "UUID of a PIDS" is a UUID of the PIDS 201 that manages the paper information. A method of issuing the UUID is the same as that in the case of the SRMS 200. "Local ID" is an ID for uniquely identifying the paper information in an identical PIDS 201. "Local ID" makes it possible to globally and uniquely identify the paper information according to a combination with the UUID of the PIDS 201. "Registration data and time" indicates a date and time when the paper information is registered in the paper-information table 301A. "Update date and time" indicates a date and time when the paper information registered in the paper-information table 301A is updated. "Link to an original document" indicates information indicating which electronic document is printed to obtain the paper, i.e., information specifying an electronic document as a print source or indicates information indicating which paper is copied to obtain the paper, i.e., information specifying paper as a copy source. The information specifying an electronic document is, for example, a combination (an electronic ID) of a UUID of the EIDS 202 and a local ID issued by the EIDS 202 explained later. The information specifying paper is, for example, a combination (a paper ID) of the UUID of the PIDS 201 and a local ID issued by the PIDS 201. Consequently, in copying certain paper, when the paper is scanned, it is possible to specify which one is paper as a copy source. Moreover, by referring to "link to an original document" in paper information concerning the paper, it is possible to finally acquire information specifying an electronic document as a print source and acquire the electronic document. "Print condition" is, for example, a size of paper, aggregation, allocation, enlargement/reduction, and the like set by the user as a condition in printing the paper. "Print condition" is passed from the printer driver of the personal computer PC.

FIG. 9 is a block diagram of the structure of the EIDS 202. The EIDS 202 is a function of managing electronic information. The electronic information is information concerning an electronic document. Details of the electronic information are explained later. The EIDS 202 has an interface section EI1 and a processing function section EI2. The interface section EI1 has five interfaces. In FIG. 9, the respective interfaces are interfaces for electronic-information registration, electronic-information change, electronic-information deletion, electronic-information acquisition, and electronic-information merge. All of these interfaces are interfaces that can use the Web service. Similarly, the processing function section EI2 includes five processing sections, i.e., an electronic-information-registration processing section EI20, an electronic-information-change processing section EI21, an electronic-information-deletion processing section EI22, an electronic-information-acquisition processing section EI23, and an electronic-information-merge processing section EI24.

The interfaces of the interface section EI1 are connected to the processing sections in the order explained above, respectively. When a request for processing is received from the external apparatus or the application layer M1, the interfaces pass parameters used for the processing to the processing sections corresponding to the requested processing, receive results of the processing performed by using the parameters from the corresponding processing sections, and return the processing results to the request source of the processing. When the parameters are passed from the corresponding interfaces, the respective processing sections perform processing for a body of the electronic document using the repository 205, access the electronic-information DB 302, execute the processing using the parameters, and return processing results to the corresponding interfaces. In this way, the EIDS 202 manages the electronic information and manages the body of the electronic document in cooperation with the repository 205. Processing performed by the respective processing sections EI20 to EI24 is explained in detail later.

The electronic-information DB 302 has an electronic-information table 302A that stores electronic information as one record.

FIG. 10 is a diagram of an example of the data structure of the electronic-information table 302A. Electronic information is stored in the electronic-information table 302A for each electronic ID. The electronic ID is an ID that can uniquely identify the electronic information. The EIDS 202 issues the electronic ID when the EIDS 202 registers the electronic information in the electronic-information table 302A. Specifically, the electronic ID includes a combination of a UUID of the EIDS 202 and a local ID explained below. The electronic information stored in the electronic-information table 302A includes "name", "explanation", "UUID of an EIDS", "local ID", "registration date and time", "update date and time", and "link to a repository" as data. "Name" and "explanation" are character strings issued to allow the user to understand what the electronic document is. "UUID of an EIDS" is a UUID of the EIDS 202 that manages the electronic information. A method of issuing the UUID is the same as that in the case of the SRMS 200. "Local ID" is an ID for uniquely identifying the electronic information in an identical EIDS 202. "Local ID" makes it possible to globally and uniquely identify the electronic information according to a combination with the UUID of the EIDS 202. "Registration data and time" and "update date and time" indicate a date and time when the electronic information is registered in the electronic-information table 302A and a date and time when the electronic information is updated, respective. "Link to a repository" indicates a link to the electronic document and indicates, for example, an ID and a file pass that the repository 205 issues to the electronic document.

The encoder 203 according to this embodiment can be constituted by using various arbitrary known technologies. The encoder 203 converts a designated character string or byte array into a one-dimensional barcode or a two-dimensional code image. As the one-dimensional barcode, there are codes such as Code39, EAN-8, EAN-13, NW-7, and Code128. As the two-dimensional code image, there are codes such as QR, DataMatrix, and PDF417. In this embodiment, any one of the codes may be used. The codes have known parameters for creating code images, respectively. In this embodiment, the encoder 203 correctly sets parameters corresponding to an encode object code and creates a code image.

The decoder 204 according to this embodiment can be constituted by using various arbitrary known technologies. The decoder 204 restores an original character string or byte array from a code image created by the encoder 203. The decoder 204 has a detect function of specifying a position where a code image exists in one arbitrary image. When an image appearing in the specified position is inputted to the decoder 204 as a code image, the decoder 204 restores an original character string or byte array from the code image. A known technology can be used for the detect function as well.

The print application 100 has two functions corresponding to a difference in a print command source. Specifically, the print application 100 has a driver print function and a scan print function. The driver print function is a function of receiving a print command from the printer driver of the personal computer PC and printing an image according to the print command. The scan print function is a function of receiving a print command from the scan application 101 that scans copy object paper in the multifunction peripheral MFP and printing an image according to the print command.

When copy object paper is set on the multifunction peripheral MFP and a print command is inputted by the user on the operation panel 20 of the multifunction peripheral MFP, the scanning section scans the paper to scan a code image printed on the paper. The scan application 101 acquires the code image and acquires a paper ID decoded from the code image by the decoder 204. The scan application 101 acquires, based on the paper ID, paper information stored in the paper-information DB 301 using the function of the PIDS 201. The scan application 101 acquires, based on the paper information, electronic information stored in the electronic-information DB 302 using the function of the EIDS 202. The scan application 101 acquires an electronic document stored in the electronic-document DB 303 using the electronic information. The scan application 101 passes a print command including the electronic document, the paper ID, and a print condition to the print application 100.

Figure 11:
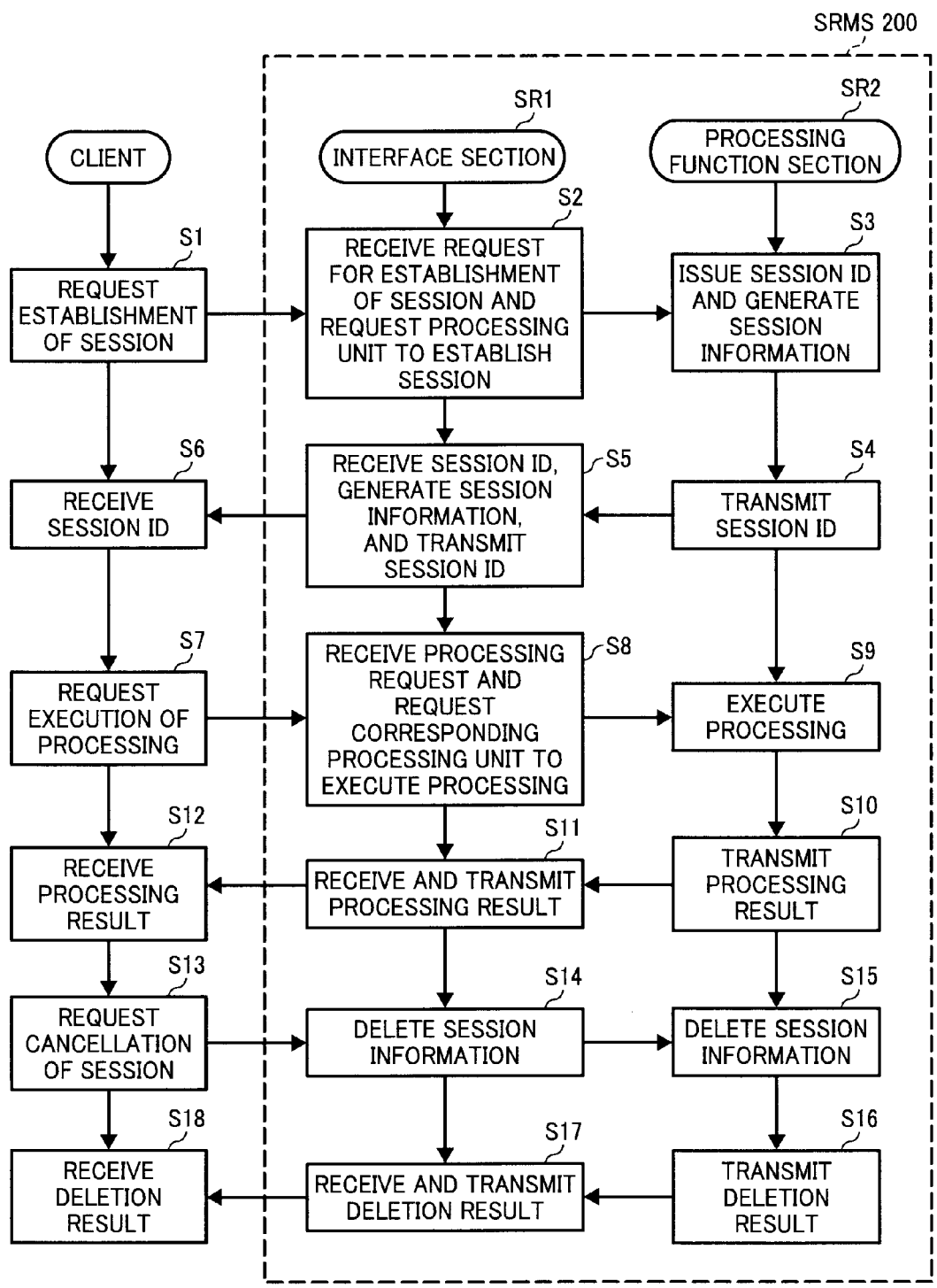
FIG. 11 is a flowchart of a procedure of basic processing of simple object access protocol (SOAP) communication performed by using a SOAP message in a Web service according to the embodiment.

FIG. 11 is a flowchart of a procedure of basic processing of SOAP communication performed by using a SOAP message in the Web service. In FIG. 11, for convenience of explanation, a communication partner of the SRMS 200 is represented as a client. However, the client is any one of the multifunction peripherals MFP other than the multifunction peripheral MFP and the personal computer PC.

First, the client requests the interface section SR1 of the SRMS 200 to establish a session (Step S1). The establishment of a session can be performed by using a module provided by NET Framework or AXIS explained above. The interface section SR1 can manage a session using the module. However, in this procedure, the interface section SR1 passes information to any one of the processing sections of the processing function section SR2 and the processing section independently manage the session. In such a technology, when the request for establishment of a session is received from the client, the interface section SR1 requests the processing function section SR2 to establish a session (Step S2). The processing function section SR2 receives the request for establishment of a session from the interface section SR1. The processing function section SR2 issues a session ID for managing the session and generates session information including information such as a term of validity of the session (Step S3). The processing function section SR2 transmits the session ID to the interface section SR1 (Step S4). The interface section SR1 receives the session ID. The interface section SR1 generates session information for managing the session ID and transmits the session ID to the client (Step S5). The client receives the session ID (Step S6). As a result, a session is established between the client and a server. While the session is established, the SRMS 200 can perform the respective kinds of processing explained above.

The client requests the interface section SR1 to execute the respective kinds of processing (Step S7). The interface section SR1 accesses an interface corresponding to the request from the client and requests the processing section (hereinafter, "object processing section") corresponding to the interface among the processing sections SR20 to SR28 of the processing function section SR2 to execute the processing (Step S8). When parameters are required for the execution of the processing, the client transmits, in requesting the execution of the processing, the parameters to the interface section SR1 serializing with a SOAP message. The interface section SR1 deserializes the SOAP message transmitted from the client to obtain the parameters and, in requesting the object processing section to execute the processing, passes the parameters to the object processing section. The client may pass, in requesting the execution of the processing, the session ID obtained at the time of the establishment of the session to the Web server. The interface section SR1 collates the session ID received from the client and session information held by the interface section SR1 and judges, for example, whether a session corresponding to the session ID exists and a term of validity of the session has not been expired. When there is no problem, the interface section SR1 passes the parameters passed by the client to the object processing section and waits for completion of the processing.

On the other hand, the object processing section executes the processing according to the processing execution request from the interface section SR1 (Step S9) and returns a processing result to the interface section SR1 through an interface corresponding to the object processing section (Step S10). The interface section SR1 receives the processing result from the object processing section. The interface section SR1 transmits the processing result to the client (Step S11). The client receives the processing result (Step S12). In finishing the session, the client requests the interface section SR1 to cancel the session (Step S13). The interface section SR1 deletes the session information managed by the interface section SR1 and requests the object processing section to cancel the session (Step S14). The object processing section deletes the session information in the same manner (Step S15) and transmits a deletion result indicating success of the deletion to the interface section SR1 (Step S16). The interface section SR1 transmits the deletion result to the client (Step S17). The client receives the deletion result (Step S18) and finishes the session between the client and the server. In finishing the session, according to the method used in establishing the session, the session may be managed by the module provided by NET Framework or AXIS or the object processing section may independently manage the session.

Details of operations of the respective interfaces performed at Steps S8 and S11 and operations of the respective processing sections performed at Steps S9 and S10 according the processing execution request at Step S17 are explained below.

Figure 12:
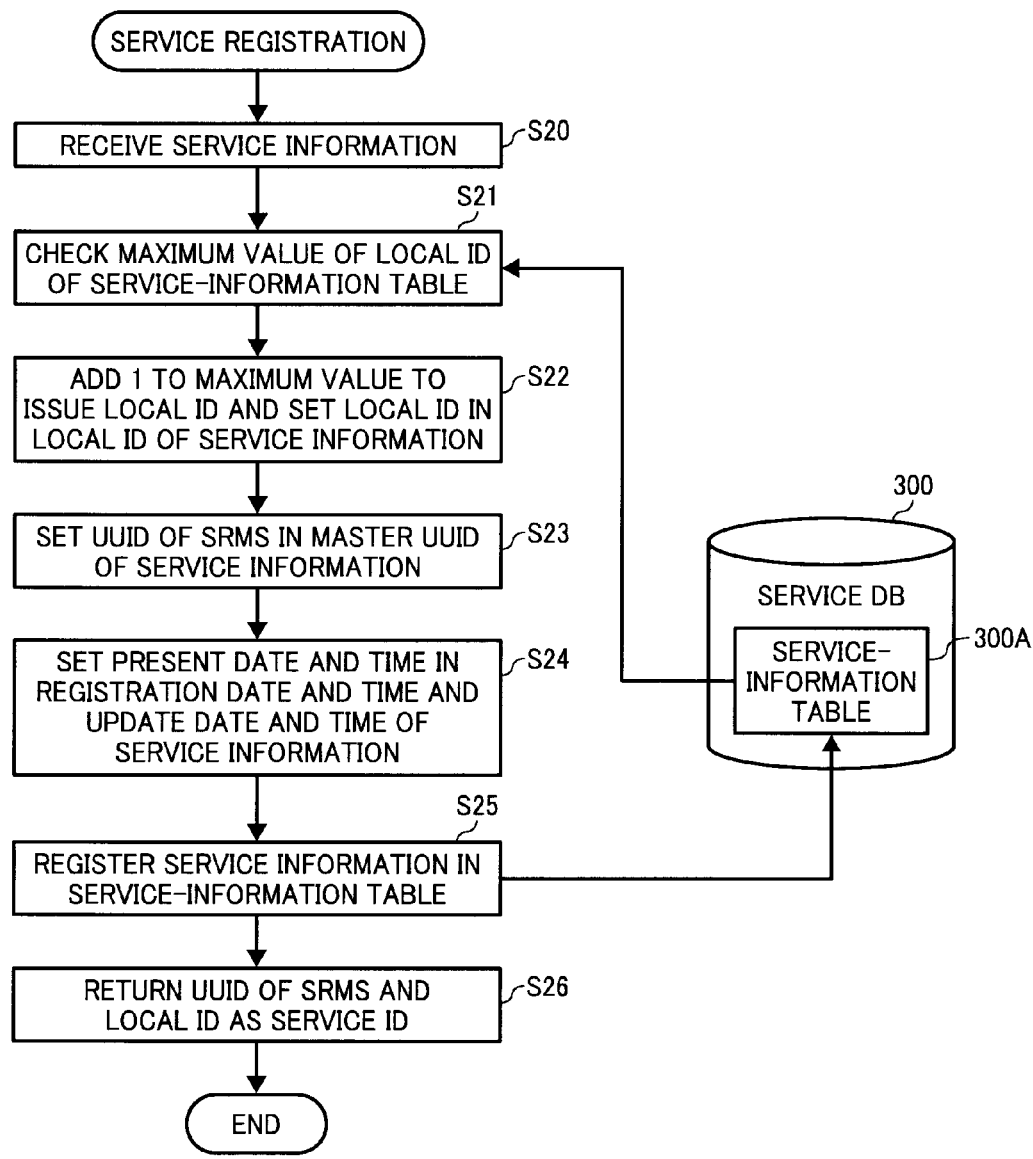
FIG. 12 is a flowchart of a procedure of service-registration processing realized by a service registration function according to the embodiment.

The service registration is a function of registering service information in the service-information table 300A stored in the service DB 300. FIG. 12 is a flowchart of a procedure of service-registration processing realized by the service registration function. First, the service-registration processing section SR20 receives service information from the client through the interface section SR1 (Step S20). The service-registration processing section SR20 checks a maximum value of a local ID of service information stored in the service-information table 300A (Step S21). For example, when the maximum value is "10", the service-registration processing section SR20 issues "11" as a new local ID and sets "11" in a local ID of the received service information (Step S22). The service-registration processing section SR20 sets a value of an UUID of the SRMS 200 including the processing section SR20 in a master UUID of the received service information (Step S23). As a result, a service ID, which is a combination of the UUID of the SRMS 200 and the local ID, is issued and associated with the service information. The UUID of the SRMS 200 has been issued during installation and stored in a storage device such as an HDD 18. The service-registration processing section SR20 acquires a present date and time using the timing function of the CPU 11 and sets the present date and time in a registration date and time and an update date and time of the received service information (Step S24). The service-registration processing section SR20 registers the service information, in which the respective kinds of information are set, in the service-information table 300A (Step S25). Subsequently, the service-registration processing section SR20 returns the UUID of the SRMS 200 and the issued service ID to the client as a request source through the interface section SR1 (Step S26).

Figure 13:
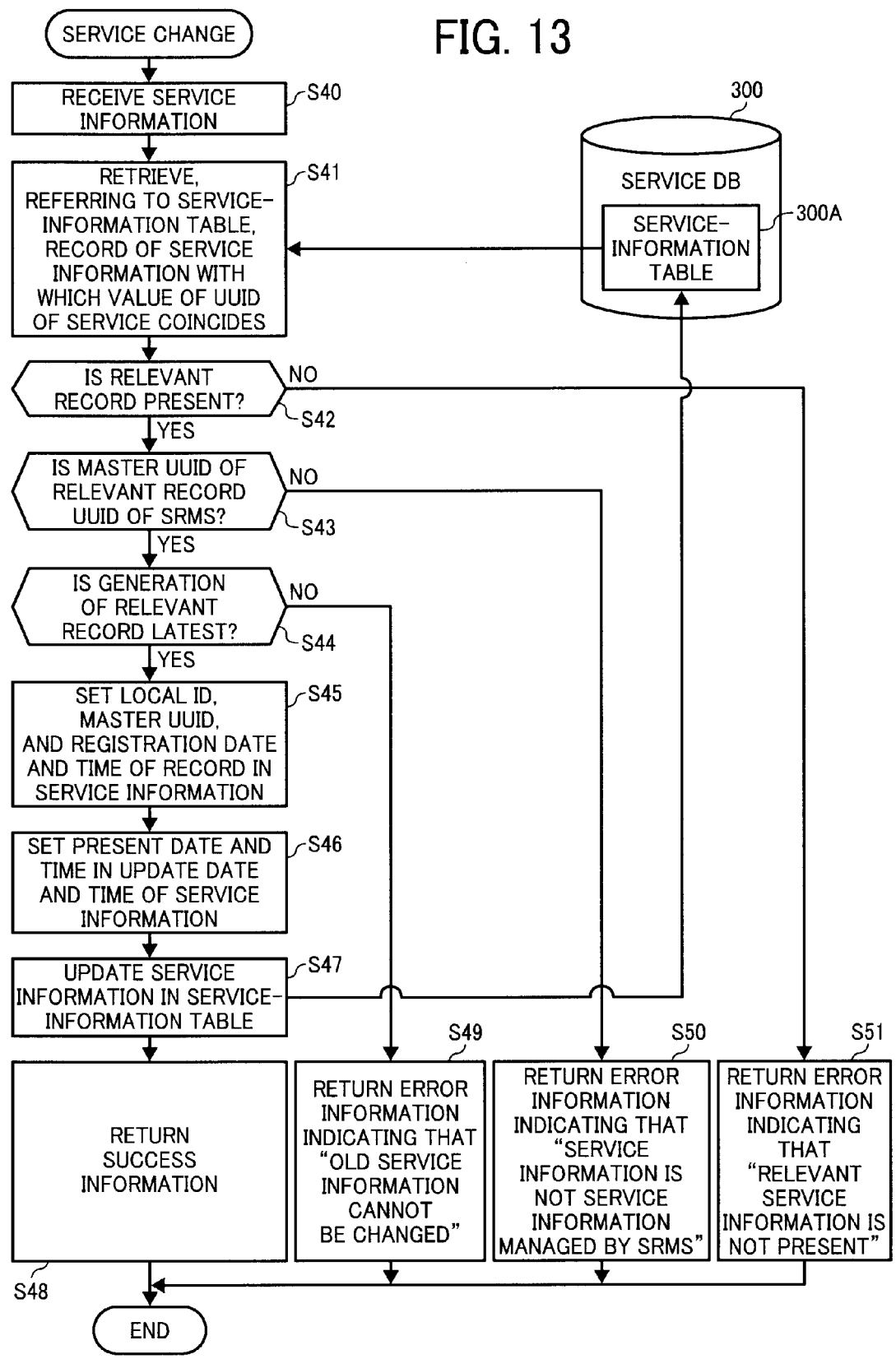
FIG. 13 is a flowchart of a procedure of service-change processing realized by a service change function according to the embodiment.

The service change is a function of changing service information registered in the service-information table 300A to new service information. FIG. 13 is a flowchart of a procedure of service-change processing realized by the service change function. The service-change processing section SR21 receives service information from the client through the interface of service change of the interface section SR1 (Step S40). The service-change processing section SR21 retrieves, referring to the service-information table 300A, a record of service information with which a value of a UUID of a service of the received service information coincides (Step S41). When a relevant record is not present ("NO" at Step S42), the service-change processing section SR21 returns error information indicating that "designated service information is not present" to the client as a request source (Step S51). When a relevant record exists ("YES" at Step S42), the service-change processing section SR21 judges, referring to a value of a master UUID of the record, whether the value coincides with a value of the UUID of the SRMS 200 (Step S43). When the values of the UUIDs do not coincide with each other ("NO" at Step S43), because the relevant record is service information acquired from the SRMSs 200 of the other multifunction peripherals MFP by the synchronization function explained later, the service-change processing section SR21 of the SRMS 200 cannot change the service information. Therefore, the service-change processing section SR21 returns error information indicating that "the service information is not service information managed by the SRMS" to the client (Step S50). When the values of the UUIDs coincide with each other ("YES" at Step S43), the service-change processing section SR21 discriminates whether a value of "generation" of the relevant record is a maximum value among values of records having "root ID" same as "root ID" of the record (Step S44). In other words, the service-change processing section SR21 discriminates whether service-change processing is about to be executed on service information of a latest generation. When the value of "generation" of the relevant record is not a maximum value ("NO" at Step S44), change object service information is service information in an old generation. Therefore, the service-change processing section SR21 returns error information indicating that "old service information cannot be changed" to the client (Step S49). When the values of the UUIDs coincide with each other ("YES" at Step S43), the service-change processing section SR21 sets a local ID, the master UUID, and a registration date and time of the record in the received service information (Step S45). This is for the purpose of preventing the local ID, the master UUID, and the registration date and time from being changed. The service-change processing section SR21 acquires a present date and time using the timing function of the CPU 11 and sets the present date and time in an update date and time of the received service information (Step S46). The service-change processing section SR21 updates (overwrites) the service-information table 300A with the service information in which the respective kinds of information are set as explained above (Step S47). Subsequently, the service-change processing section SR21 returns information indicating success of the processing to the client through the interface section SR1 (Step S48).

Figure 14:
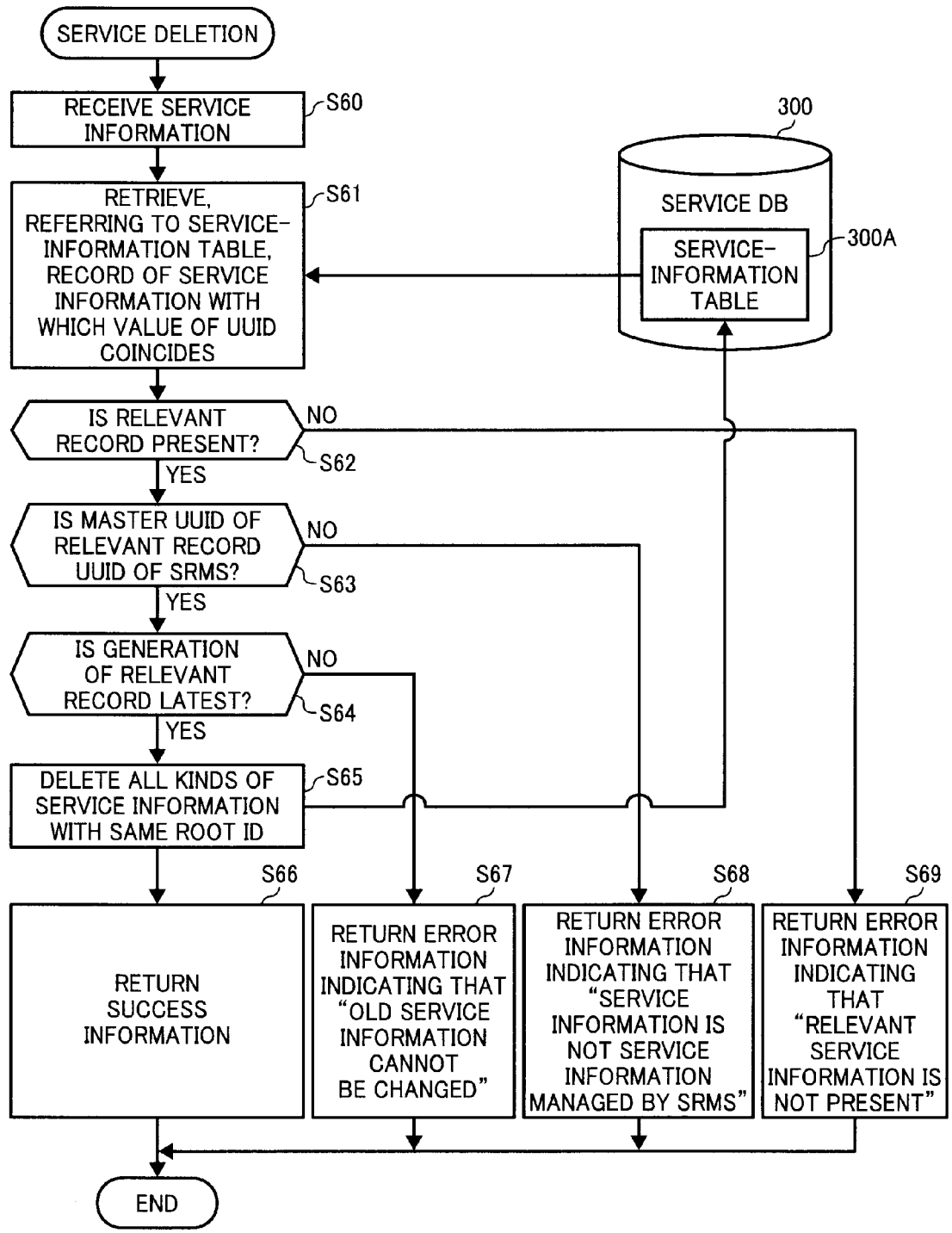
FIG. 14 is a flowchart of a procedure of service-deletion processing realized by a service deletion function according to the embodiment.

The service deletion is a function of deleting service information registered in the service-information table 300A. FIG. 14 is a flowchart of a procedure of service-deletion processing realized by the service deletion function. The service-deletion processing section SR22 receives a UUID of a deletion object service from the client through the interface section SR1 (Step S60). The service-deletion processing section SR22 retrieves, referring to the service-information table 300A, a record of service information with which a value of the received UUID coincides (Step S61). When a relevant record is not present ("NO" at Step S62), the service-deletion processing section SR22 returns error information indicating that "designated service information is not present" to the client as a request source (Step S69). When the relevant record exists ("YES" at Step S62), the service-deletion processing section SR22 judges, referring to a master UUID of the relevant record, whether the master UUID coincides with a value of the UUID of the SRMS 200 (Step S63). When the values of the UUIDs do not coincide with each other ("NO" at Step S63), the service-deletion processing section SR22 returns error information indicating that "the service information is not service information managed by the SRMS" to the client (Step S68). When the values of the UUIDs coincide with each other ("YES" at Step S63), the service-deletion processing section SR22 discriminates whether a value of "generation" of the relevant record is a maximum value among values of records having "root ID" same as "root ID" of the record (Step S64). In other words, the service-deletion processing section SR22 discriminates whether service-deletion processing is about to be executed on service information of a latest generation. When the value of "generation" of the relevant record is not a maximum value ("NO" at Step S64), deletion object service information is service information in an old generation. Therefore, the service-deletion processing section SR22 returns error information indicating that "old service information cannot be deleted" to the client (Step S67). When the value of "generation" of the relevant record is a largest value ("YES" at Step S64), the deletion object service information is service information in a latest generation. Therefore, the service-deletion processing section SR22 deletes all the records having "root ID" same as "root ID" of the record (Step S65). In other words, the service-deletion processing section SR22 deletes all kinds of history information of the relevant service information. Subsequently, the service-deletion processing section SR22 returns success information indicating success of the processing to the client through the interface unit SR1 (Step S66).

Figure 15:
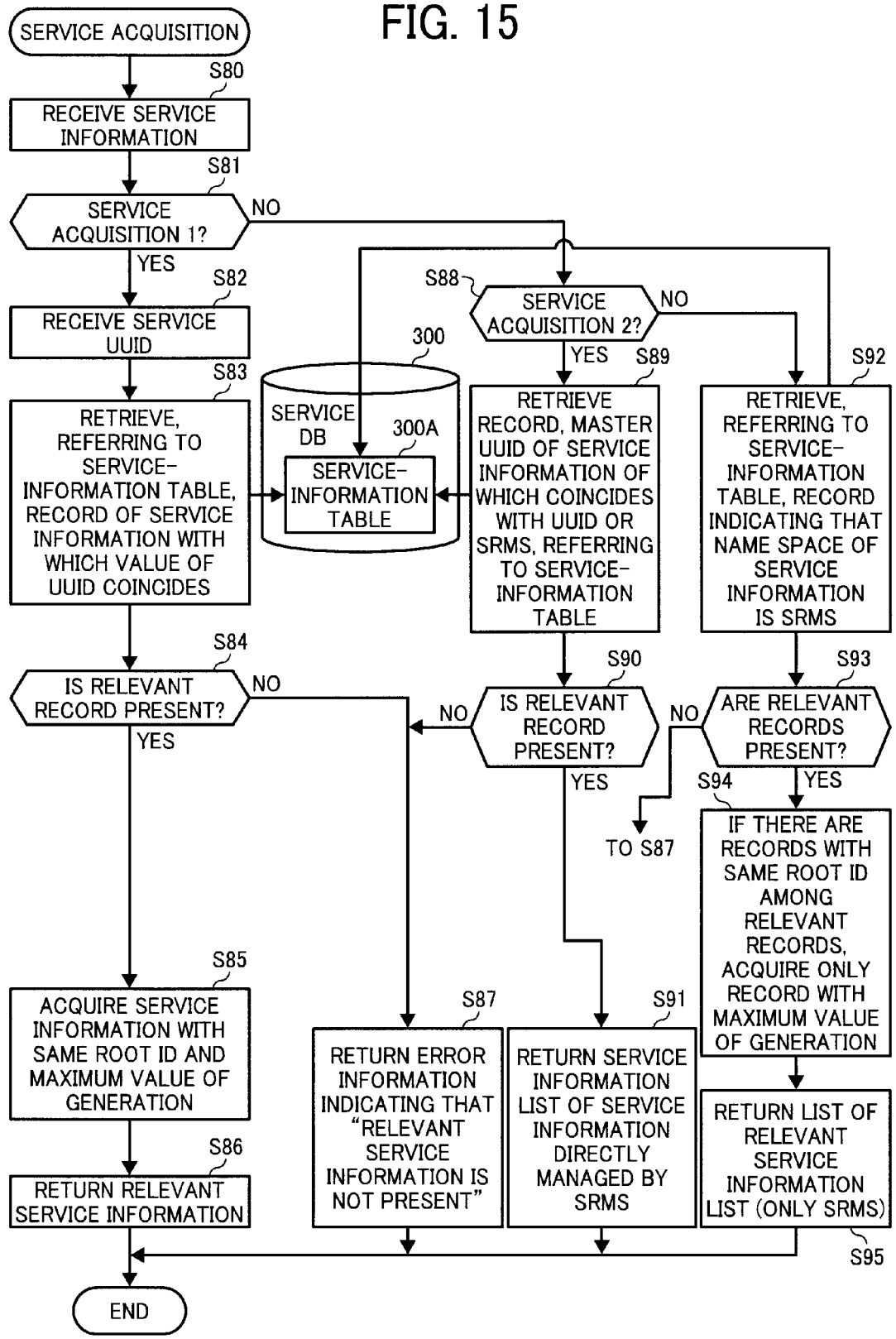
FIG. 15 is a flowchart of a procedure of a service-acquisition processing realized by a service acquisition function according to the embodiment.

The service acquisition is a function of acquiring service information registered in the service-information table 300A. The service acquisition function is subdivided into three interfaces. These interfaces are referred to as service acquisitions 1 to 3, respectively. The service acquisition 1 is a function of acquiring service information designating a UUID of a service of the service information. The service acquisition 2 is a function of acquiring a list of service information directly managed by the SRMS 200 without designating a UUID of a service of the service information. It is possible to discriminate whether the SRMS 200 directly manages service information according to whether a master UUID of the service information coincides with a value of the UUID of the SRMS 200. It is possible to discriminate whether the SRMS 200 directly manages service information according to whether a master UUID of the service information coincides with a value of the UUID of the SRMS 200. The service acquisition 3 is a function of acquiring a list of only service information of the SRMS 200 in the service-information table 300A. FIG. 15 is a flowchart of a procedure of service-acquisition processing realized by the service acquisition function. First, the service-acquisition processing section SR23 receives a service acquisition request from the client through the interface section SR1 (Step S80). The service-acquisition processing section SR23 discriminates a type of the requested service acquisition (Steps S81 and S87). When the service acquisition request is a request for the service acquisition 1 ("YES" at Step S81), the service-acquisition processing section SR23 receives a UUID of a service of acquisition object service information (Step S82). The service-acquisition processing section SR23 retrieves, referring to the service-information table 300A, a record of service information with which a value of the received UUID coincides (Step S83). When a relevant record is not present ("NO" at Step S84), the service-acquisition processing section SR23 returns error information indicating that "relevant service information is not present" to the client as a request source (Step S86). When a relevant record exists ("YES" at Step S84), the service-acquisition processing section SR23 returns service information as the relevant record to the client through the interface section SR1 (Step S85). When a relevant record is present ("YES" at Step S84), the service-acquisition processing section SR23 further retrieves a record with a maximum value of "generation" among records having "root ID" same as "root ID" of the record (Step S85). This record is service information in a latest generation. The service-acquisition processing section SR23 returns the service information in the latest generation to the client through the interface section SR1 (Step S86).

When the service acquisition request is a request for the service acquisition 2 ("NO" at Step S81 and "YES" at Step S88), unlike the case of the service acquisition 1, the service-acquisition processing section SR23 does not receive parameters such as the UUID of the service of the acquisition object service information. The service-acquisition processing section SR23 retrieves a record, a master UUID of service information of which coincides with the UUID of the SRMS 20, referring to the service-information table 300A (Step S89). When a relevant record is not present ("NO" at Step S90), the service-acquisition processing section SR23 returns error information indicating that "relevant service information is not present" to the client (Step S87). When relevant records are present ("YES" at Step S90), the service-acquisition processing section SR23 forms a list of the relevant records and returns the list to the client as a service information list through the interface section SR1 (Step S91).

When the service acquisition request is a request for the service acquisition 3 ("NO" at Step S81 and "NO" at Step S88), unlike the case of the service acquisition 1, the service-acquisition processing section SR23 does not receive parameters such as the UUID of the service of the acquisition object service information. The service-acquisition processing section SR23 retrieves, referring to the service-information table 300A, a record indicating that a name space of service information is "SRMS" (e.g., jp.co.ricoh.srms) (Step S92). When a relevant record is not present ("NO" at Step S93), the service-acquisition processing section SR23 returns error information indicating that "relevant service information is not present" to the client as a request source (Step S87). When relevant records are present ("YES" at Step S93), the service-acquisition processing section SR23 extracts a record having a maximum value of "generation" (service information in a latest generation) out of records having "root ID" same as "root ID" of the relevant records (Step S94). When there are a plurality of records having different "root IDs", the service-acquisition processing section SR23 performs the processing for each of "root IDs". The service-acquisition processing section SR23 forms a list of the service information in the latest generation and returns the list to the client through the interface section SR1 as a service information list (Step S95).

Figure 16:
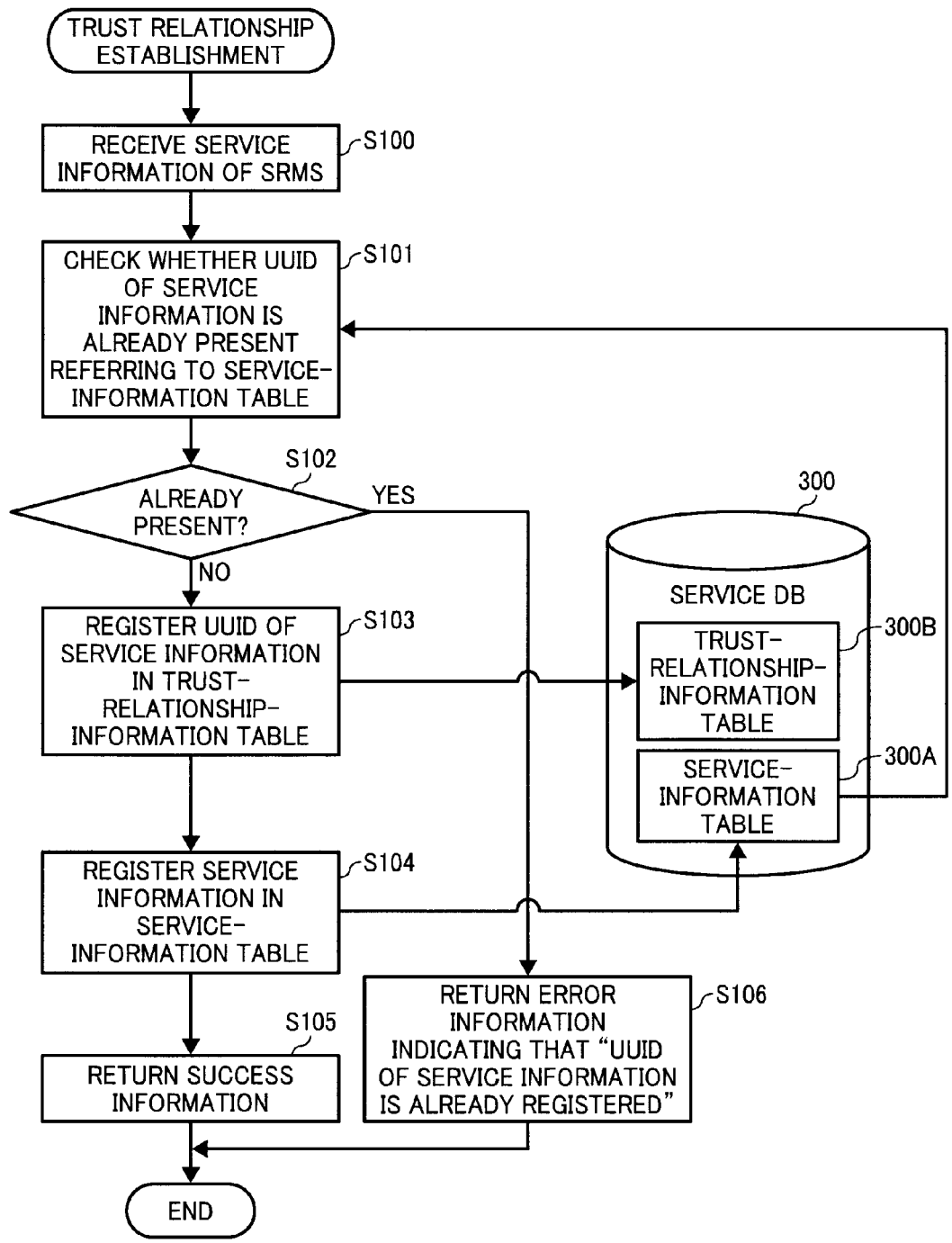
FIG. 16 is a flowchart of a procedure of trust relationship establishment processing realized by a trust relationship establishment function according to the embodiment.

The trust relationship establishment is a function of registering services managed by the SRMSs 200 of the other multifunction peripherals MFP, which form a trust relationship with the SRMS 200 of the multifunction peripheral MFP, in the service-information table 300A of the multifunction peripheral MFP. Specifically, forming a trust relationship means that the SRMS 200 exchanges service information with the other SRMSs 200 and forms a relationship capable of synchronizing service information with the other SRMSs 200. FIG. 16 is a flowchart of a procedure of trust relationship establishing processing realized by the trust relationship establishment function. First, the trust-relationship-establishment processing section SR24 receives a trust relationship establishment request from the client through the interface section SR1 and receives service information of the other SRMSs 200 with which the SRMS 200 forms a trust relationship (Step S100). The trust-relationship-establishment processing section SR24 judges, referring to the service-information table 300A and referring to a UUID of a service of the service information, whether a value of the UUID is already present in the trust-relationship-information table 300B (Step S101). When a value of a relevant UUID is already present ("YES" at Step S102), the trust-relationship-establishment processing section SR24 returns error information indicating that the "a value of the UUID is already registered" to the client as a request source (Step S106). When a value of a relevant UUID is not present ("NO" at Step S102), the trust-relationship-establishment processing section SR24 registers the value of the relevant UUID in the trust-relationship-information table 300B (Step S103). The trust-relationship-establishment processing section SR24 registers service information having the relevant UUID in the service-information table 300A (Step S104). This is because it is necessary to refer to service information of a synchronization object SRMS 200 in synchronization processing explained later. Subsequently, the trust-relationship-establishment processing section SR24 returns success information indicating success of the processing to the client through the interface section SR1 (Step S105).

Figure 17:
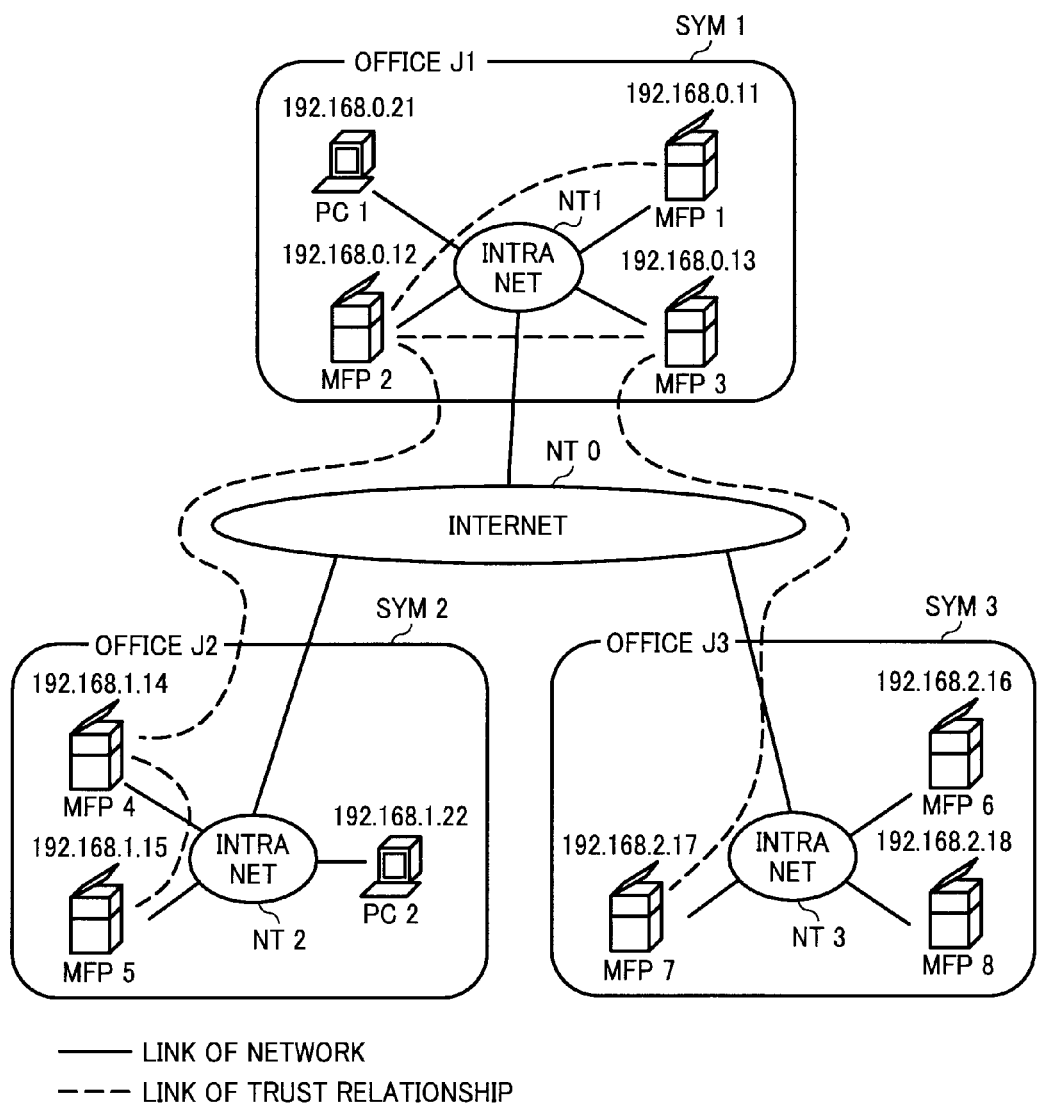
FIG. 17 is a schematic diagram of a relation among multifunction peripherals MFP that form a trust relationship in the image processing system shown in FIG. 1.

FIG. 17 is a schematic diagram of a relation among the multifunction peripherals MFP that form a trust relationship in the image processing system shown in FIG. 1. In the figure, the multifunction peripherals MFP connected by dotted lines form a trust relationship. For example, the multifunction peripheral MFP1 forms a trust relationship with the multifunction peripheral MFP2. The multifunction peripheral MFP 2 forms a trust relationship with the multifunction peripherals MPF1, MFP3, and MFP4. The multifunction peripheral MFP3 forms a trust relationship with the multifunction peripherals MFP2 and MFP7. The multifunction peripheral MFP4 forms a trust relationship with the multifunction peripherals MFP2 and MFP5. The multifunction peripheral MFP5 forms a trust relationship with the multifunction peripheral MFP4. The multifunction peripheral MFP7 forms a trust relationship with the multifunction peripherals MFP3 and MFP8. The multifunction peripheral MFP 8 forms a trust relationship with the multifunction peripheral MFP7. The multifunction peripheral MFP6 does not form a trust relationship with the other multifunction peripherals MRP1 to MFP5.

FIG. 18 a diagram of a state of a service-information table 300A_3 of the multifunction peripheral MFP3 that has the trust relationship explained above in the image processing system. FIG. 19 is a diagram of a state of a service-information table 300A_7 of the multifunction peripheral MFP7 that has the trust relationship explained above in the image processing system. The multifunction peripheral MFP3 forms the trust relationship with the multifunction peripherals MFP2 and MFP7. Therefore, in the service-information table 300A of the multifunction peripheral MFP3, respective kinds of service information of an SRMS 200_2, a PIDS 201_2, and an EIDS 202_2 directly managed by the SRMS 200_2 of the multifunction peripheral MFP2 and respective kinds of service information of an SRMS 200_7, a PIDS 201_7, and an EIDS 202_7 directly managed by the SRMS 200_7 of the multifunction peripheral MFP7 are stored in addition to respective kinds of service information of an SRMS 200_3, a PIDS 201_3, and an EIDS 202_3 directly managed by the SRMS 200_3. Similarly, the multifunction peripheral MFP7 forms the trust relationship with the multifunction peripherals MFP3 and MFP8. Therefore, in the service-information table 300A_7 of the multifunction peripheral MFP7, respective kinds of service information of the SRMS 200_3, the PIDS 201_3, and the EIDS 202_3 directly managed by the SRMS 200_3 of the multifunction peripheral MFP3 and respective kinds of service information of an SRMS 200_8, a PIDS 201_8, and an EIDS 202_8 directly managed by the SRMS 200_8 of the multifunction peripheral MFP 8 are stored in addition to respective kinds of service information of the SRMS 200_7, the PIDS 201_7, and the EIDS 202_7 directly managed by the SRMS 200_7 of the multifunction peripheral MFP7. As explained above, in the service-information table 300A, other than service information directly managed by the SRMSs 200 in the same multifunction peripheral MFP, service information directly managed by the SRMSs 200 of the other multifunction peripherals MFP that form a trust relationship with the multifunction peripheral MFP are stored. Acquisition of service information directly managed by the other SRMSs 200 is realized by the synchronization function explained later. Consequently, the multifunction peripheral MFP can retrieve, using a function of the scan application 101 explained later, relevant service information out of not only the service information directly managed by the SRMS 200 of the multifunction peripheral MFP but also the service information directly managed by the SRMSs 200 of the other multifunction peripherals MFP and reach an electronic document as a print source using the service information. The multifunction peripheral MFP6 that forms a trust relationship with none of the other multifunction peripherals MFP1 to MFP5 can retrieve the service information stored in the other multifunction peripherals MFP1 to MFP5 using a service retrieval function explained later.

Figure 20:
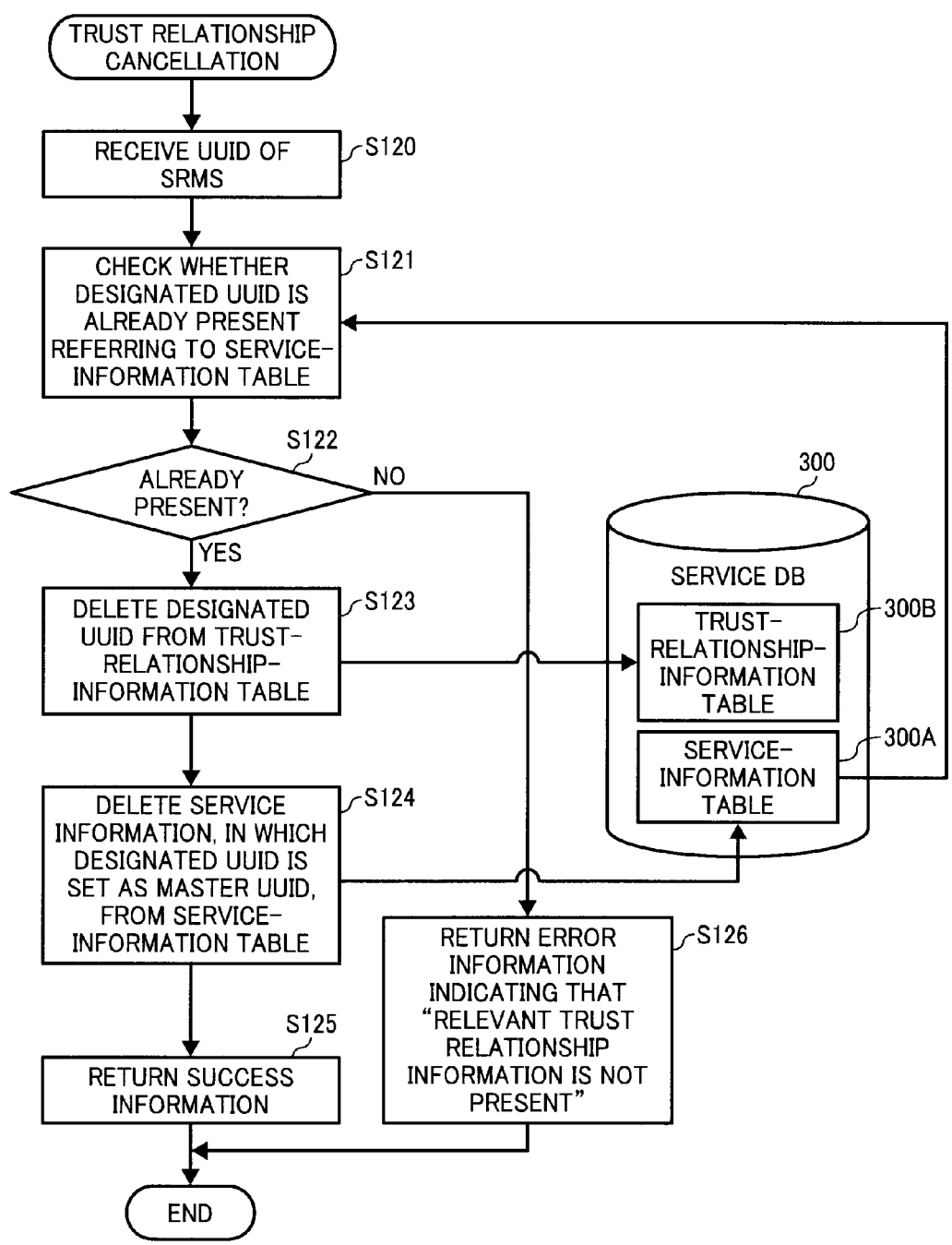
FIG. 20 is a flowchart of a procedure of trust relationship cancellation processing realized by a trust relationship cancellation function according to the embodiment.

The trust relationship cancellation is a function of canceling a trust relationship already formed with the other multifunction peripherals MFP. Canceling a trust relationship means deleting trust relationship information of the SRMSs 200 of the other multifunction peripherals MFP registered in the trust-relationship-information table 300B. FIG. 20 is a flowchart indicating a procedure of trust relationship cancellation processing realized by the trust relationship cancellation function. First, the trust-relationship-cancellation processing section SR25 receives a UUID of the SRMS 200, trust relationship information of which is deleted, from the client through the interface section SR1 (Step S120). The trust-relationship-cancellation processing section SR25 judges whether a value of the received UUID exists in the trust-relationship-information table 300B (Step S121). When a value of a relevant UUID is not present ("NO" at Step S122), the trust-relationship-cancellation processing section SR25 returns error information indicating that "relevant trust relationship information is not present" to the client as a request source (Step S126). When a value of a relevant UUID exists ("YES" at Step S122), the value of the relevant UUID is equivalent to the trust relationship information, the trust-relationship-cancellation processing section SR25 deletes the value of the UUID from the trust-relationship-information table 300B (Step S123). Moreover, the trust-relationship-cancellation processing section SR25 deletes all kinds of service information, values of master UUIDs of which coincide with the value of the UUID of a service, from the service-information table 300A (Step S124). Subsequently, the trust-relationship-cancellation processing section SR25 returns success information indicating success of the processing to the client through the interface section SR1 (Step S125).

Figure 21:
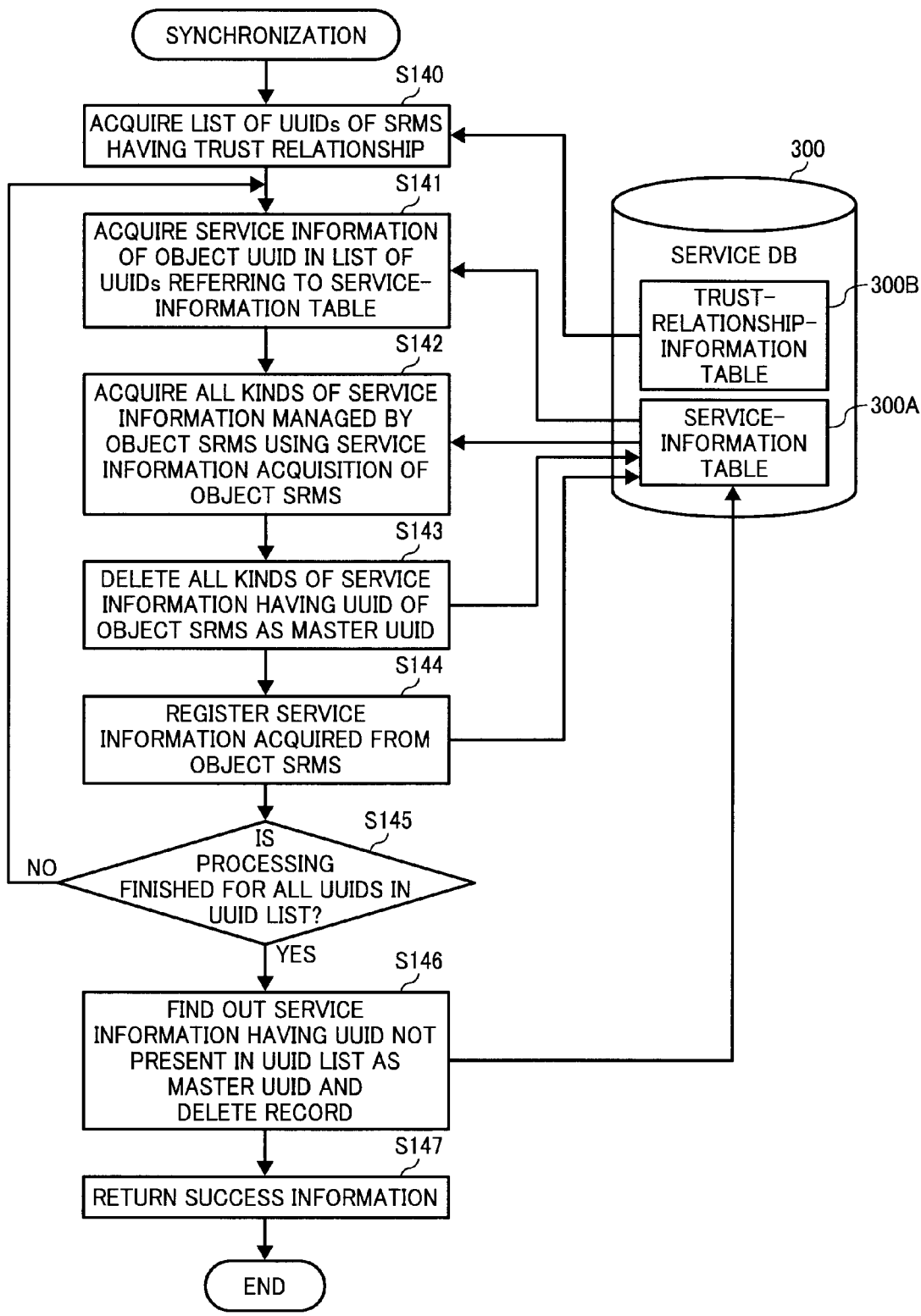
FIG. 21 is a flowchart of a procedure of trust relationship cancellation processing realized by a synchronization function according to the embodiment.

The synchronization is a function of exchanging service information with the SRMSs 200 of the other multifunction peripherals MFP with which the multifunction peripheral MFP forms a trust relationship, i.e., the SRMSs 200 of the other multifunction peripherals MFP, UUIDs of which are registered in the trust-relationship-information table 300B, and synchronizing the service information. FIG. 21 is a flowchart of a procedure of synchronization processing realized by the synchronization function. The synchronization processing section SR26 does not receive parameters such as a UUID of a service of service information to be synchronized. The synchronization processing section SR26 receives, referring to the trust-relationship-information table 300B, a list of UUIDs (a UUID list) of the SRMSs 200 of the other multifunction peripherals MFP with which the multifunction peripheral MFP forms a trust relationship (Step S140). The synchronization processing section SR26 applies processing explained below to each of all the UUIDs in the list. First, the synchronization processing section SR26 acquires a UUID of processing object service information referring to the service-information table 300A (Step S141). The synchronization processing section SR26 accesses the URI referring to a URI of the service information to thereby make connection to the other SRMSs 200 as synchronization objects. The synchronization processing section SR26 acquires the list of service information directly managed by the other SRMSs 200 as the synchronization objects using the service acquisition function in the other SRMSs 200 as the synchronization objects (Step S142). Subsequently, the synchronization processing section SR26 deletes all kinds of service information, values of master UUIDs of which coincide with a value of the UUID of the processing object service information, from the service-information table 300A (Step S143). The synchronization processing section SR26 registers all the kinds of service information present in the list acquired from the other SRMSs 200 as the synchronization objects in the service-information table 300A (Step S144). The synchronization processing section SR26 applies the processing at Steps S141 to S144 to all the UUIDs present in the UUID list. When the processing is finished for all the UUIDs present in the UUID list ("YES" at Step S145), the synchronization processing section SR26 retrieves service information having a master UUID that coincides with a value of a UUID not present in the UUID list from the service-information table 300A and deletes the service information from the service-information table 300A (Step S146). Consequently, the service information of the other SRMSs 200, a trust relationship of which is canceled, is deleted from the service-information table 300A. Finally, the synchronization processing section SR26 returns success information indicating success of the processing to the client as a request source through the interface section SR1 (Step S147).

Figure 22:
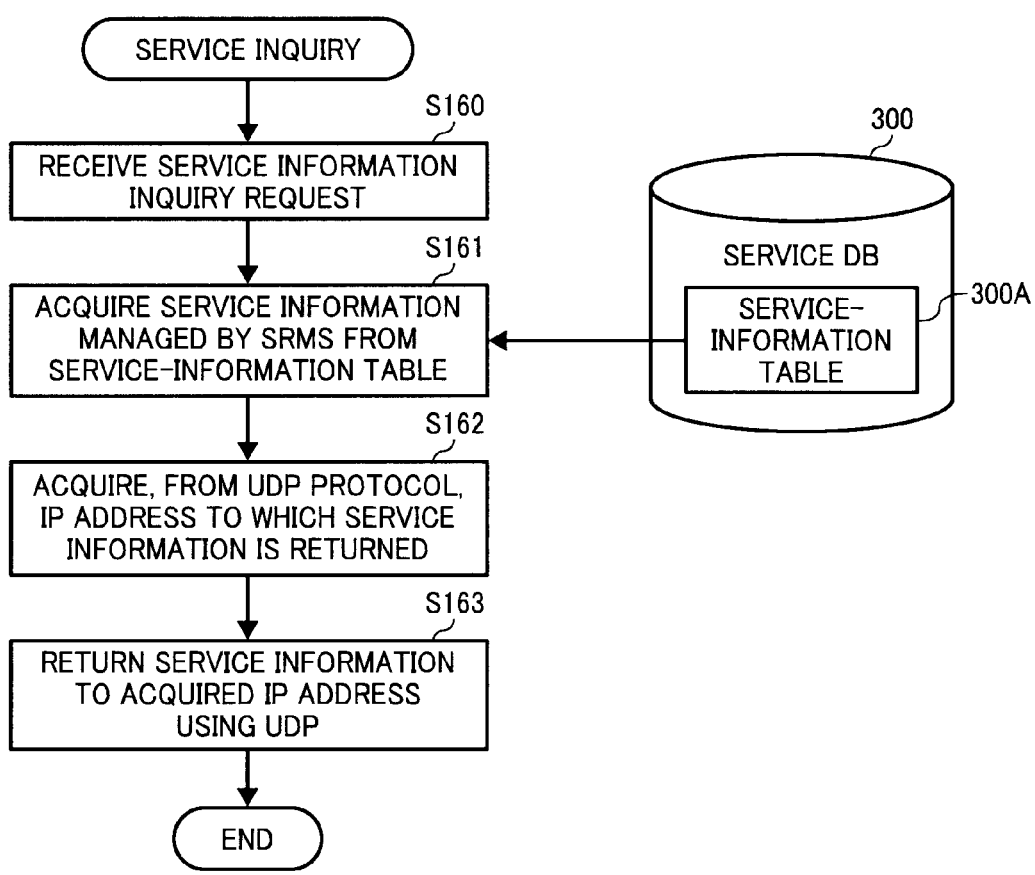
FIG. 22 is a flowchart of a procedure of service-inquiry processing realized by a service inquiry function according to the embodiment.

The service inquiry is a function of receiving inquiries about service information from the other SRMSs 200 and returning the service information to the other SRMSs 200. FIG. 22 is a flowchart of a procedure of service-inquiry processing realized by the service inquiry function. In the service inquiry, data communication is performed by using the UDP instead of the Web service. The data communication performed by using the UDP is known. Therefore, explanation of a detailed procedure of the data communication is omitted. In a procedure explained below, the SRMS 200 of the multifunction peripheral MFP performs data communication with a client same as that in the data communication performed by using the Web service and performs processing.

The service-inquiry processing section SR28 receives a service inquiry request from the client with the UDP (Step S160). The service-inquiry processing section SR28 starts the processing. Parameters used for the processing are not included in the service inquiry request. An IP address of the client as a request source is included in the service inquiry request. Subsequently, the service-inquiry processing section SR28 acquires service information of the SRMS 200 referring to the service-information table 300A (Step S161). The service-inquiry processing section SR28 acquires the IP address included in the service inquiry request (Step S162) and returns the service information to the IP address with the UDP (Step S163). Consequently, the SRMSs 200 of the other multifunction peripherals MFP as request sources can acquire the service information of the SRMS 200.

Figure 23:
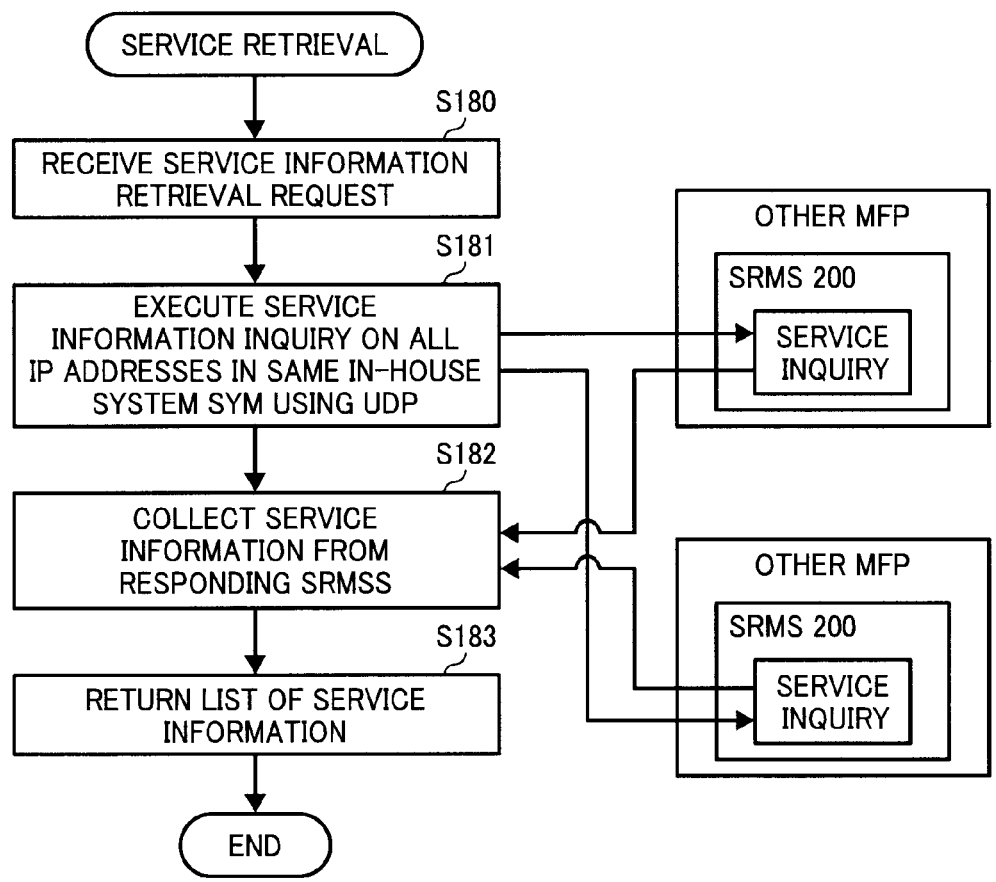
FIG. 23 is a flowchart of a procedure of service-retrieval processing realized by a service retrieval function according to the embodiment.

The service retrieval is a function of inquiring the other SRMSs 200 about service information and acquiring service information of the other SRMSs 200. FIG. 23 is a flowchart of a procedure of service-retrieval processing realized by the service retrieval function.

The service-retrieval processing section SR27 receives a service retrieval request from the client using the UDP (Step S180) and starts the processing. The service-retrieval processing section SR27 does not receive parameters used for the processing. Subsequently, the service-retrieval processing section SR27 transmits, using the UDP, the service inquiry request to all IP addresses in the same in-house system SYM as the multifunction peripheral MFP having the SRMS 200, i.e., to the multifunction peripherals MFP and the personal computers PC in the same in-house system SYM (Step S181). The service-retrieval processing section SR27 transmits a UDP packet to IP addresses of all the multifunction peripherals MFP in the image processing system and receives responses only from the SRMSs 200 present in the same in-house system SYM as the multifunction peripheral MFP having the SRMS 200. On the other hand, the SRMSs 200 of the other multifunction peripherals MFP that receive the service inquiry request perform the service-inquiry processing explained above and return service information managed by the other SRMSs 200 to the SRMS 200. In an example in FIG. 23, service information is returned to the SRMS 200 from the other two SRMSs 200. As a result, the service-retrieval processing section SR27 of the SRMS 200 collects service information from the other SRMSs 200 (Step S182), forms a list of the collected service information, and returns the list to the client as a request source as a service information list (Step S183). Consequently, for example, like the multifunction peripheral MFP6 shown in FIG. 17, even when the multifunction peripheral MFP has no trust relationship with all the other multifunction peripherals MFP and, therefore, service information directly managed by the other SRMSs 200 is not stored in the service-information table 300A of the multifunction peripheral MFP, the multifunction peripheral MFP can acquire service information managed by the SRMSs 200 of the other multifunction peripherals MFP using the service retrieval function.

Figure 24:
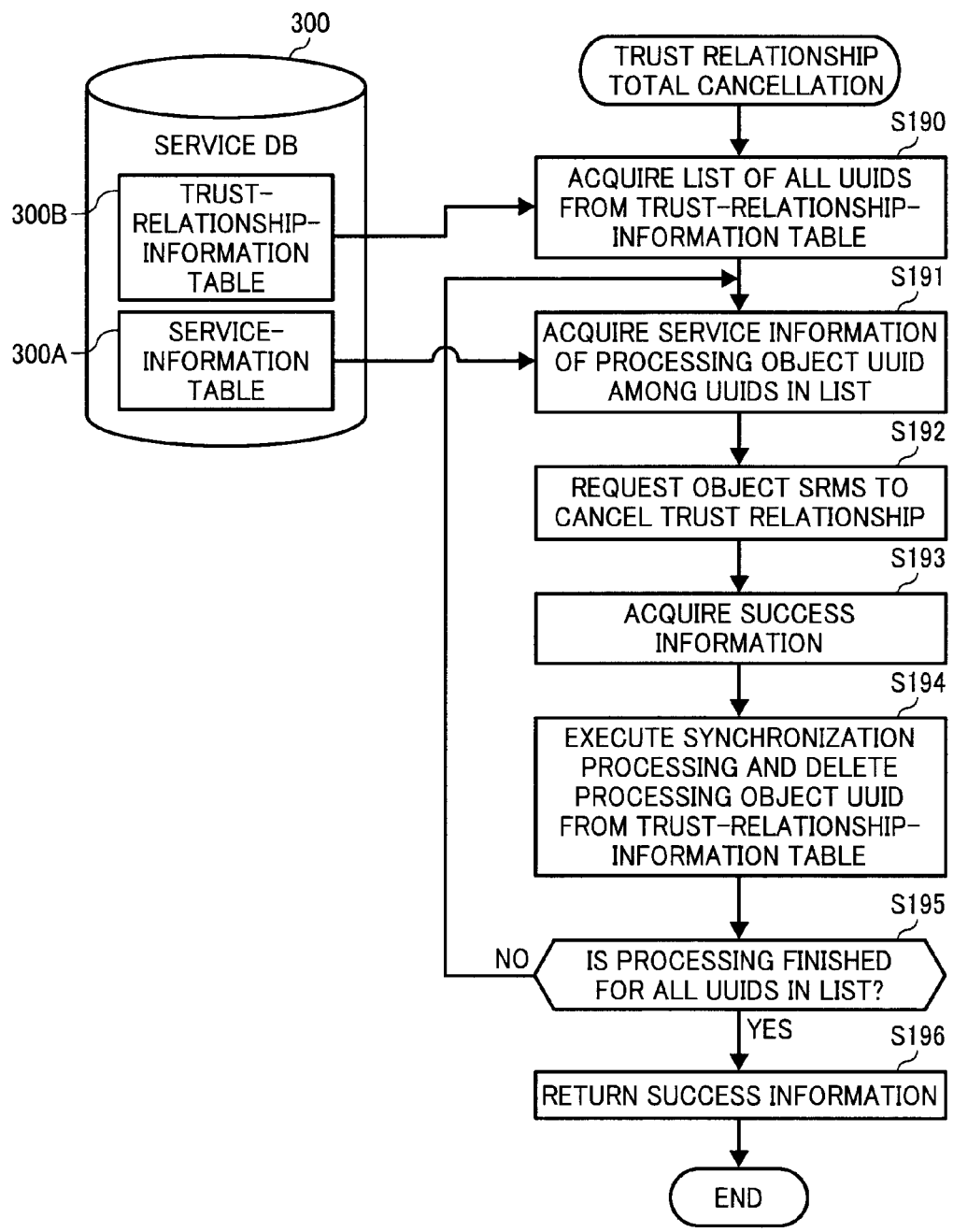
FIG. 24 is a flowchart of a procedure of a trust relationship total cancellation processing realized by a trust relationship total cancellation function according to the embodiment.

The trust relationship total cancellation is a function of canceling all trust relationships with all the other multifunction peripherals MFP, with which the multifunction peripheral MFP forms trust relations, at a time according to a request from the integration-information collection 103A of the service integration application 103. FIG. 24 is a flowchart of a procedure of trust relationship total cancellation processing realized by a trust relation total cancellation function.

The trust-relationship-total-cancellation processing section SR29 is requested to execute trust relationship total cancellation by the integration-information merge 103B of the service integration application 103. Then, the trust-relationship-total-cancellation processing section SR29 acquires a list of UUIDs of the SRMSs 200 included in all the other multifunction peripherals MFP, which is stored in a trust-relationship-information table 300B (Step S190). The trust-relationship-total-cancellation processing section SR29 starts the processing without receiving parameters used for the processing. The trust-relationship-total-cancellation processing section SR29 applies processing explained below to the respective UUIDs in the acquired list. First, the trust-relationship-total-cancellation processing section SR29 acquires, referring to the service-information table 300A, service information corresponding to a processing object UUID (service information of the SRMS 200_4) (Step S191). The trust-relationship-total-cancellation processing section SR29 accesses, referring to "URI" of the acquired service information, the processing object SRMS 200 specified by the service information (the SRMS 200_4). The trust-relationship-total-cancellation processing section SR29 requests the SRMS 200_4 to execute trust relationship cancellation and transmits a UUID of the SRMS 200 having the trust-relationship-total-cancellation processing section SR29 (the SRMS 200_5) (Step S192).

The processing object SRMS 200_4 deletes a UUID of the SRMS 200_5 from a trust information table 300B_4 using the trust relationship cancellation function. The processing object SRMS 200_4 also deletes all kinds of service information, in master UUIDs of which a value of the UUID is set, from the service-information table 300A_4. The processing object SRMS 200_4 returns success information indicating success of the processing to the SRMS 200_5. As a result, all kinds of service information directly managed by the SRMS 200_5 are deleted from the service-information table 300A_4 managed by the SRMS 200_4.

On the other hand, the SRMS 200_5 acquires the success information from the SRMS 200_4 (Step S193). The SRMS 200_5 deletes a value of a UUID of the SRMS 200_4, a trust relationship with which is cancelled, from the trust-relationship-information table 200_5 managed by the SRMS 200_5 (Step S194). The trust-relationship-total-cancellation processing unit SR29 applies the processing explained above to all the UUIDs in the list acquired at Step S190 and cancels trust relations with all the other multifunction peripherals MFP with which the multifunction peripheral forms the trust relations. When the processing is finished for all the UUIDs ("YES" at Step S195), the trust-relationship-total-cancellation processing section SR29 returns success information indicating to that effect to the service integration application 103 (Step S196).

Figure 25:
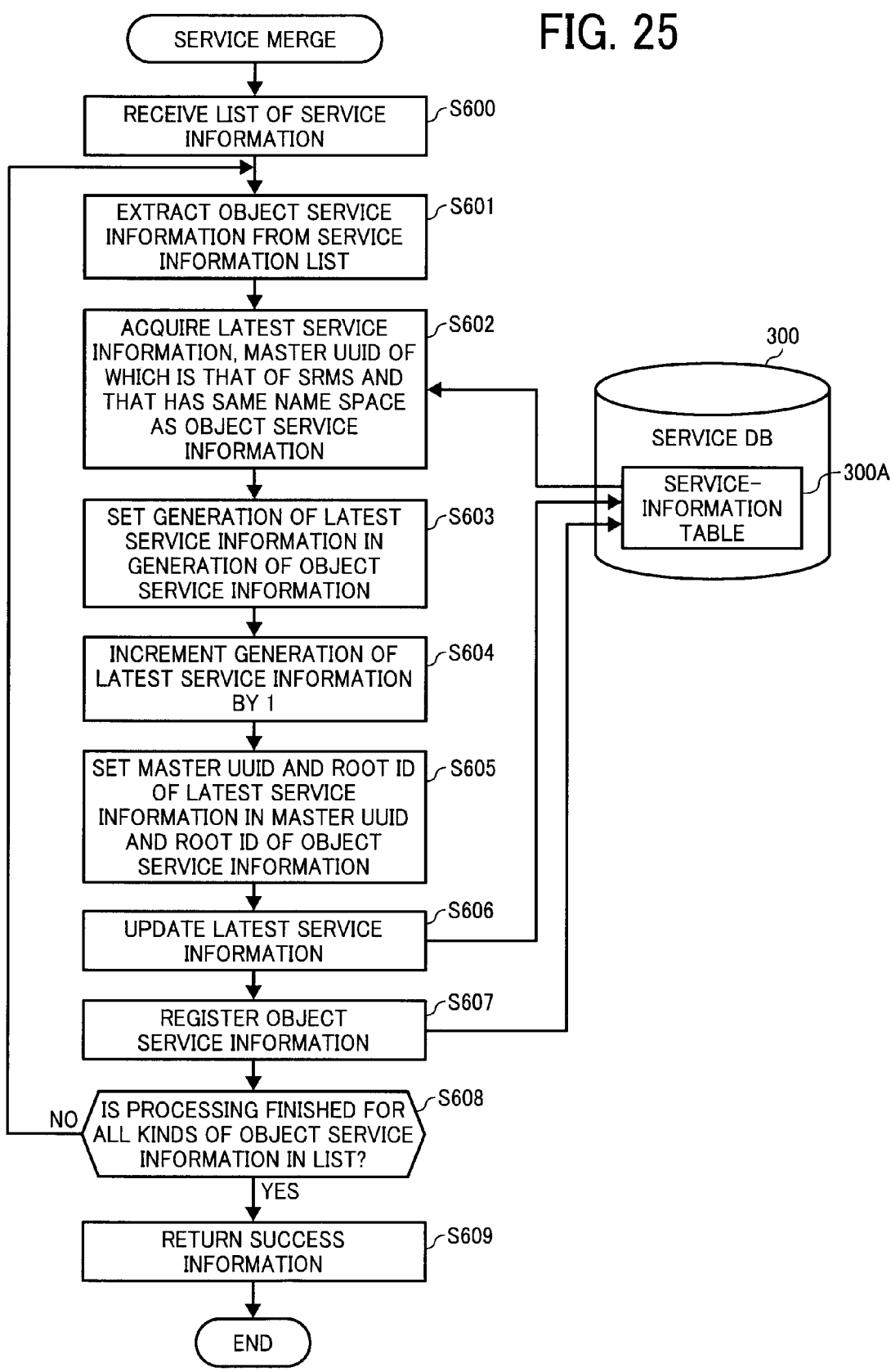
FIG. 25 is a flowchart of a procedure of service-merge processing realized by a service merge function according to the embodiment.

The service merge is a function of merging respective kinds of service information concerning the SRMS 200, the PIDS 201, and the EIDS 202 included in the integration object multifunction peripheral MFP according to a request from the integration-information merge 103B of the service integration application 103. FIG. 25 is a flowchart of a procedure of service-merge processing realized by a service merge function. For example, service information directly managed by the SRMS 200_5 included in the multifunction peripheral MFP5 shown in FIG. 1 (respective kinds of service information concerning the SRMS 200_5, the PIDS 201_5, and the EIDS 202_5) is merged in a service-information table 300A_4 held by the multifunction peripheral MFP4. A service-merge processing section SR30_4 included in the multifunction peripheral MFP4 receives a list of integration object service information from integration-information merge 103B_4 of the service integration application 103_4 (Step S600). A specific procedure of an operation of the integration-information merge 103B of the service integration application 103 for passing the integration object service information to the service-merge processing section SR30_4 is explained later. FIG. 26 is a diagram of the data structure of a list of service information directly managed by the SRMS 200_5 included in the integration object multifunction peripheral MFP5. The service-merge processing section SR30_4 applies processing explained below to the respective kinds of service information in such a list.

First, the service-merge processing section SR30_4 extracts service information concerning the SRMS 200_5 (hereinafter, "object service information") from the list (Step S601). The service-merge processing section SR30_4 retrieves, referring to the service-information table 300A_4, service information, a value of "master UUID" of which coincides with a value of the UUID of the SRMS 200_4, and that has a name space same as "name space" ("jp.co.ricoh.srms") of the object service information and has a latest generation (hereinafter, "latest service information") (Step S602). The service-merge processing unit SR30_4 finds, as a result of the retrieval, for example, service information concerning the SRMS 200_4 in a first row in the service-information table 300A_4 shown in FIG. 5 and acquires the service information. The service-merge processing section SR30_4 sets a value of "generation" of the latest service information in "generation" of the object service information (Step S603) and increments the value of "generation" of the latest service information by one (Step S604). The service-merge processing section SR30_4 sets values of "master UUID" and "root ID" of the latest service information in "master UUID" and "root ID" of the object service information, respectively (Step S605). The service-merge processing section SR30_4 updates the latest service changed as explained above in the service-information table 300A_4 (Step S606) and registers the changed object service information in the service-information table 300A_4 (Step S607). The service-merge processing section SR30_4 also applies the processing at Steps S601 to S607 to service information concerning the PIDS 201_5 and the EIDS 202_5 in the list acquired at Step S600. When the processing is finished for all the kinds of service information in the list ("YES" at Step S608), the service-merge processing section SR30_4 returns success information indicating to that effect to the service integration application 103 (Step S609). FIG. 27 is a diagram of the data structure of the service-information table 300A_4 in which latest service information is updated and object service information is registered. Parts painted black are parts changed by the processing. As shown in the figure, the UUID ("S004") of the SRMS 200_4 is set in "master UUID" of respective kinds of service information concerning the SRMS 200_5, the PIDS 201_5, and the EIDS 202_5. Therefore, it is seen that these kinds of service information are managed by the SRMS 200_4. The UUID "S004" of the SRMS 200_4 is set in "root ID" of the service information concerning the SRMS 200_5. "P004" is set in "root ID" as the UUID of the PIDS 201_4 for the service information concerning the PIDS 201_5. "E004"

as the UUID of the EIDS 202_4 is set in "root ID" for the service information concerning the EIDS 202_5. It is possible to manage histories of changes of the respective kinds of service information using "root ID" and "generation".

For example, the respective kinds of service information concerning the SRMS 200_6, the PIDS 201_6, and the EIDS 202_6 of the multifunction peripheral MFP6 are integrated in the service-information table 300A_4 managed by the SRMS 200_4. A procedure of service-merge processing is the same as the procedure of the flowchart shown in FIG. 25. FIG. 28 is a diagram of a list of service information received by the service-merge processing section SR30_4 at Step S600. FIG. 29 is a diagram of the data structure of the service-information table 300A_4 in which latest service information is updated and object service information is registered as a result of the service-merge processing. The latest service information concerning the SRMS 200 is the service information concerning the SRMS 200_4. "Generation" of the service information is incremented from "1" set in FIG. 27 to "2". The object service information concerning the SRMS 200 is the service information concerning the SRMS 200_6. As a generation between the service information concerning the SRMS 200_4 and the service information concerning the SRMS 200_5, "1" is set in "generation" of the service information concerning the SRMS 200_6. "S004" is set in "master UUID" of the service information and "S004" is set in "root ID". The same applies in the respective kinds of service information concerning the PIDS 201_6 and the EIDS 202_6.

Figure 30:
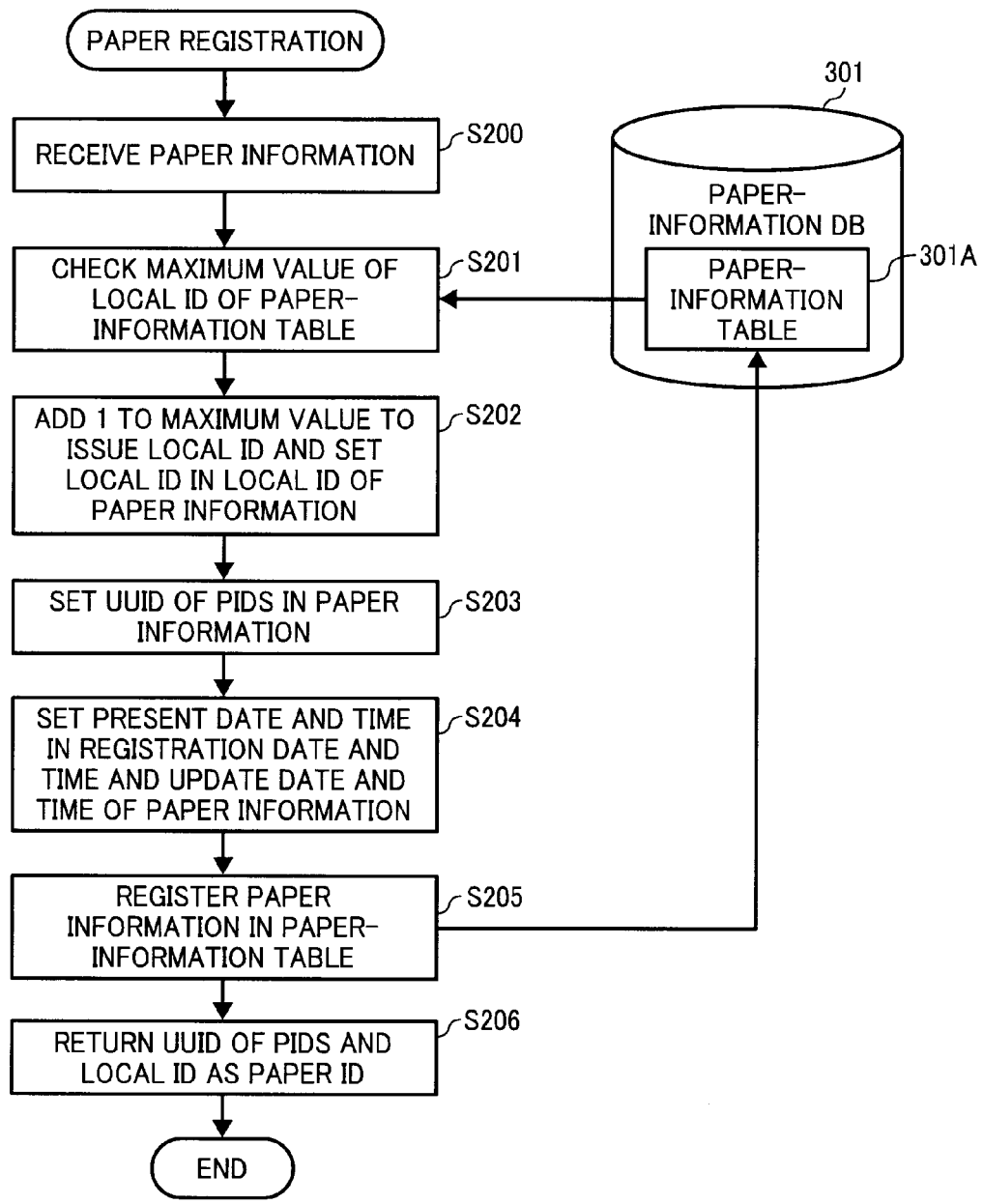
FIG. 30 is a flowchart of a procedure of paper-registration processing realized by a paper registration function according to the embodiment.
Figure 31:
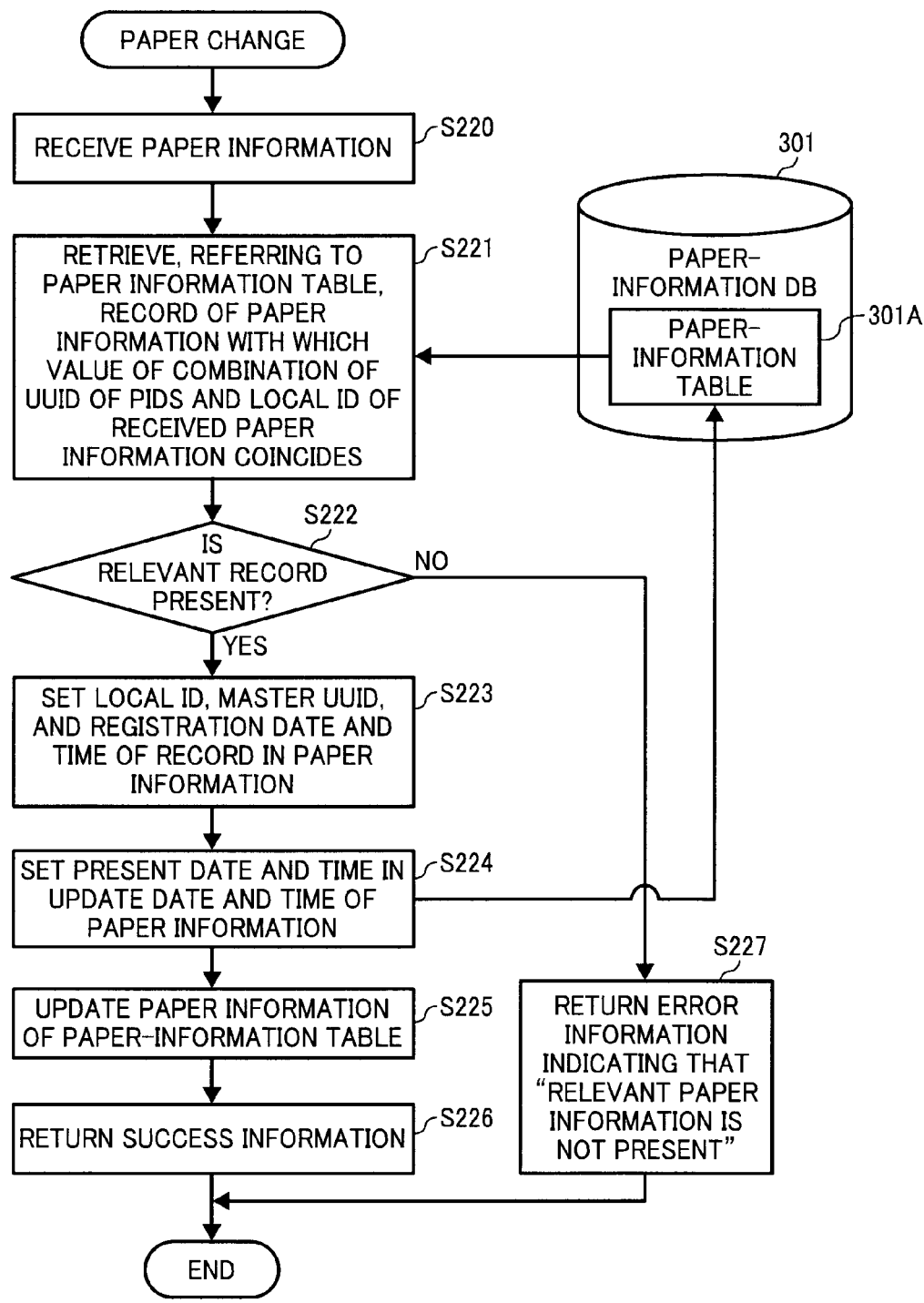
FIG. 31 is a flowchart of a procedure of paper-change processing realized by a paper change function according to the embodiment.

The paper registration is a function of registering paper information in the paper-information table 301A of the paper-information DB 301. FIG. 30 is a flowchart of a procedure of paper-registration processing realized by the paper registration function. The paper-registration processing section PI20 receives paper information from the client through the interface section PI1 (Step S200). The paper-registration processing section PI20 checks a maximum value of a local ID of paper information stored in the paper-information table 301A (Step S201). For example, when the maximum value is "10", the paper-registration processing section PI20 issues "11" as a new local ID and sets "11" in a local ID of the received paper information (Step S202). Subsequently, the paper-registration processing section PI20 sets a value of a UUID of the PIDS201 in the received paper information (Step S203). The paper-registration processing section PI20 acquires a present date and time using the timing function of the CPU 11 and sets the present date and time in a registration date and time and an update date and time of the received paper information (Step S204). As a result, a paper ID, which is a combination of the UUID of the PIDS 201 and the local ID, is issued with respect to the paper information. The paper ID is associated with the paper information. The paper-registration processing section PI20 registers the paper information, in which the respective kinds of information are set, in the paper-information table 301A (Step S205). Finally, the paper-registration processing section PI20 returns, as the paper ID, the combination of the UUID of the PIDS 201 and the local ID to the client as a request source through the interface section PI1 (Step S206).

The paper information change is a function of changing paper information registered in the paper-information table 301A to new paper information. FIG. 30 is a flowchart of a procedure of paper-change processing realized by the paper change function. First, the paper-change processing section PI21 receives paper information from the client through the interface section PI1 (Step S220). The paper-change processing section PI21 retrieves, referring to the paper-information table 301A, a record of paper information with which a value of a combination (a paper ID) of a UUID of the PIDS 201 and a local ID of the received paper information coincides (Step S221). When a relevant record is not present ("NO" at Step S222), the paper-change processing section PI21 returns error information indicating that "relevant paper information is not present" to the client as a request source (Step S227). When a relevant record exists ("YES" at Step S222), the paper-change processing section PI21 sets a registration date and time, which are set in the record, in the received paper information (Step S223). The service-change processing section PI21 acquires a present date and time using the timing function of the CPU 11 and sets the present date and time in an update date and time of the received paper information (Step S224). The service-change processing section PI21 updates (overwrites) the paper-information table with the paper information in which the respective kinds of information are set as explained above (Step S225). Subsequently, the paper-change processing section PI21 returns information indicating success of the processing to the client as a request source through the interface section PI1 (Step S226).

Figure 32:
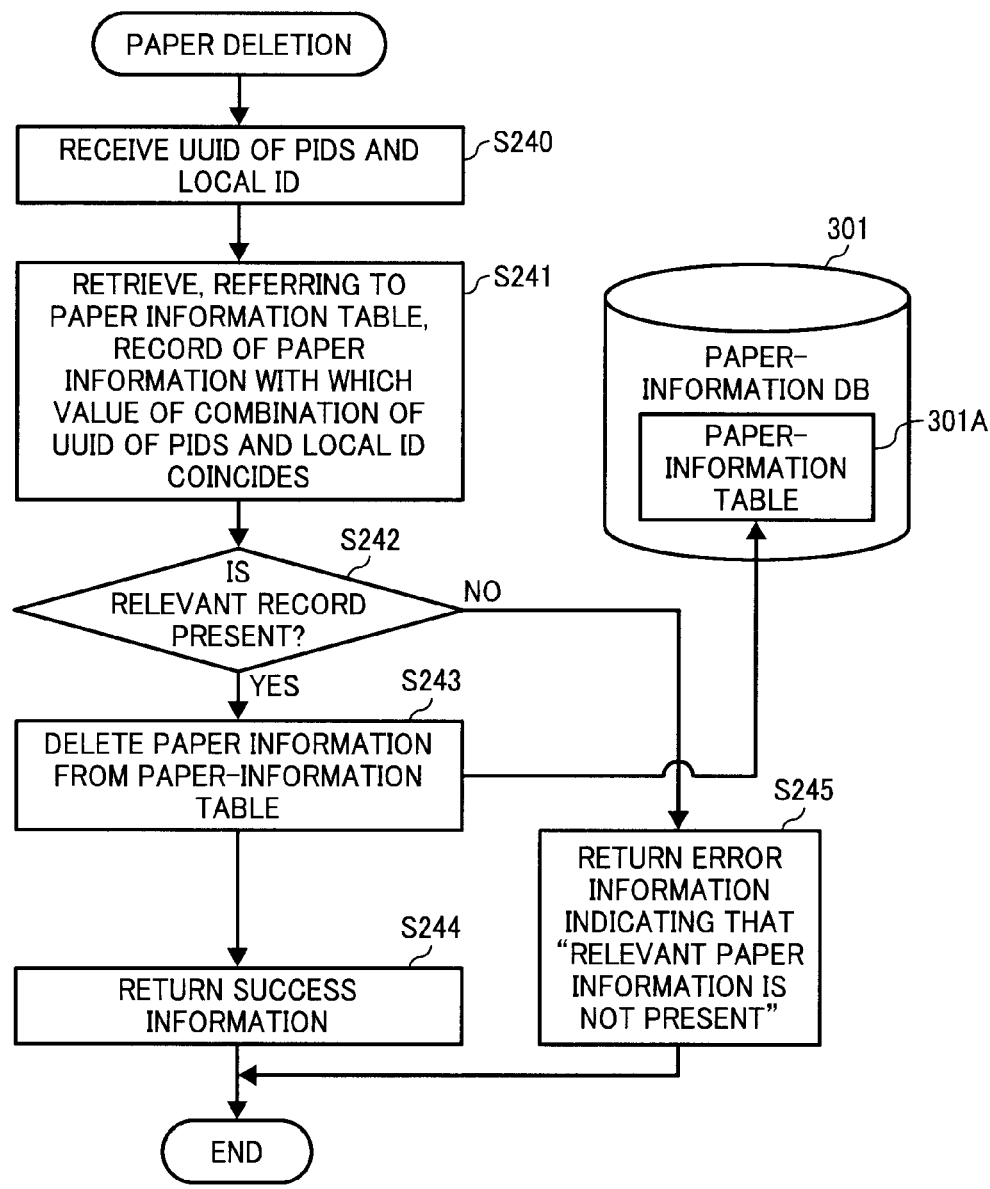
FIG. 32 is a flowchart of a procedure of paper-deletion processing realized by a paper deletion function according to the embodiment.

The paper deletion is a function of deleting paper information registered in the paper-information table 301A. FIG. 32 is a flowchart showing a procedure of paper-deletion processing realized by the paper deletion function. First, the paper-deletion processing section PI22 receives a combination (a paper ID) of a UUID of the PIDS 201 and a local ID concerning deletion object paper information from the client through the interface section PI1 (Step S240). The paper-deletion processing section PI22 retrieves, referring to the paper-information table 301A, a record of paper information with which a value of the received combination (paper ID) of the UUID of the PIDS 201 and the local ID coincides (Step S241). When a relevant record is not present ("NO" at Step S242), the paper-deletion processing section PI22 returns error information indicating that "relevant paper information is not present" to the client as a request source (Step S245). When a relevant record exists ("YES" at Step S242), the paper-deletion processing section PI22 deletes the record from the paper-information table 301A (Step S244). Subsequently, the paper-deletion processing section PI22 returns success information indicating success of the processing to the client through the interface section PI1 (Step S243).

The paper information acquisition is a function of acquiring service information registered in the paper information table 301A. The service information acquisition function is subdivided into two interfaces. These interfaces are paper information acquisitions 1 and 2. The paper information acquisition 1 is a function of designating a combination (a paper ID) of a UUID of the PIDS 201 and a local ID of acquisition object paper information and acquiring paper information. The paper information acquisition 2 is a function of acquiring a list of paper information directly managed by the PIDS 201 according to a request from the integration-information collection 103A of the service integration application 103.

Figure 33:
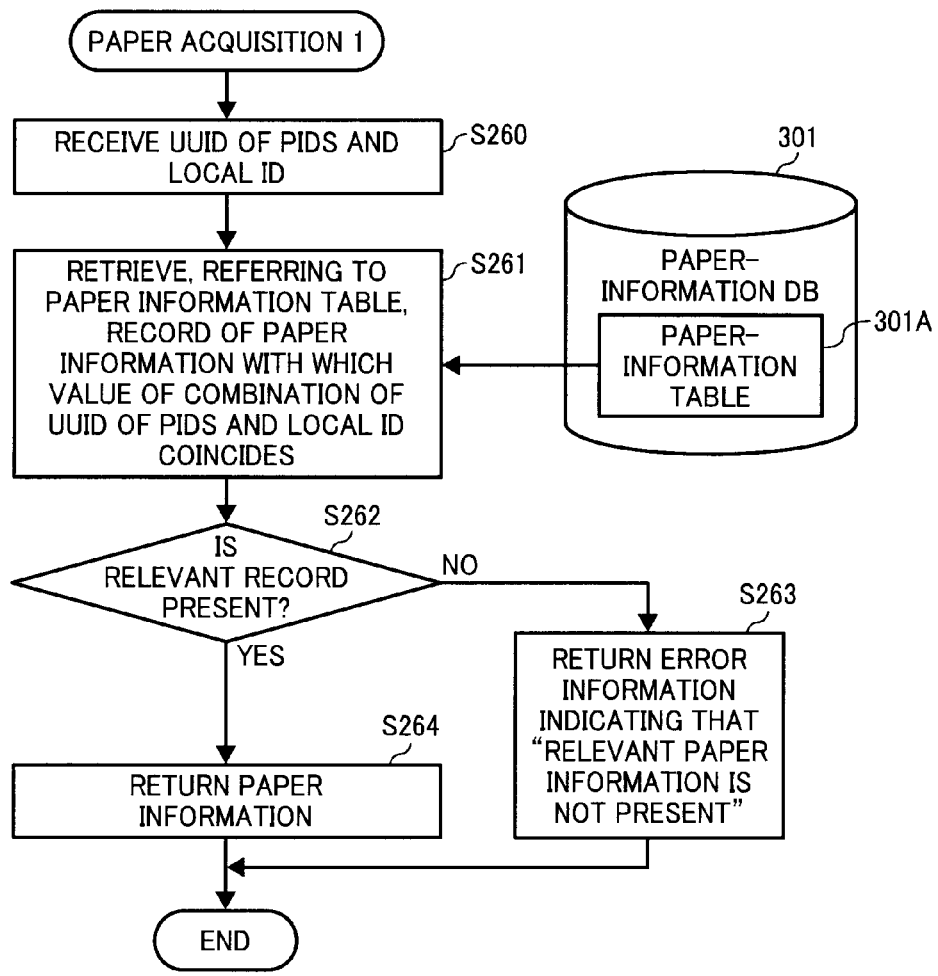
FIG. 33 is a flowchart of a procedure of paper-acquisition processing realized by a paper acquisition function according to the embodiment.

FIG. 33 is a flowchart of a procedure of paper acquiring processing 1 realized by the paper acquisition function. First, the paper-acquisition processing section PI23 receives a combination (a paper ID) of a UUID of the PIDS 201 and a local ID concerning acquisition object paper information from the client through the interface section P11 together with a acquiring request of paper acquiring processing 1 (Step S260). The paper-acquisition processing section PI23 retrieves, referring to the paper-information table 301A, a record of paper information with which a value of the received combination (paper ID) of the UUID of the PIDS 201 and the local ID coincides (Step S261). When a relevant record is not present ("NO" at Step S262), the paper-acquisition processing section PI23 returns error information indicating that "relevant paper information is not present" to the client as a request source (Step S264). When a relevant record exists ("YES" at Step S262), the paper-acquisition processing section PI23 returns the paper information as the relevant record to the client through the interface section PI1 (Step S263).

Figure 34:
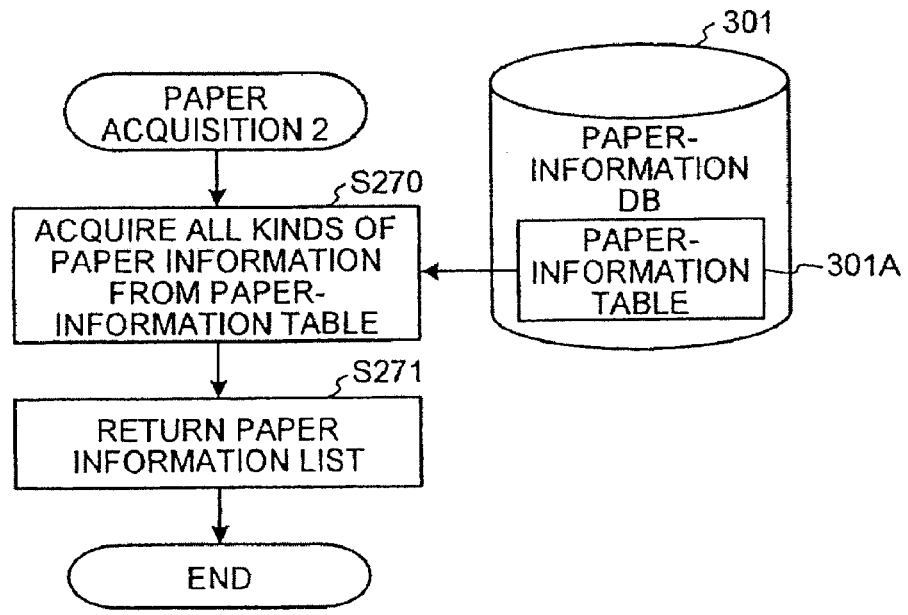
FIG. 34 is a flowchart of a procedure of paper information acquisition processing realized by a function of paper information acquisition according to the embodiment.

FIG. 34 is a flowchart of a procedure of paper information acquisition processing realized by a function of the paper information acquisition 2. The paper-information-acquisition processing unit PI23 is requested to execute the paper information acquisition 2 by the integration-information collection 103A of the service integration application 103. Then, unlike the case of paper information acquisition explained above, the paper-information-acquisition processing section PI23 does not receive parameters used for the processing and acquires, referring to the paper information table 301A, all records stored in the table (Step S270). The paper-information-acquisition processing section PI23 forms a list of the records and returns the list to the integration-information collection 103A (Step S271).

Figure 35:
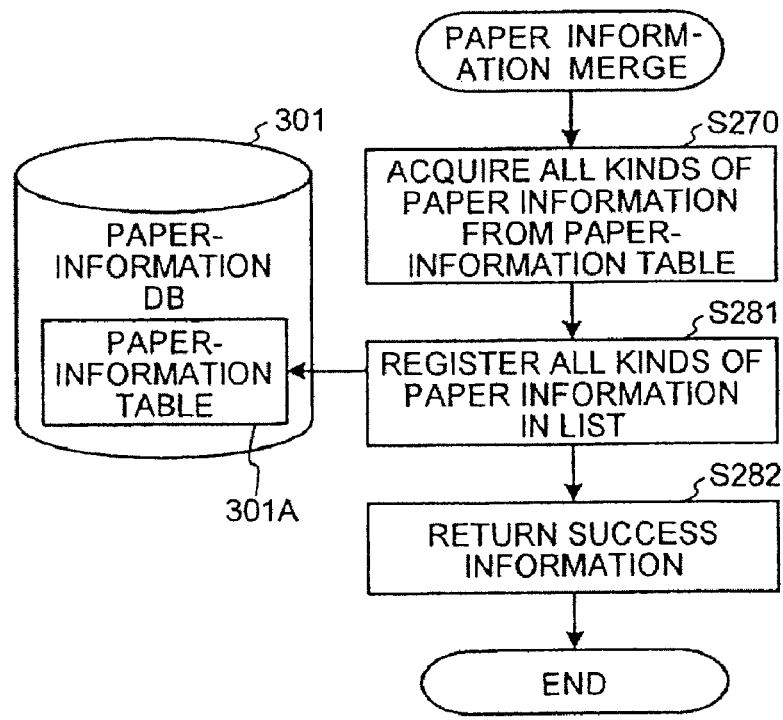
FIG. 35 is a flowchart of a procedure of paper information merge processing realized by a paper information merge function according to the embodiment.

The paper information merge is a function of registering paper information in the paper information table 301A according to a request from the integration-information merge 103B of the service integration application 103. FIG. 35 is a flowchart of a procedure of paper information merge processing realized by the paper information merge function. The paper-information-merge processing section PI24 receives paper information in a form of a list from the integration-information merge 103B of the service integration application 103 through the interface section PI1 as parameters (Step S280). A detailed procedure of an operation of the integration-information merge 103B for passing the list of paper information to the paper-information-merge processing section PI24 is explained later. The paper-information-merge processing section PI24 registers all kinds of paper information in the list in the paper information table 301A (Step S281). "UUID of a PIDS" is included in the paper information as data. Therefore, even if paper information managed by another PIDS 201 is registered in the paper information table 301A without changing a local ID, uniqueness of the paper information is maintained. A paper ID is a combination of "UUID of a PIDS" and "local ID". Therefore, uniqueness of the paper information is maintained by a paper ID issued to the paper information first. The paper-information-merge processing section PI24 returns success information indicating that all kinds of paper information are registered to the integration-information merge 103B (Step S282).

Figure 36:
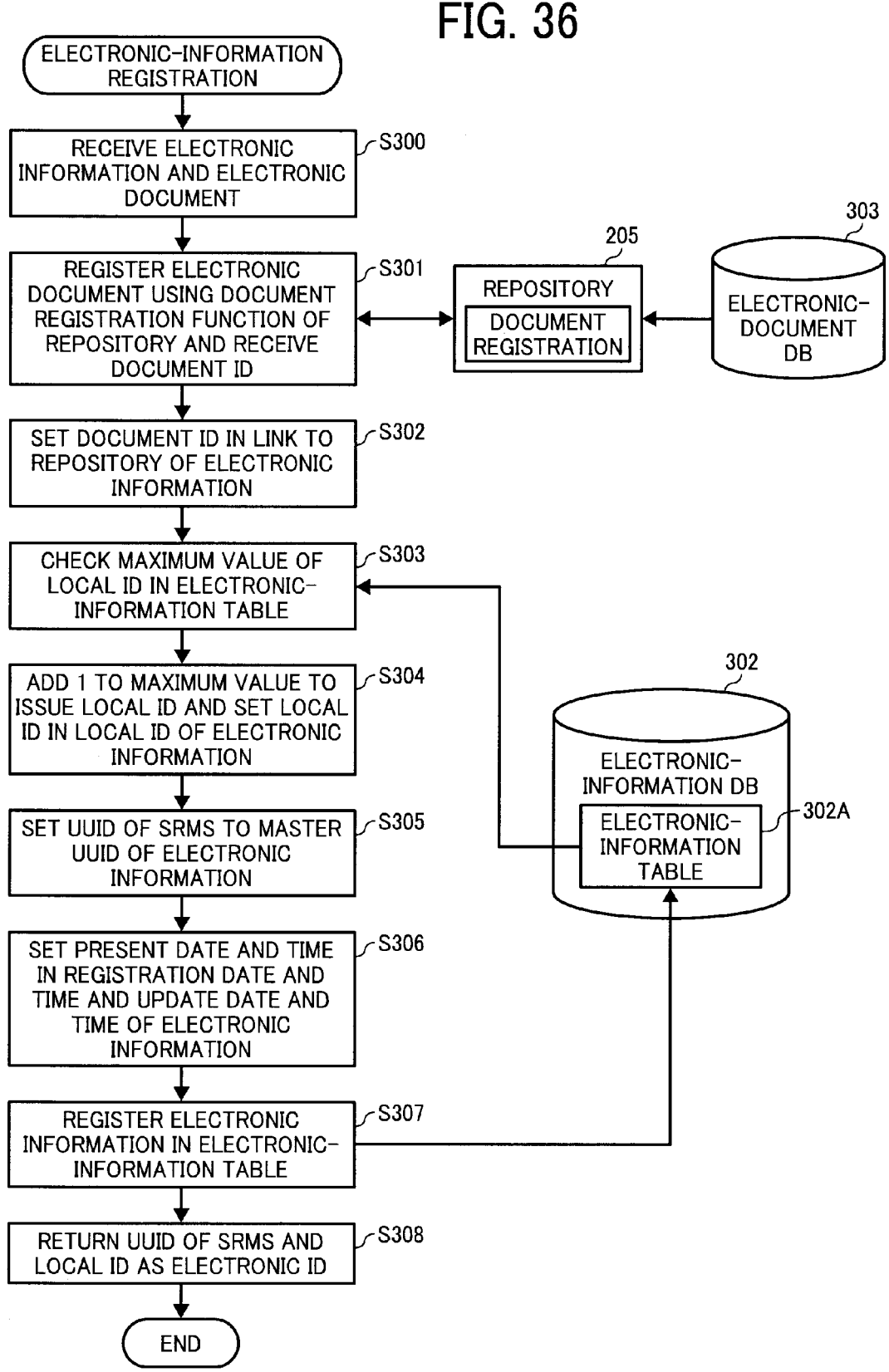
FIG. 36 is a flowchart of a procedure of electronic-information-registration processing realized by an electronic-information registration function according to the embodiment.

The electronic-information registration is a function of registering electronic information in the electronic-information table 302A of the electronic-information DB 302 and registering an electronic document in the electronic-document DB 303 using the function of the repository 205. FIG. 36 is a flowchart of a procedure of electronic-information-registration processing realized by the electronic-information registration function. First, the electronic-information-registration processing section EI20 receives electronic information and an electronic document from the client as a request source through the interface section EI1 (Step S300). The electronic-information-registration processing section EI20 registers the electronic document in the electronic-document DB 303 through the repository 205 using a document registration function of the repository 205. As a result, the electronic-information-registration processing section EI20 receives a document ID from the repository 205 (Step S301). The document ID is an ID that the repository 205 independently issues in order to manage the electronic document to be registered. When a document management system such as a file system of Windows (registered trademark) is used as the repository 205, the document ID may be a file path. The electronic-information-registration processing section EI20 sets the document ID received from the repository 205 in "link to a repository" in the electronic information (Step S302). Subsequently, the electronic-information-registration processing section EI20 checks a maximum value of a local ID referring to the electronic-information table 302A (Step S303). For example, when the maximum value is "10", the electronic-information-registration processing section EI20 issues "11" as a new local ID and sets "11" in a local ID of the received electronic information (Step S304). The electronic-information-registration processing section EI20 sets a UUID of the EIDS 202 in the electronic information (Step S305). As a result, an electronic information ID, which is a combination of the UUID of the EIDS 202 and the local ID, is issued with respect to the electronic information. The electronic information ID is associated with the electronic information. The electronic-information-registration processing section EI20 acquires a present date and time using the timing function of the CPU 11 and sets the present date and time in a registration date and time and an update date and time of the received electronic information (Step S306). The electronic-information-registration processing section EI20 registers the electronic information, in which the respective kinds of information are set as explained above, in the electronic-information table 302A (Step S307). Finally, the electronic-information-registration processing section EI20 returns the combination (an electronic ID) of the UUID of the EIDS 202 and the local ID to the client through the interface section EI1 (Step S308).

Figure 37:
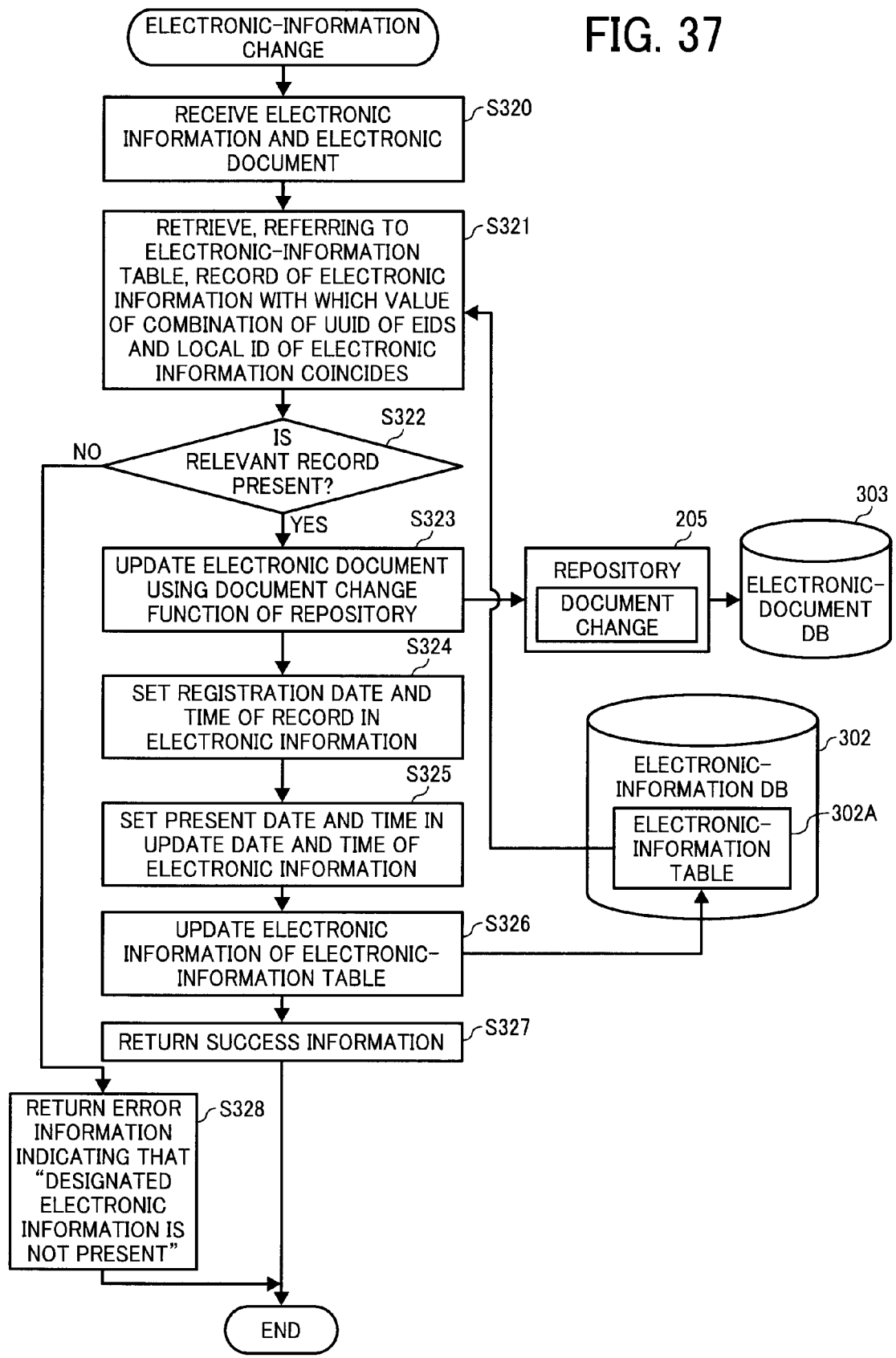
FIG. 37 is a flowchart of a procedure of electronic-information-change processing realized by an electronic-information change function according to the embodiment.

The electronic-information change is a function of changing electronic information registered in the electronic-information table 302A. FIG. 37 is a flowchart of a procedure of electronic-information-change processing realized by the electronic-information change function. First, the electronic-information-change processing section EI21 receives electronic information and a body of an electronic document from the client as a request source through the interface section EI1 (Step S320). The electronic-information-change processing section EI21 retrieves, referring to the electronic-information table 302A, a record of electronic information with which a value of a combination (an electronic ID) of a UUID of the EIDS 202 and a local ID of the received electronic information coincides (Step S321). When a relevant record is not present ("NO" at Step S322), the electronic-information-change processing section EI21 returns error information indicating that "designated electronic information is not present" to the client (Step S328). When a relevant record exists ("YES" at Step S322), the electronic-information-change processing section EI21 updates the body of the electronic document stored in the electronic-document DB 303 using a document change function of the repository 205 (Step S323). Subsequently, the electronic-information-change processing section EI21 sets a registration date and time, which is set in the relevant record, in the received electronic information (Step S324). The electronic-information-change processing section EI21 acquires a present date and time using the timing function of the CPU 11 and sets the present date and time in an update date and time of the received electronic information (Step S325). The electronic-information-change processing section EI21 updates (overwrites) the electronic-information table 302 with the electronic information in which the respective kinds of information are set as explained above (Step S326). The electronic-information-change processing section EI21 returns information indicating success of the processing to the client through the interface section EI1 (Step S327).

Figure 38:
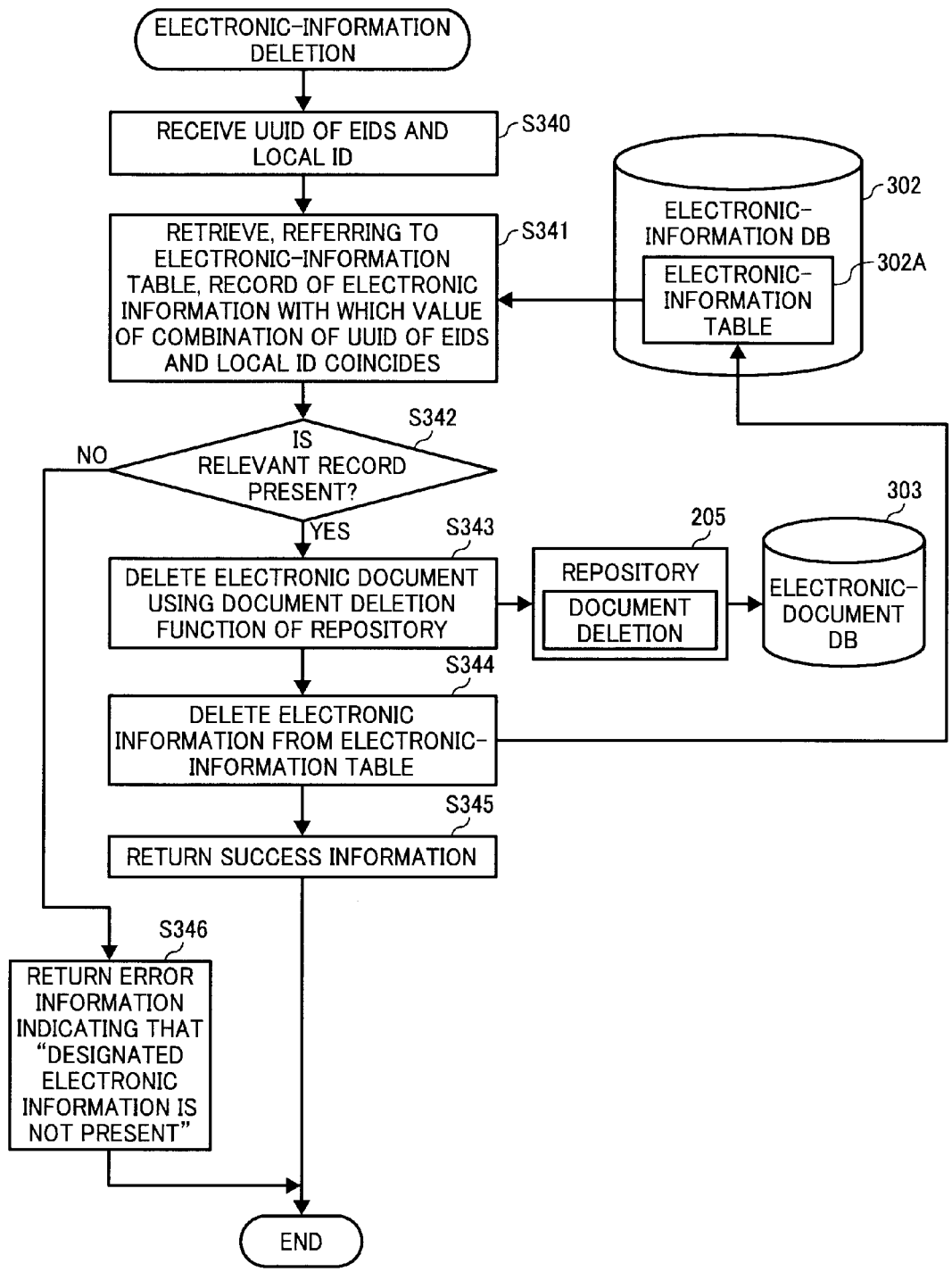
FIG. 38 is a flowchart of a procedure of electronic-information-deletion processing realized by an electronic-information deletion function according to the embodiment.

The electronic-information deletion is a function of deleting electronic information registered in the electronic-information table 302A. FIG. 38 is a flowchart of a procedure of electronic-information-deletion processing realized by the electronic-information deletion function. First, the electronic-information-deletion processing section EI22 receives a combination (an electronic ID) of a UUID of the EIDS 202 and a local ID concerning deletion object electronic information from the client through the interface section EI1 (Step S340). The electronic-information-deletion processing section EI22 retrieves, referring to the electronic-information table 302A, a record of electronic information with which a value of the received combination (electronic ID) of the UUID of the EIDS 202 and the local ID coincides (Step S341). When a relevant record is not present ("NO" at Step S342), the electronic-information-deletion processing section EI22 returns error information indicating that "designated electronic information is not present" to the client as a request source (Step S346). When a relevant record exists ("YES" at Step S342), the electronic-information-deletion processing section EI22 deletes, using a document deletion function of the repository 205, a body of an electronic document stored in the electronic-document DB 303 (Step S343) and deletes the record from the electronic-information table 302A (Step S344). Subsequently, the electronic-information-deletion processing section EI22 returns success information indicating success of the processing to the client through the interface section EI1 (Step S345).

The electronic-information acquisition is a function of acquiring electronic information registered in the electronic-information table 302A. The electronic-information acquisition function is subdivided into two interfaces. These interfaces are electronic-information acquisitions 1 and 2. The electronic-information acquisition 1 is a function of designating a combination (an electronic ID) of a UUID of the EIDS 202 and a local ID of acquisition object electronic information and acquiring electronic information. The electronic-information acquisition 2 is a function of acquiring, without designating an electronic ID of electronic information, a list of electronic information directly managed by the EIDS 202 according to a request from the integration-information collection 103A of the service integration application 103.

Figure 39:
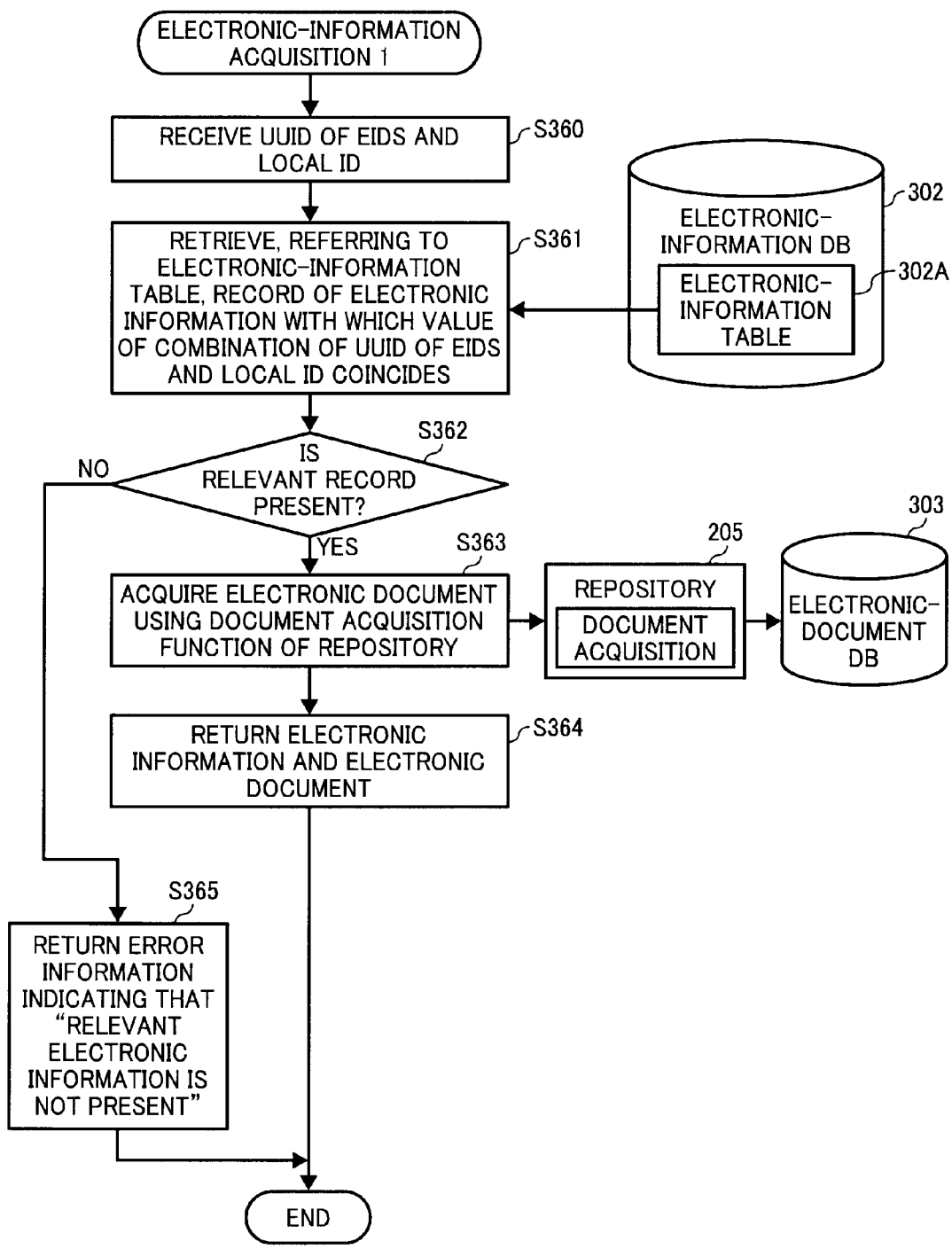
FIG. 39 is a flowchart of a procedure of electronic-information-acquisition processing realized by an electronic-information acquisition function according to the embodiment.

FIG. 39 is a flowchart of a procedure of electronic-information-acquisition processing realized by the electronic-information acquisition function. First, the electronic-information-acquisition processing section EI23 receives a combination (an electronic ID) of a UUID of the EIDS 202 and a local ID concerning acquisition object electronic information from the client through the interface section EI1 together with an electronic-information acquisition request (Step S360). The electronic-information-acquisition processing section EI23 retrieves, referring to the electronic-information table 302A, a record of electronic information with which a value of the received combination (electronic ID) of the UUID of the EIDS 202 and the local ID coincides (Step S361). When a relevant record is not present ("NO" at Step S362), the electronic-information-acquisition processing section EI23 returns error information indicating that "designated electronic information is not present" (Step S365). When a relevant record exists ("YES" at Step S362), the electronic-information-acquisition processing section EI23 acquires a body of an electronic document stored in the electronic-document DB 303 using a document acquisition function of the repository 205. The electronic-information-acquisition processing section EI23 returns the body of the electronic document to the client through the interface EI1 together with electronic information as the relevant record (Step S364).

Figure 40:
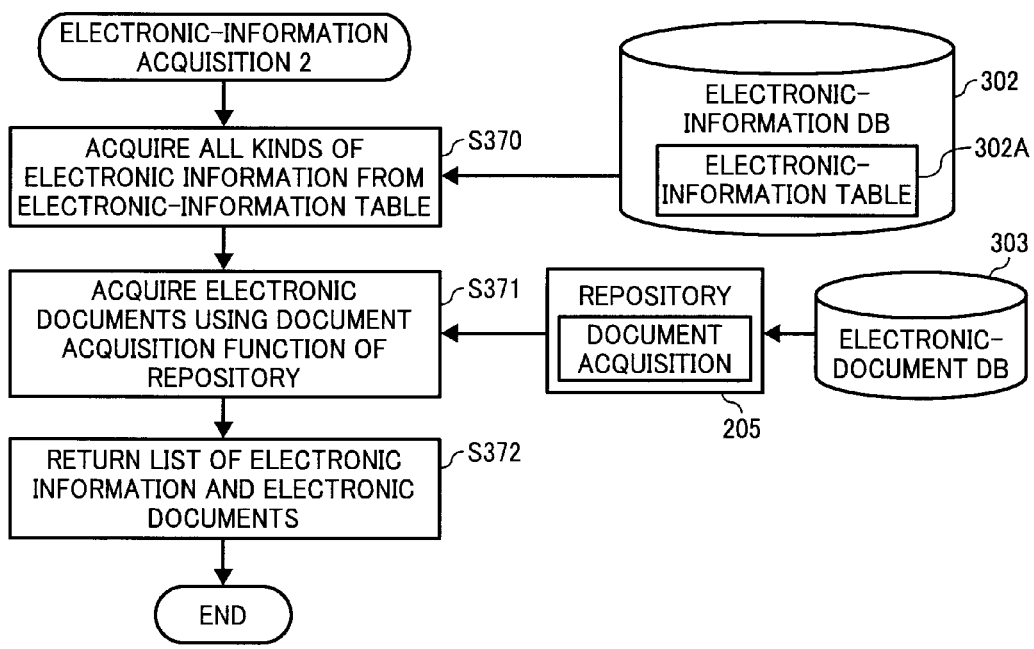
FIG. 40 is a flowchart of a procedure of electronic-information-acquisition processing realized by a function of electronic-information acquisition 2 according to the embodiment.

FIG. 40 is a flowchart of a procedure of electronic-information-acquisition processing realized by a function of the electronic-information acquisition 2. First, the electronic-information-acquisition processing section EI23 is requested to execute the electronic-information acquisition 2 by the integration-information collection 103A of the service integration application 103. Then, unlike the case of the electronic-information acquisition 1 explained above, the electronic-information-acquisition processing section EI23 does not receive parameters used for the processing and acquires, referring to the electronic-information table 302A, all records stored in the table (Step S370). The electronic-information-acquisition processing section EI23 acquires document IDs set in "link to a repository" of respective kinds of electronic information and acquires electronic documents corresponding to the respective document IDs using the document acquisition function of the repository 205 (Step S371). The electronic-information-acquisition processing section EI23 forms a list of the acquired electronic information and electronic documents and returns the list to the integration-information collection 103A (Step S372).

Figure 41:
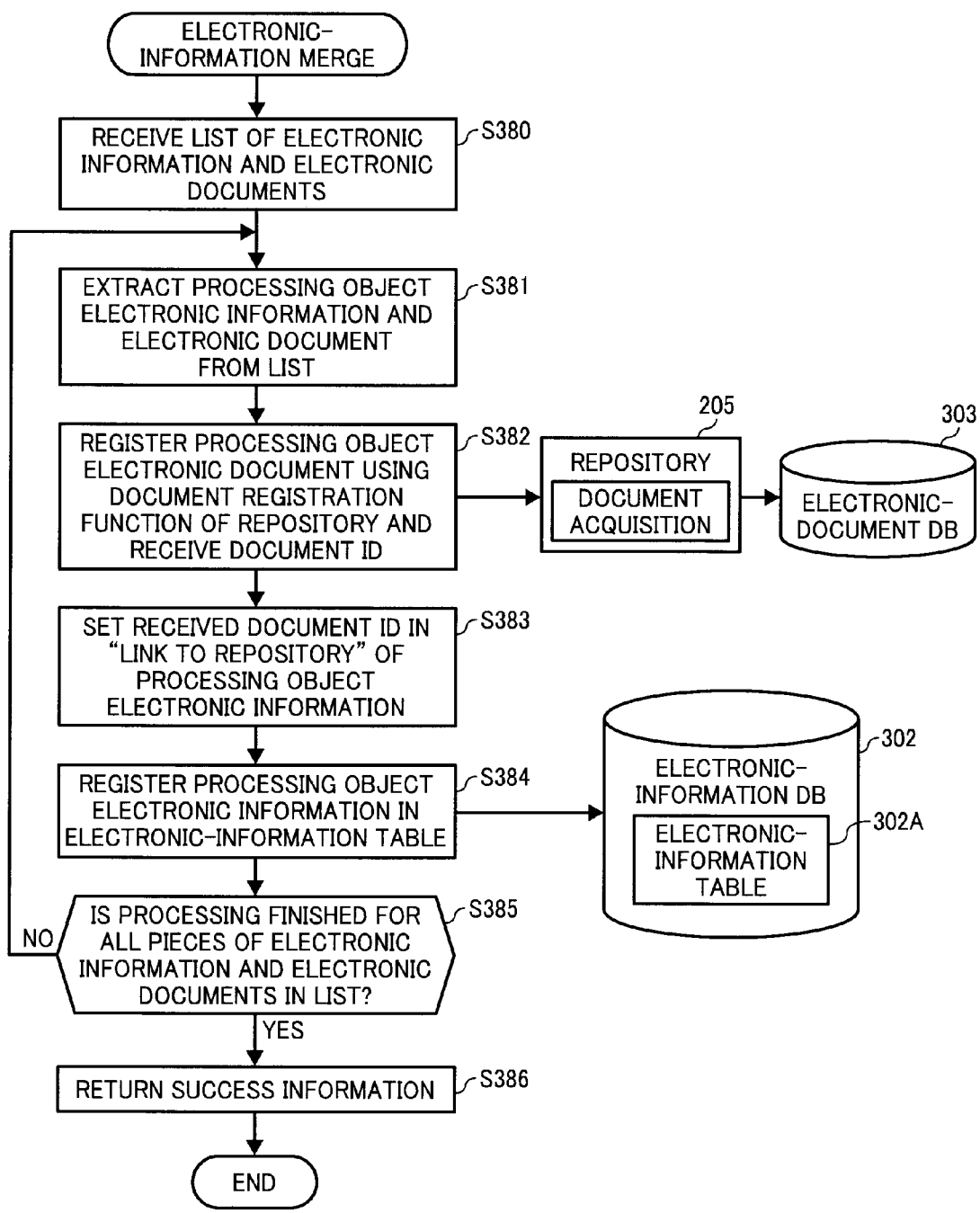
FIG. 41 is a flowchart of a procedure of electronic-information-merge processing realized by an electronic-information merge function according to the embodiment.

The electronic-information merge is a function of registering electronic information in the electronic-information table 302A according to a request from the integration-information merge 103B of the service integration application 103. FIG. 41 is a flowchart of a procedure of electronic-information-merge processing realized by an electronic-information merge function. The electronic-information-merge processing section EI24 receives electronic information and electronic documents in a form of a list from the integration-information merge 103B of the service integration application 103 through the interface section EI1 as parameters (Step S380). A detailed procedure of an operation of the integration-information merge 103B for passing the list of electronic information and electronic documents to the electronic-information-merge processing section EI24 is explained later. Subsequently, the electronic-information-merge processing section EI24 extracts all the pieces of electronic information and electronic documents in the list as processing objects, respectively (Step S381) and applies processing explained below to the electronic information and the electronic documents. First, the electronic-information-merge processing section EI24 registers a processing object electronic document in the electronic-document DB 303 using the document registration function of the repository 205 and receives a document ID issued by the repository 205 anew for the electronic document from the repository 205 (Step S382). In general, a document ID issued by the repository 205 is not globally unique and, for example, if an electronic document managed by the repository 205_5 is transferred to another repository 205_4, document IDs overlap. Therefore, a new document ID is issued by registering the electronic document again in the repository 205_4. The electronic-information-merge processing section EI24 sets the received document ID in "link to a repository" of processing object electronic information (Step S383). As a result of the processing, in the example explained above, the document ID issued to the processing object electronic document by the repository 205_5 before is deleted.

The electronic-information-merge processing section EI24 registers the processing object electronic information in the electronic-information table 302A (Step S384). "UUID of an EIDS" is included in the electronic information as data.

Therefore, even if a local ID of the electronic information managed by another EIDS 202 is changed, uniqueness of the electronic information is maintained. An electronic ID is a combination of "UUID of a PIDS" and "local ID". Therefore, uniqueness of the electronic information is maintained by an electronic ID issued to the electronic information first. The electronic-information-merge processing section EI24 applies the processing to all the pieces of electronic information and electronic documents in the list received at Step S380. When the processing is finished for all the pieces of electronic information and electronic documents ("YES" at Step S385), the electronic-information-merge processing section EI24 returns success information indicating to that effect to the integration-information merge 103B (Step S386).

Figure 42:
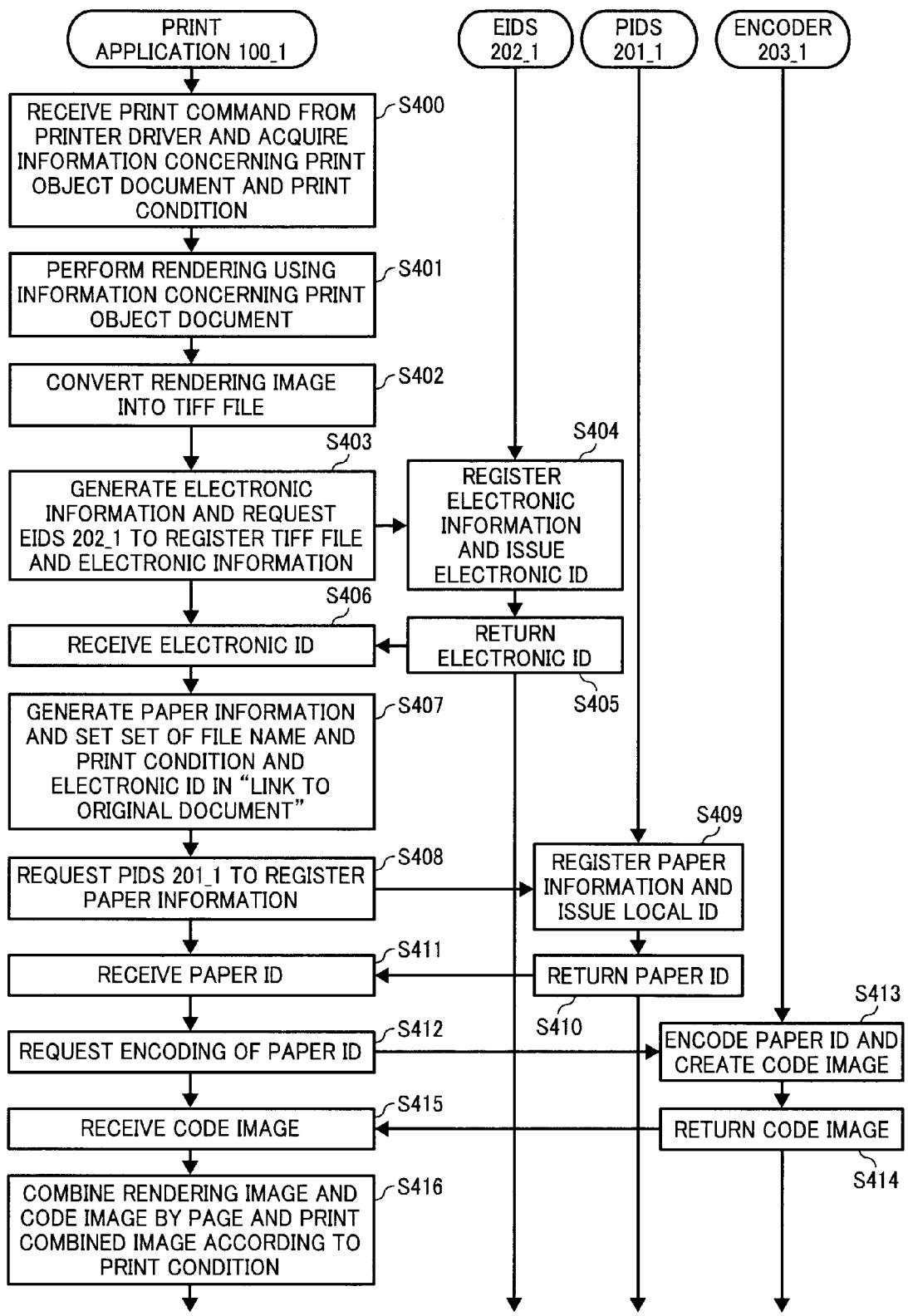
FIG. 42 is a flowchart of a procedure of operations of a print application 100 realized by a driver print function according to the embodiment.

The print application 100 includes the driver print function and the scan print function as explained above. FIG. 42 is a flowchart of a procedure of operations of the print application 100 according to the driver print function.

When a user inputs designation of printing of a three-page document and setting of a print condition, the personal computer PC1 receives the designation input. The printer driver of the personal computer PC1 transmits a print command including information concerning the print object document and the print condition to the print application 100_1 of the multifunction peripheral MFP1 through the intranet NT1. A procedure of processing up to this point is a known technology. Various known printer drivers that realize the procedure of such processing can be used.

The print application 100_1 receives a print command from the printer driver of the personal computer PC1 (Step S400), performs rendering using the information concerning the print object document and the print condition included in the print command, and creates an image (a rendering image) representing a print object document (Step S401). The print object document has three pages. Therefore, the print application 100_1 creates rendering images printed on three pieces of paper, respectively. Subsequently, the print application 100_1 converts the created rendering images into an electronic document of a predetermined representation format (Step S402). For example, the electronic document is data of a TIFF format (a TIFF file). This conversion is performed for registering the electronic document in the electronic-document DB 303. The print application 100_1 generates electronic information of an initial state in which the respective kinds of information are not set and sets a file name of the electronic document in "file name" in the generated electronic information. As this file name, when a file name of the electronic document is transmitted from the printer driver, the file name may be set. Alternatively, a file name issued to the electronic document by the print application 100_1 according to a predetermined method may be set. The print application 100_1 passes the generated electronic information and the electronic document to the EIDS 202_1 as parameters (Step S403). The exchange of data between the print application 100_1 and the EIDS 202_1 is performed in the identical multifunction peripheral MFP1. Therefore, the Web service is not used.

The EIDS 202_1 registers the electronic information passed from the print application 100_1 in an electronic-information table 302A_1 of the electronic-information DB 302_1 using the electronic-information registration function (Step S404). The EIDS 202_1 registers the electronic document in the electronic-document DB 303_1 using the document registration function of the repository 205 and returns a combination of a UUID of the EIDS 202_1 and a local ID concerning the registered electronic information to the print application 100_1 as an electronic ID (Step S405). The print application 100_1 receives the electronic ID (Step S406). The print application 100_1 generates paper information of an initial state in which the respective kinds of information are not set and sets a file name in "name" in the generated paper information (Step S407). As this file name, when a file name is transmitted from the printer driver, the file name may be set. Alternatively, a file name issued to the electronic document by the print application 100_1 according to the predetermined method may be set. The print application 100_1 sets the print condition transmitted from the printer driver in "print condition" of the paper information and sets the electronic ID (the combination of the UUID of the EIDS 202_2 and the local ID) acquired from the EIDS 202_1 in "link to an original document" of the paper information. There are the print object images for three pages, i.e., three print object images. Therefore, the print application 100_1 generates three kinds of paper information. The print application 100_1 requests the PIDS 201_1 to register paper information and passes the generated paper information to the PIDS 201_1 as a parameter (Step S408). The exchange of data between the print application 100_1 and the PIDS 201_1 is performed in the identical multifunction peripherals MFP1. Therefore, the Web service is not used.

The PIDS 201_1 issues local IDs for the respective kinds of paper information passed from the print application 100_1 and registers the paper information in a paper-information table 301A_1 of the paper-information DB 301_1 using the paper registration function (Step S409). The PIDS 201_1 returns combinations of UUIDs of the PIDS 201_1 and local IDs concerning the respective kinds of registered paper information to the print application 100_1 as paper IDs (Step S410). The three kinds of paper information are registered in the PIDS 201_1. Therefore, three paper IDs are returned to the print application 100_1. For example, these three paper IDs are referred to as a paper ID 1-1, a paper ID 1-2, and a paper ID 1-3, respectively. Subsequently, the print application 100_1 receives the three paper IDs (Step S411). The print application 100_1 passes the three paper IDs to the encoder 203_1 and requests the encoder 203_1 to encode the respective paper IDs (Step S412).

The encoder 203_1 converts the respective paper IDs into codes and creates code images (Step S413). Specifically, the encoder 203_1 creates three code images, i.e., a code image corresponding to a first page, a code image corresponding to a second page, and a code image corresponding to a third page. A type of the codes converted from the paper IDs by the encoder 203_1 is, for example, a QR code of a two-dimensional barcode. The encoder 203_1 passes the created code images to the print application 100_1 (Step S414). The print application 100_1 receives the code images (Step S415). The print application 100_1 combines the created code images with the rendering images corresponding to the pages, respectively, in order. As a method of combining the code images with the rendering images, various known technologies can be used. A position where the code images are combined with the rendering images may be a position determined in advance (e.g., a margin at the upper right on the paper). Alternatively, margins (areas without the rendering images) on the paper may be found out to set the position in any one of the margins. The print application 100_1 prints the rendering images combined with the code images on the paper page by page (Step S416). As a result, three print results in which the three paper IDs (the paper ID 1-1, the paper ID 1-2, and the paper ID 1-3) issued by the PIDS 201_1 are printed as code images, respectively, are obtained.

Figure 43:
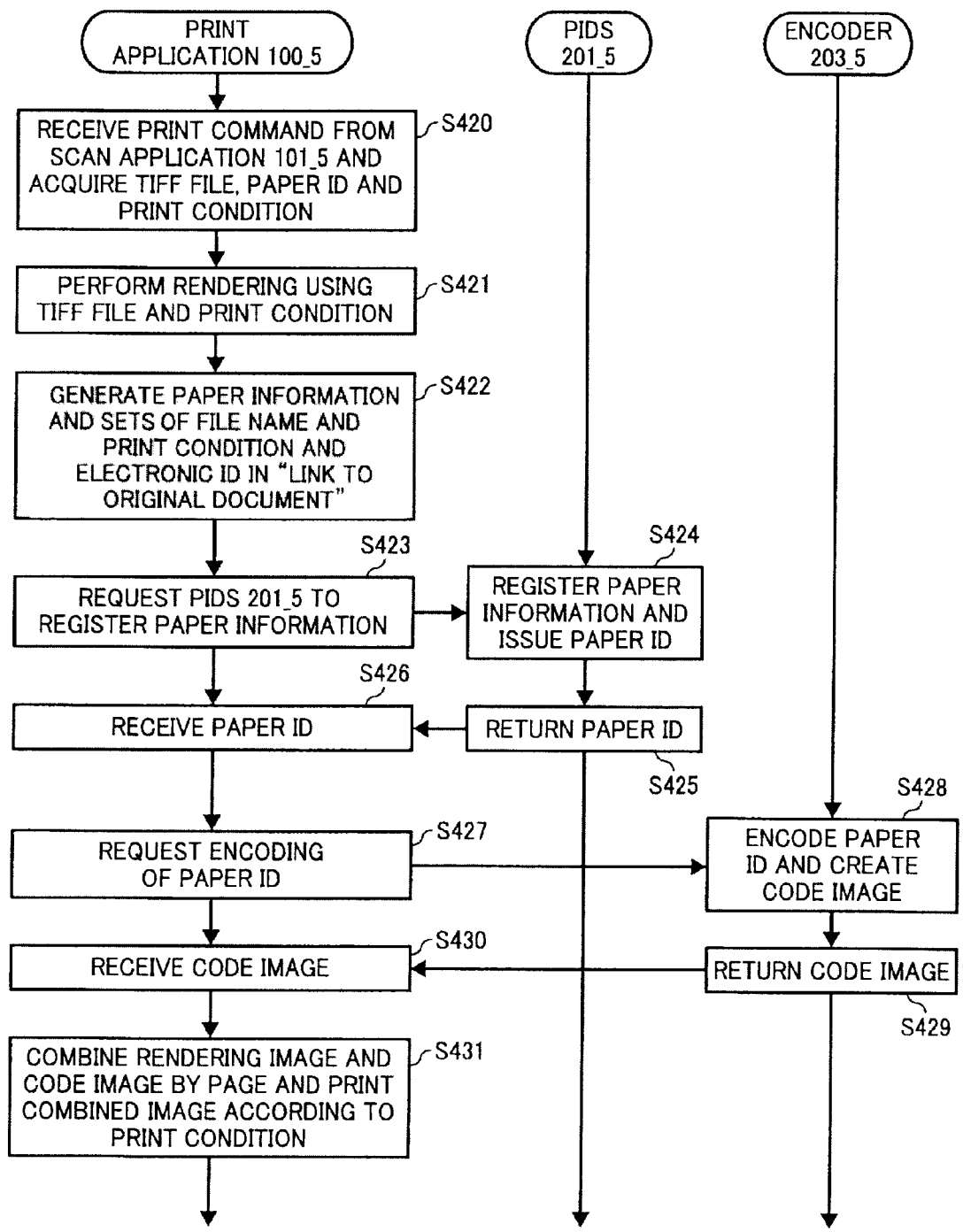
FIG. 43 is a flowchart of a procedure of operations of the print application 100 realized by a scan print function according to the embodiment.

As an operation according to the scan print function, for example, the scanning unit scans the paper, which is printed by the multifunction peripheral MFP1 according to the processing explained referring to FIG. 42, according to execution of the scan application 101_5 of the multifunction peripheral MFP5 and reprints the paper according to execution of the print application 100_5 of the multifunction peripheral MFP5. FIG. 43 is a flowchart of a procedure of operations of the print application 100 according to the scan print function.

The user sets copy object paper (the paper printed by the multifunction peripheral MFP1 according to the processing explained referring to FIG. 42) in the multifunction peripheral MFP5, sets a print condition, and instructs the multifunction peripheral MFP5 to print an image. The scan application 101_5 of the multifunction peripheral MFP5 acquires a code image printed on the paper, which is a code image scanned by the scanning unit by scanning the paper. The scan application 101_5 passes a print command including a TIFF file and a paper ID obtained based on a result of the code image acquisition and the print condition set by the user to the print application 100_5. A detailed procedure of operations of the scan application 101_5 is explained later. The TIFF file is a TIFF file stored in the electronic-document DB 303 by the electronic-information registration function of the EIDS 202 and acquired from the EIDS 202. The paper ID is a paper ID attached to the paper and is any one of the paper ID 1-1, the paper ID 1-2, and the paper ID 1-3.

The print application 100_5 receives the print command (Step S420). The print application 100_5 performs rendering based on the TIFF file and the print condition included in the print command and creates images (rendering images) representing a print object document (Step S421). The TIFF file is information representing the three-page document. Therefore, the print application 100_5 performs rendering page by page and creates three rendering images. The print application 100_5 generates paper information of an initial state in which the respective kinds of information are not set, sets a file name in "name" in the generated paper information, sets the print condition passed from the scan application 101_5 in "print condition" of the paper information, and sets the paper ID (any one of the paper ID 1-1, the paper ID 1-2, and the paper ID 1-3) passed from the scan application 101_5 in "link to an original document" of the paper information (Step S422). The print application 100_5 requests the PIDS 201_5 to register paper information and passes the generated paper information to the PIDS 201_5 as a parameter (Step S423). A procedure of operations at Steps S424 to S431 is substantially the same as that at Steps S409 to S416 explained above. Therefore, explanation of the procedure is omitted. However, at Steps S427 to S430, it is the encoder 203_5 that the print application 100_5 requests to encode the paper IDs.

As in the case of the driver print explained above, as a result of the processing, three print results are obtained by converting the three paper IDs issued by the PIDS 201_5 into codes and printing the paper IDs. For example, the paper IDs attached to the print results are referred to as a paper ID 5-1, a paper ID 5-2, and a paper ID 5-3, respectively, in order of the pages. In "link to an original document" of the respective kinds of paper information corresponding to these paper IDs, as explained above, any one of the paper ID 1-1, the paper ID 1-2, and the paper ID 1-3 is set. Therefore, any one of the paper ID 1-1, the paper ID 1-2, and the paper ID 1-3 can be linked to each of the paper ID 5-1, the paper ID 5-2, and the paper ID 5-3. In "link to an original document" of the respective kinds of paper information corresponding to the paper ID 1-1, the paper ID 1-2, and the paper ID 1-3, as explained at step s407, the electronic IDs are set. Therefore, it is possible to acquire a print object electronic document using the electronic IDs. Specifically, if a paper ID of a copy source is linked to a paper ID of a copy destination every time paper is copied, in copying the paper, by tracing a link of the paper information corresponding to the paper IDs, it is possible to reach paper information to which an electronic document as a print source is linked. As a result, it is possible to reach the electronic document. By interposing the paper IDs and the paper information corresponding to the paper IDs in this way, it is also possible to find when and where printing related to the electronic document is performed.

The procedure of the operations of the scan application 101 is divided into the following two cases:

(a) the second page (corresponding to the paper ID 1-2) of the paper printed by the multifunction peripheral MPF1 is scanned and reprinted by the multifunction peripheral MFP5; and (b) the first page (corresponding to the paper ID 5-1) of the paper reprinted by the multifunction peripheral MFP5 is scanned and reprinted again by the multifunction peripheral MFP6.

As the case (a), it is assumed that paper printed in the office J1 is carried to the office J2 and reprinted by a multifunction peripheral MFP in the office J2. As the case (b), paper printed in the office J1 is carried to the office J2 and the paper reprinted by the multifunction peripheral MFP in the office J2 is further carried to the office J3 and reprinted again by a multifunction peripheral MP in the office J3. A trust relationship among the multifunction peripherals MFP is the relation shown in FIG. 17.

Figure 44:
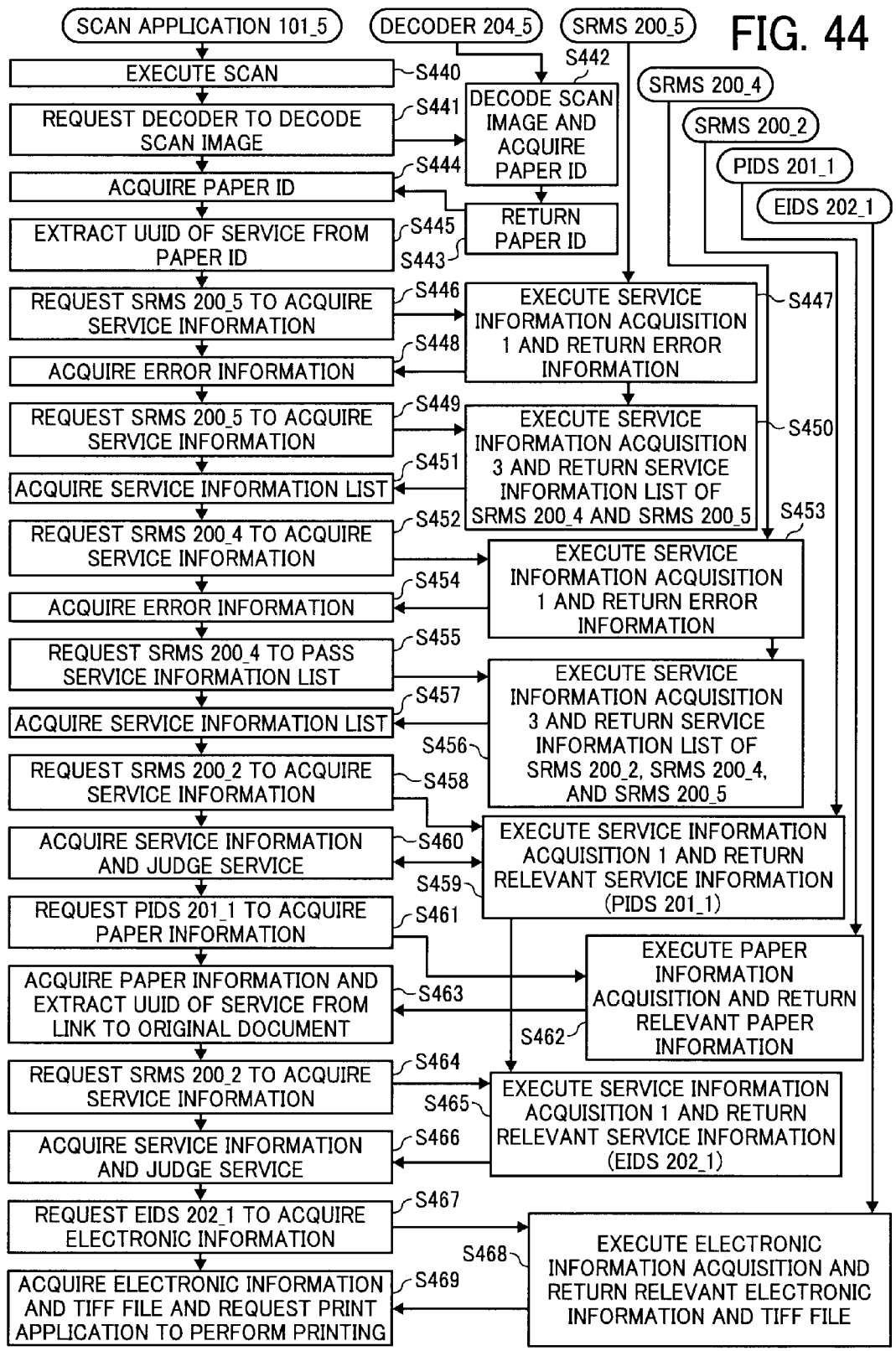
FIG. 44 is a flowchart of a procedure of operations of a scan application 101_5 in reprinting paper, which is printed by a multifunction peripheral MFP1, using a multifunction peripheral MFP5 according to the embodiment.

FIG. 44 is a flowchart of a procedure of operations of the scan application 101_5 in the case a) in scanning and reprinting the second page (corresponding to the paper ID 1-2) of the paper, which is printed by the multifunction peripheral MFP1, using the multifunction peripheral MFP5. When a power supply is turned on in the multifunction peripheral MFP5 and the scan application 101_5 is started, the scan application 101_5 causes the operation panel 20 to display items for setting a print condition and a scan button for instructing scan. The user sets the second page of the three pieces of paper, which are printed by the multifunction peripheral MFP1, in a scan unit (not shown) of the multifunction peripheral MFP5, sets a print condition in the operation panel 20, and depresses the scan button. The scan application 101_5 acquires the print condition and executes scanning of the paper set in the scan unit (Step S440). The scan application 101_5 passes a scan image obtained as a result of the scanning to the decoder 204_5 and requests the decoder 204_5 to decode the scan image (Step S441). The decoder 204_5 decodes a code image included in the scan image passed from the scan application 101_5 using the decode function and acquires a paper ID (the paper ID 1-2) (Step S442). The decoder 204_5 passes the paper ID 1-2 to the scan application 101_5 (Step S443).

The scan application 101_5 receives the paper ID 1-2 (Step S444). The scan application 101_5 extracts a UUID of the PIDS 201 from the paper ID 1-2 (Step S445). The scan application 101_5 cannot judge whether the PIDS 201 is the PIDS 201_1 only from the UUID. Therefore, the scan application 101_5 passes the UUID to an SRMS 200_5 of the multifunction peripheral MFP5 as a parameter and requests the SRMS 200_5 to acquire service information of the UUID. In other words, the scan application 101_5 requests the SRMS 200_5 to execute the service acquisition 1 (Step S446). The exchange of data between the scan application 101_5 and the SRMS 200_5 is performed in the identical multifunction peripheral MFP5. Therefore, the Web service is not used. The SRMS 200_5 retrieves the designated service information of the UUID using the function of the service acquisition 1 (Step S447). The SRMS 200_5 does not manage service information of the PIDS 201_1. Therefore, the SRMS 200_5 returns error information indicating that "designated service information is not present" to the scan application 101_5 (Step S447). The scan application 101_5 receives the error information (Step S448). The scan application 101_5 requests the SRMS 200_5 to pass a list of service information. In other words, the scan application 101_5 requests the SRMS 200_5 to execute the service acquisition 3 (Step S449). The SRMS 200_5 forms, referring to the trust-relationship-information table 300B stored in the service DB 300_5, a list of service information of the SRMSs 200 having a trust relationship with the SRMS 200_5 and passes the list to the scan application 101_5 using the function of the service acquisition 3 (Step S450). The SRMS 200_5 passes service information of the SRMS 200_5 itself and service information of an SRMS 200_4 to the scan application 101_5. The scan application 101_5 receives the list of the service information (Step S451). The scan application 101_5 passes the UUID extracted at Step S445 to the SRMS 200_4 in the list and requests the SRMS 200_4 to acquire service information of the UUID (execute the service acquisition 1) (Step S452). The multi-function peripheral MFP5 including the scan application 101_5 is the client as the request source of the processing explained referring to FIG. 11. The client and the SRMS 200_4 perform SOAP communication using the Web service. The execution of the service acquisition 1 has already been requested to the SRMS 200_5. Therefore, the scan application 101_5 does not request the SRMS 200_5 to execute the service acquisition 1.

The SRMS 200_4 retrieves the designated service information of the UUID using the function of the service acquisition 1. The SRMS 200_4 does not manage service information of the PIDS 201_1. Therefore, the SRMS 200_4 returns error information indicating that "designated service information is not present" to the scan application 101_5 (Step S453). The scan application 101_5 receives the error information (Step S454). The scan application 101_5 requests the SRMS 200_4 to pass a list of service information (execute the service acquisition 3) (Step S455). The SRMS 200_4 forms, referring to the trust-relationship-information table 300B_4 stored in the service DB 300_4, a list of service information of the SRMSs 200 having a trust relationship with the SRMS 200_4 and passes the list to the scan application 101_5 using the function of the service acquisition 3. The SRMS 200_4 passes service information of the SRMS 200_4 itself and respective kinds of service information of the SRMS 200_2 and the SRMS 200_5 to the scan application 101_5 (Step S456). The scan application 101_5 receives the list of the service information (Step S457). The scan application 101_5 passes the UUID extracted at Step S445 to the SRMS 200_2 in the list as a parameter and requests the SRMS 200_2 to acquire the service information of the UUID (execute the service acquisition 1) (Step S458). Again, the multifunction peripheral MFP5 having the scan application 101_5 is the client as the request source of the processing explained referring to FIG. 11. The client and the SRMS 200_2 perform SOAP communication using the Web service. The execution of the service acquisition 1 has already been requested to the SRMS 200_4 and the SRMS 200_5. Therefore, the scan application 101_5 does not request the SRMS 200_4 and the SRMS 200_5 to execute the service acquisition 1.

The SRMS 200_2 retrieves the designated service information of the UUID using the function of the service acquisition 1 (Step S459). The SRMS 200_2 has a trust relationship with the SRMS 200_1. Therefore, the service information of the PIDS 201_1 is stored in a service-information table 300A_2 managed by the SRMS 200_2. Therefore, as a result of the retrieval, the SRMS 200_2 acquires the relevant service information of the PIDS 201_1 and returns the service information to the scan application 101_5 (Step S459). In this way, the service acquisition 1 is executed using the UUID included in the paper ID, the relevant service information is retrieved, the service acquisition 3 is executed when the service information is not obtained, the SRMS 200 having a trust relationship is retrieved, and the SRMS 200 having the trust relationship is caused to execute the service acquisition 1, and the service acquisition 1 and the service acquisition 3 are repeated until the service information is obtained. This processing is referred to as service retrieval.

The scan application 101_5 receives the service information from the SRMS 200_2. The scan application 101_5 judges, referring to "name space" of the service information, what service the service information indicates (Step S460). For example, when "jp.co.ricoh.pids" is set in "name space", the scan application 101_5 judges that the service information indicates a PIDS.

When "jp.co.ricoh.eids" is set in "name space", the scan application 101_5 judges that the service information indicates an EIDS. Because the service information of the PIDS 201_1 is returned to the scan application 101_5, the name space is "jp.co.ricoh.pids". Therefore, the scan application 101_5 judges that a service indicated by the service information is the PIDS 201. Then, the scan application 101_5 accesses the PIDS 201_1 referring to "URI" of the service information, passes the paper ID 1-2 acquired at Step S444 to the PIDS 201_1, and requests the PIDS 201_1 to acquire paper information (Step S461). Again, the multifunction peripheral MFP5 having the scan application 101_5 is the client as the request source of the processing explained referring to FIG. 11. The client and the SRMS 200_1 perform SOAP communication using the Web service. The PIDS 201_1 acquires paper information corresponding to the paper ID 1-2 referring to the paper-information table 301A_1 stored in the paper-information DB 301_1 and returns the paper information to the scan application 101_5 (Step S462). After acquiring the paper information, the scan application 101_5 acquires an ID set in "link to an original document" of the paper information. In "link to an original document", a paper ID may be set or an electronic ID may be set. Therefore, at this point, it is impossible to judge which of the IDs is set. However, the paper ID and the electronic ID are the same in that both the IDs are combinations of a UUID of a service and a local ID. Therefore, first, the scan application 101_5 extracts the UUID of the service from the ID set in "link to an original document" (Step S463).

The scan application 101_5 requests, using the extracted UUID, the SRMS 200_2, service information of which is finally found in the service retrieval, to execute the service acquisition 1 (Step S464). The service retrieval is performed from the SRMS 200_2 because it is highly likely that service information corresponding to the present retrieval object UUID exists in the SRMS 200_2, which has found the service information of the PIDS 201_2 at Step S459. However, instead of starting the retrieval from the SRMS 200_2, the retrieval may be started from the SRMS 200_5 in the same manner as explained above. Service information of the EIDS 202_1 is stored in the service-information table 300A_2 managed by the SRMS 200_2 because the SRMS 200_2 and the SRMS 200_1 are in a trust relationship. Therefore, as a result of the retrieval, the SRMS 200_2 returns the service information of the EIDS 202_1 to the scan application 101_5 (Step S465).

The scan application 101_5 acquires the service information of the EIDS 202_1. The scan application 101_5 judges, referring to "name space" of the service information, which service the service information indicates (Step S466). The scan application 101_5 judges that a service indicated by the service information is an EIDS because "jp.co.ricoh.eids" is set in the name apace. Then, the scan application 101_5 accesses the EIDS 202_1 referring to "URI" of the service information, passes the ID (the electronic ID) acquired at Step S463 to the EIDS 202_1, and requests the EIDS 202_1 to execute acquisition of electronic information (Step S467). The multifunction peripheral MFP5 having the scan application 101_5 is a client as a request source of the processing explained in FIG. 11. The client and the EIDS 202_1 perform SOAP communication using the Web service. The EIDS 202_1 acquires electronic information corresponding to the electronic ID referring to the electronic-information table 302A_1 stored in the electronic-information DB 302_1. The EIDS 202_1 acquires an electronic document (a TIFF file) stored in the electronic-document DB 303_1 using the document acquisition function of the repository 205_1 and returns the TIFF file to the scan application 101_5 together with the electronic information (Step S468). The scan application 101_5 acquires the electronic information and the TIFF file. The scan application 101_5 passes a print command including the TIFF file, the paper ID 1-2 obtained from the scan image at Step S444, and the print condition set by the user on the operation panel 20 to the print application 100_5 (Step S469). Then, the print application 100_5 can execute the processing at Steps S420 to S431 and obtain a print result of three pieces of paper. It is assumed that code images representing the paper ID 5-1, the paper ID 5-2, and the paper ID 5-3 are printed on the pieces of paper of the print result, respectively, in order of pages.

As explained above, in the service retrieval, the service acquisition 1 is executed using a UUID included in a paper ID, a relevant service information is retrieved, the service acquisition 3 is executed when the service information is not obtained, the SRMS 200 having a trust relationship is retrieved, and the SRMS 200 having the trust relationship is caused to execute the service acquisition 1, and the service acquisition 1 and the service acquisition 3 are repeated until the service information is obtained. Moreover, paper information is acquired using the obtained service information, an electronic ID or a paper ID is obtained from "link to an original document" of the paper information, when a paper ID is obtained, paper information corresponding to the paper ID is acquired, and the acquisition of paper information is repeated until an electronic ID is obtained. When an electronic ID is obtained, electronic information and an electronic document (a TIFF file) corresponding to the electronic ID are obtained. As a result, it is possible to perform printing using the electronic document.

Figure 45:
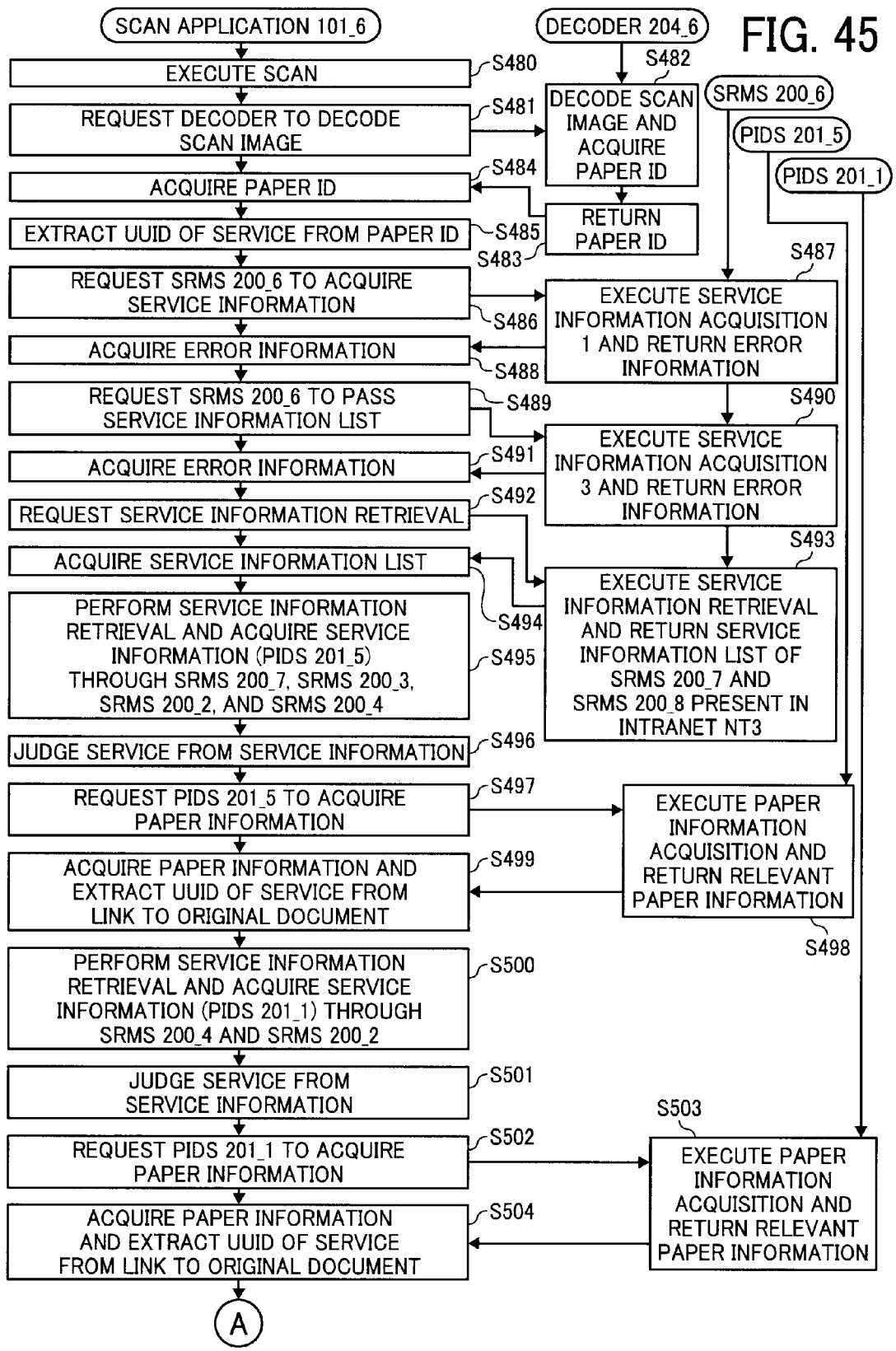
FIG. 45 is a flowchart of a procedure of operations of a scan application 101_6 in reprinting the paper, which is reprinted by the multifunction peripheral MFP5, again using a multifunction peripheral MFP6.
Figure 46:
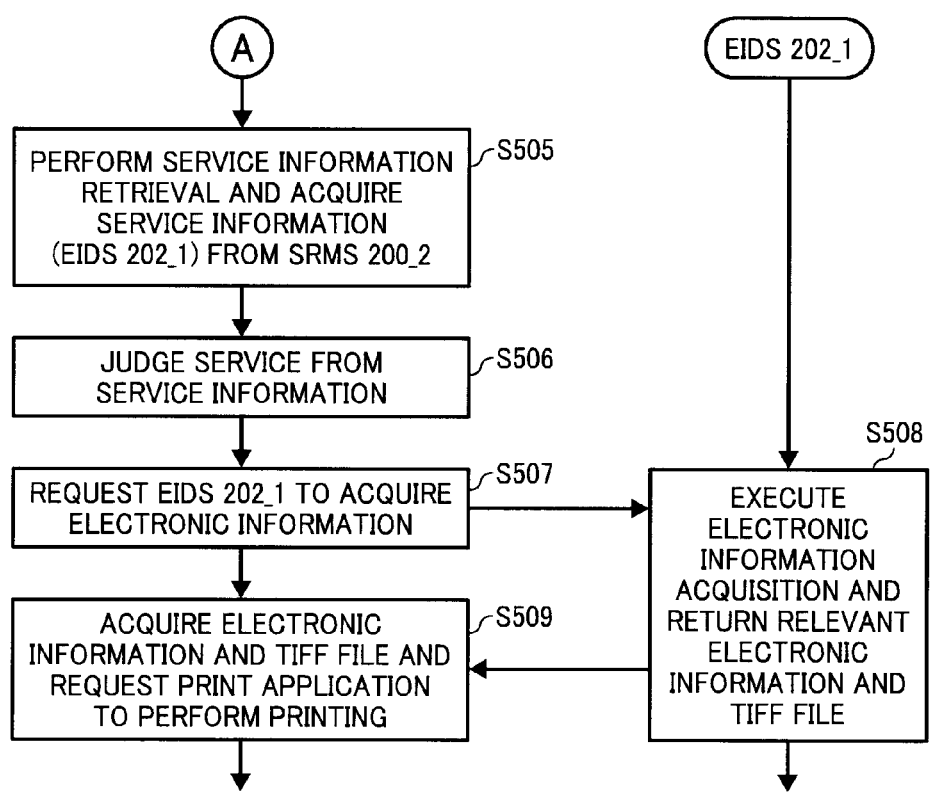
FIG. 46 is a flowchart of a procedure of operations of the scan application 101_6 in reprinting the paper, which is reprinted by the multifunction peripheral MFP5, again using the multifunction peripheral MFP6.

FIGS. 45 to 46 are flowcharts of a procedure of operations of the scan application 101_6 in scanning and reprinting a first page (corresponding to the paper ID 5-1) of the pieces of paper, which is reprinted by the multifunction peripheral MFP5 as explained above, again using the multifunction peripheral MFP6. After starting the scan application 101_6, the user sets the first page (corresponding to the paper ID 5-1) of the three pieces of paper, which is the print result obtained as a result of Step S469, in a scan unit of the multifunction peripheral MFP6, sets a print condition on the operation panel 20, and depresses the scan button to start processing. The scan application 101_6 acquires the print condition and executes scan of the paper set in the scan unit (Step S480). The scan application 101_6 passes a scan image obtained as a result of the scan to a decoder 204_6 of the multifunction peripheral MFP6 (Step S481). Processing at Steps S482 to S484 is the same as the processing at Steps S442 to S444 explained above. Therefore, explanation of the processing is omitted. Explanation of parts of the procedure same as those of the procedure of the operations explained above is also omitted.

At Step S485, the scan application 101_6 extracts a UUID of the PIDS 201 from the paper ID 5-1 passed from the decoder 204_6. The scan application 101_6 cannot judge whether the PIDS 201 is the PIDS 201_5 only from the UUID. Therefore, in the same manner as Step S446 explained above, the scan application 101_6 passes the UUID to an SRMS 200_6 of the multifunction peripheral MFP6 as a parameter and requests the SRMS 200_6 to execute the service acquisition 1 (Step S486). The SRMS 200_6 retrieves service information of the designated UUID using the function of the service acquisition 1. The SRMS 200_6 does not manage service information of the PIDS 201_5. Therefore, the SRMS 200_6 returns error information indicating that "designated service information is not present" to the scan application 101_6 (Step S487). The scan application 101_6 receives the error information (Step S488). The scan application 101_6 requests the SRMS 200_6 to pass a list of service information (execute the service acquisition 3) (Step S489). The SRMS 200_6 refers to a trust-relationship-information table 300B_6 stored in a service DB 300_6 using the function of the service acquisition 3. The multifunction peripheral MFP6 forms a trust relationship with none of the multifunction peripherals MFP1 to MFP5. Therefore, service information of the other SRMSs 200 is not stored in a service-information table 300A_6 of the multifunction peripheral MFP6. Therefore, the SRMS 200_6 returns error information indicating that "designated service information is not present" to the scan application 101_6 (Step S490).

The scan application 101_6 receives the error information (Step S491). The scan application 101_6 requests the SRMS 200_6 to perform service retrieval (Step S492). Then, the SRMS 200_6 applies the service retrieval to the SRMS 200_7 and the SRMS 200_8 of the multifunction peripherals MFP7 and MFP8 connected to the intranet NT3 to which the multifunction peripheral MFP6 is connected. The SRMS 200_6 obtains a list of service information of the SRMS 200_7 and the SRMS 200_8 and returns the list to the scan application 101_6 (Step S493). The scan application 101_6 receives the list of service information (Step S494). The scan application 101_6 applies the service retrieval to all the SRMSs 200, service information of which exists in the list, in order (Step S495). First, the scan application 101_6 performs the service retrieval starting from the SRMS 200_7. The scan application 101_6 obtains service information of the SRMS 200_3 from the SRMS 200_7, obtains service information of the SRMS 200_2 from the SRMS 200_3, and obtains service information of the SRMS 200_4 from the SRMS 200_2. Service information of the PIDS 201_5 is stored in the service-information table 300A_4 managed by the SRMS 200_4 because the SRMS 200_4 and the SRMS 200_5 are in a trust relationship. Therefore, the SRMS 200_4 reads out the service information of the PIDS 201_5 from the service-information table 300A_4 and returns the service information to the scan application 101_6. As a result, the scan application 101_6 acquires the service information of the PIDS 201_5. As a result of performing the service retrieval starting from the SRMS 200_7 in the list of service information obtained at Step S494, retrieval object service information (the service information of the PIDS 201_5) is obtained. Therefore, the scan application 101_6 does not perform the service retrieval starting from the SRMS 200_8, service information of which exists in the list. If the service information of the PIDS 201_5 is not obtained as a result of performing the service retrieval starting from the SRMS 200_7, the scan application 101_6 performs the service retrieval starting from the SRMS 200_8.

The scan application 101_6 judges, referring to "name space" of the obtained service information, a service indicated by the service information (Step S496). The name space is "jp.co.ricoh.pids" because the service information of the PIDS 201_5 is returned. Therefore, the scan application 101_6 judges that the service indicated by the service information is a PIDS. Then, the scan application 101_6 accesses the PIDS 201_5 referring to "URI" of the service information, passes the ID (the paper ID 5-1) acquired at Step S484 to the PIDS 201_5, and requests the PIDS 201_5 to execute paper acquisition (Step S497). The PIDS 201_5 acquires paper information corresponding to the paper ID 5-1 referring to a paper-information table 301A_5 stored in a paper-information DB 301_5 and returns the paper information to the scan application 101_6 (Step S498). The scan application 101_6 acquires the paper information. The scan application 101_6 acquires an ID (the paper ID 1-2) set in "link to an original document" of the paper information and extracts a UUID of the service from the ID in the same manner as Step S463 (Step S499).

The scan application 101_6 performs, using the extracted UUID, service retrieval starting from the SRMS 200_4, service information of which is finally found in the service retrieval explained above (Step S500). Alternatively, the scan application 101_6 may perform the service retrieval starting from the SRMS 200_6. When the scan application 101_6 performs the service retrieval starting from the SRMS 200_4, the scan application 101_6 obtains service information of the SRMS 200_2 from the SRMS 200_4. Service information of the PIDS 201_1 is stored in the service-information table 300A_2 managed by the SRMS 200_2 because the SRMS 200_2 and the SRMS 200_1 are in a trust relationship. Therefore, the SRMS 200_2 reads out the service information of the PIDS 201_1 from the service-information table 300A_2 and returns the service information to the scan application 101_6. As a result, the scan application 101_6 acquires the service information of the PIDS 201_1. Subsequently, the scan application 101_6 judges, referring to "name space" of the obtained service information, a service of the service information (Step S501). The name space is "jp.co.ricoh.pids" because the service information of the PIDS 201_1 is returned. Therefore, the scan application 101_6 judges that the service indicated by the service information is a PIDS.

Then, the scan application 101_6 accesses the PIDS 201_1 referring to "URI" of the service information, passes the ID (the paper ID 1-2) acquired at Step S499 to the PIDS 201_1, and requests the PIDS 201_1 to execute paper acquisition (Step S502). The PIDS 201_1 acquires paper information corresponding to the paper ID 1-2 referring to the paper-information table 301A_1 stored in the paper-information DB 301_1 and returns the paper information to the scan application 101_6 (Step S503). The scan application 101_6 acquires the paper information. The scan application 101_6 acquires an ID (an electronic ID) set in "link to an original document" of the paper information and extracts a UUID of a service (the EIDS 202_1) from the ID in the same manner as Step S463 (Step S504). The scan application 101_6 performs, using the extracted UUID, service retrieval starting from the SRMS 200_2, service information of which is finally found in the service retrieval explained above (Step S505). Service information of the EIDS 202_1 is stored in the service-information table 300A_2 managed by the SRMS 200_2 because the SRMS 200_2 and the SRMS 200_1 are in a trust relationship. Therefore, the SRMS 200_2 reads out the service information of the EIDS 202_1 from the service-information table 300A_2 and returns the service information to the scan application 101_6. As a result, the scan application 101_6 acquires the service information of the EIDS 202_1. The scan application 101_6 judges, referring to "name space" of the obtained service information, which service the service information indicates (Step S506). The scan application 101_6 judges that the service indicated by the service information is an EIDS because "jp.co.ricoh.eids" is set in the name space.

Then, the scan application 101_6 accesses the EIDS 202_1 referring to "URI" of the service information, passes the ID (the electronic ID) acquired at Step S504 to the EIDS 202_1, and requests the EIDS 202_1 to execute acquisition of electronic information (Step S507). The EIDS 202_1 acquires electronic information corresponding to the electronic ID referring to the electronic-information table 302A_1 stored in the electronic-information DB 302_1. The EIDS 202_1 acquires the electronic document (the TIFF file) stored in the electronic-document DB 303_1 using the document acquisition function of the repository 205_1 and returns the TIFF file to the scan application 101_6 together with the electronic information (Step S508). The scan application 101_6 acquires the electronic information and the TIFF file. The scan application 101_6 passes a print command including the TIFF file, the paper ID 5-1 obtained from the scan image at Step S484, and the print condition designated by the user on the operation panel 20 to the print application 100_6 (Step S509). Then, the print application 100_6 can execute the processing at Steps S420 to S431 and obtain a print result of three pieces of paper. For example, the print application 100_6 can obtain a print result of three pieces of paper on which code images representing new paper IDs 6-1, 6-2, and 6-3 are printed, respectively.

Thereafter, even if paper repeatedly printed in the office J3 is printed again in any one of the offices J1 to J3, an electronic document as a print source can be obtained because the functions of service acquisition, service retrieval, service retrieval, paper acquisition, and electronic-information acquisition are realized as explained above. Therefore, even if the printed paper is copied many times, the printed paper can be printed using the electronic document as the print source. Therefore, it is possible to improve convenience for the user. The service integration application 103 includes, as explained above, the function of the integration-information collection 103A and the function of the integration-information merge 103B. When the multifunction peripheral MFP5 leaves the image processing system, respective kinds of information managed by the SRMS 200_5, the PIDS 201_5, and the EIDS 202_5 included in the multifunction peripheral MFP5 are integrated in the multifunction peripheral MFP4.

First, the user operates the multifunction peripheral MFP5 and instructs the multifunction peripheral MFP5 to collect information stored in a data management layer M3_5 of the multifunction peripheral MFP5. Subsequently, the user operates the multifunction peripheral MFP4 and instructs the multifunction peripheral MFP4 to integrate the information collected by the multifunction peripheral MFP5 in a data management layer M3_4 of the multifunction peripheral MFP5. Thereafter, the user performs various kinds of operation for causing the multifunction peripheral MFP5 to leave the image processing system.

When the service integration application 103_5 is started, the multifunction peripheral MFP5 causes the operation panel 20_5 to display an operation button corresponding to the integration-information collection 103A_5 and an operation button corresponding to the integration-information merge 103B_5. The user depresses the operation button corresponding to the integration-information collection 103A_5. The multifunction peripheral MFP5 causes the operation panel 20_5 to display a folder designation space for designating a folder in which information collected from the data management layer M3_5 is stored, an "execute" button, and a "cancel" button. When the user inputs a pass of a folder in the folder designation space and presses the "execute" button, a function of the integration-information collection 103A_5 is realized. When the user presses the "cancel" button, the multifunction peripheral MFP5 causes the operation panel 20_5 to display the operation button corresponding to the integration-information collection 103A_5 and the operation button corresponding to the integration-information merge 103B_5 again. The folder in which information collected from the data management layer M3_5 is stored may be a folder in the HD 18_5 included in the multifunction peripheral MFP5 or may be a folder in a storing unit such as a hard disk included in an external apparatus (e.g., personal computer PC2) connected to the multifunction peripheral MFP5 through a network. When a portable storage medium such as a memory card is detachably insertable in the multifunction peripheral MFP5, the folder may be a folder in the portable storage medium.

Figure 47:
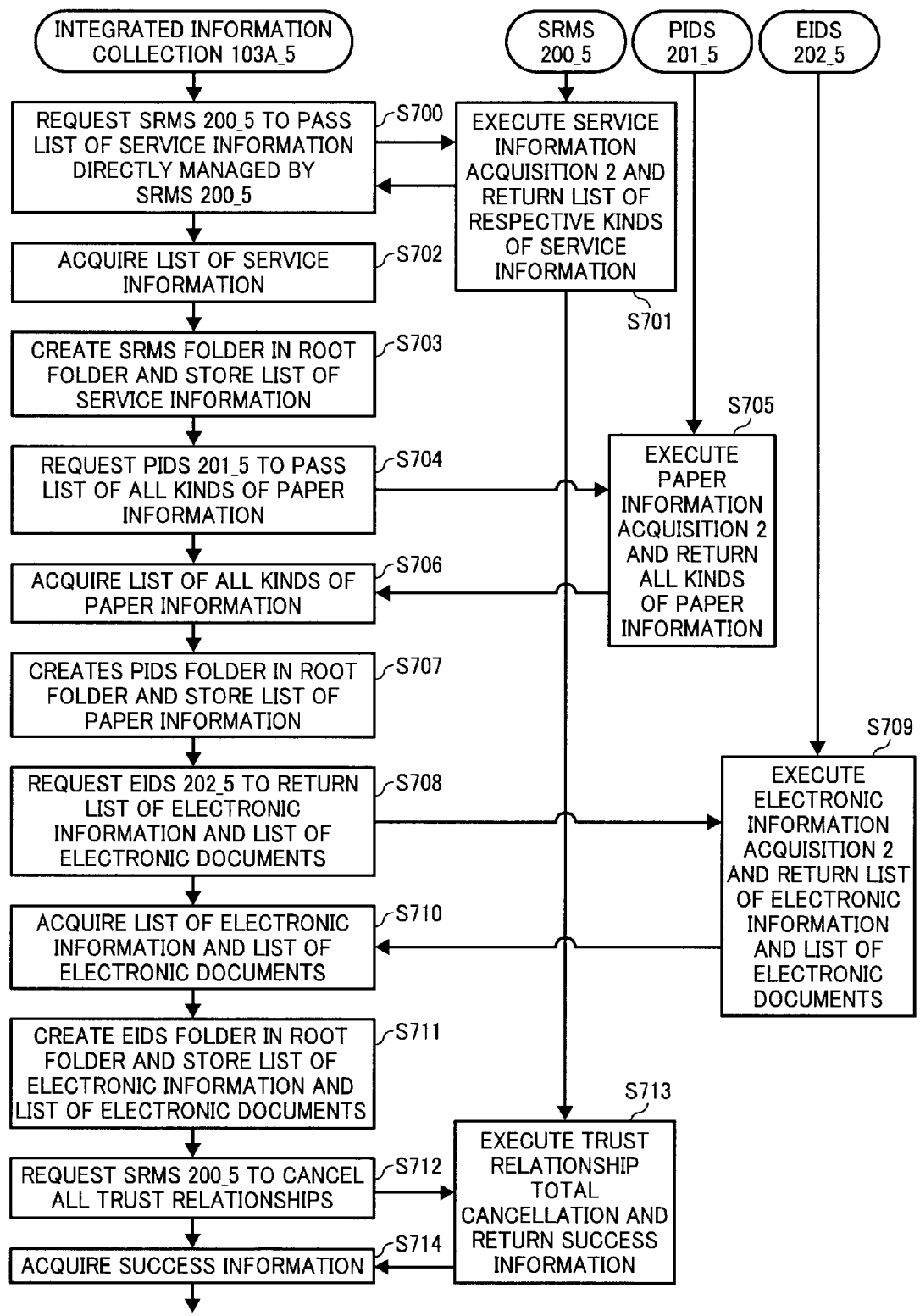
FIG. 47 is a flowchart of a procedure of integration-information collection processing realized by a function of integration-information collection 103A according to the embodiment.

FIG. 47 is a flowchart of a procedure of integration-information collection processing realized by the function of the integration-information collection 103A_5. The integration-information collection 103A_5 requests the SRMS 200_5 to pass a list of service information directly managed by the SRMS 200_5, i.e., requests the SRMS 200_5 to execute the service information acquisition 2 (Step S700). The SRMS 200_5 executes the service information acquisition 2 according to the request and returns a list of respective kinds of service information concerning the SRMS 200_5, the PIDS 201_5, and the EIDS 202_5 directly managed by the SRMS 200_5 to the integration-information collection 103A_5 (Step S701). As a result, the integration-information collection 103A_5 acquires the list of the respective kinds of service information concerning the SRMS 200_5, the PIDS 201_5, and the EIDS 202_5 directly managed by the SRMS 200_5 (Step S702). The integration-information collection 103A_5 creates, for example, a folder with a folder name "SRMS" in the folder inputted in the folder designation space by the user (hereinafter, "root folder") and stores the acquired list of the service information in the folder (Step S703).

Subsequently, the integration-information collection 103A_5 requests the PIDS 201_5 to pass all kinds of paper information stored in the paper information table 301A_5, i.e., requests the PIDS 201_5 to execute the paper information acquisition 2 (Step S704). The PIDS 201_5 executes the paper information acquisition 2 according to the request and returns all kinds of paper information stored in the paper information table 301A_5 to the integration-information collection 103A_5 (Step S705). As a result, the integration-information collection 103A_5 acquires a list of all the kinds of paper information stored in the paper information table 301A_5 (Step S706). The integration-information collection 103A_5 creates, for example, a folder with a folder name "PIDS" in the root folder and stores the list of the paper information in the folder (Step S707). The integration-information collection 103A_5 requests the EIDS 202_5 to pass a list of all kinds of electronic information stored in the electronic-information table 302A_5 and a list of electronic documents stored in the electronic-document DB 303 in association with the document ID set in "link to a repository", i.e., requests the EIDS 202_5 to execute the electronic-information acquisition 2 (Step S708). The EIDS 202_5 executes the electronic-information acquisition 2 as explained above according to the request and returns the list of the electronic information and the list of the electronic documents to the integration-information collection 103A_5 (Step S709). As a result, the integration-information collection 103A_5 acquires the list of the electronic information stored in the electronic-information table 302A_5 and the list of electronic documents stored in the electronic-document DB 303 in association with the document ID set in "link to a repository" of the electronic information (Step S710). The integration-information collection 103A_5 creates, for example, a folder with a folder name "EIDS" in the root folder and stores the acquired list of the electronic information and list of the electronic documents in the folder (Step S711).

The integration-information collection 103A_5 requests the SRMS 200_5 to execute trust relationship total cancellation (Step S712). When the SRMS 200_5 executes the trust relationship total cancellation, all trust relationships with the multifunction peripheral MFP5 are cancelled. When the trust relationship total cancellation processing is finished, the SRMS 200_5 returns success information indicating to that effect to the integration-information collection 103A_5 (Step S713). Specifically, in the trust relationship tables 300B in all the other multifunction peripherals MFP that form trust relationships with the multifunction peripheral MFP5, all UUIDs of the SRMS 200_5 included in the multifunction peripheral MFP5 are deleted. When the integration-information collection 103A_5 acquires success information (Step S714), the integration-information collection processing is finished. The multifunction peripheral MFP5 causes the operation panel 20_5 to display a message such as "processing is completed".

When the service integration application 103_4 is started, the multifunction peripheral MFP4 causes the operation panel 20_4 to display an operation button corresponding to the integration-information collection 103A_4 and an operation button corresponding to the integration-information merge 103B_4. The user depresses the operation button corresponding to the integration-information merge 103B_4. The multifunction peripheral MFP4 causes the operation panel 20_4 to display a folder designation space for designating a folder in which information collected from the data management layer M3_5 is stored, an "execute" button, and a "cancel" button. When the user inputs a pass of the root folder in the folder designation space and presses the "execute" button, a function of the integration-information merge 103B_4 is realized. When the user presses the "cancel" button, the multifunction peripheral MFP4 causes the operation panel 20_4 to display the operation button corresponding to the integration-information collection 103A_4 and the operation button corresponding to the integration-information merge 103B_4 again.

Figure 48:
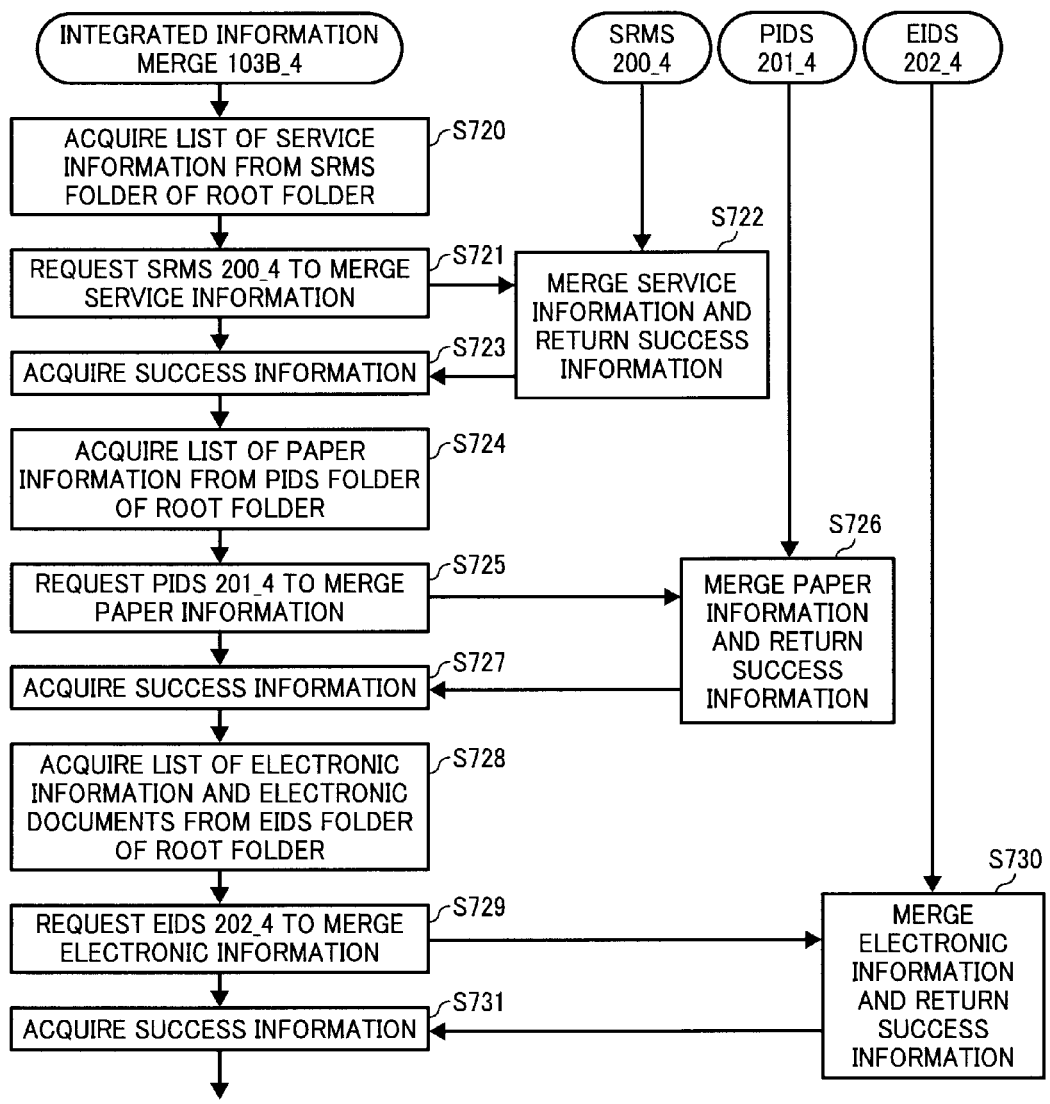
FIG. 48 is a flowchart of a procedure of integration-information merge realized by a function of integration-information merge 103B according to the embodiment.

FIG. 48 is a flowchart of a procedure of integration-information merge realized by the function of the integration-information merge 103B. The integration-information merge 103B_4 accesses the root folder inputted in the folder designation space by the user. In the root folder, as explained above, three folders with the folder names "SRMS", "PIDS", and "EIDS", are present. First, the integration-information merge 103B_4 accesses the folder with the folder name "SRMS" and acquires a list of service information stored in the folder (Step S720). The integration-information merge 103B_4 passes the list of the service information to the SRMS 200_4 and requests the SRMS 200_4 to execute service merge (Step S721). The SRMS 200_4 executes the service merge as described above. All the respective kinds of service information concerning the SRMS 200_5, the PIDS 201_5, and the EIDS 202_5 directly managed by the multifunction peripheral MFP5 are registered in the service-information table 300A_4. When the processing is finished, the SRMS 200_4 returns success information indicating to that effect to the integration-information merge 103B_4 (Step S722).

The integration-information merge 103B_4 acquires success information (Step S723). The integration-information merge 103B_4 access a folder with a folder name "PIDS" and acquires a list of paper information stored in the folder (Step S724). The integration-information merge 103B_4 passes the list of the paper information to the PIDS 201_4 and requests the PIDS 201_4 to execute paper information merge (Step S725). When the PIDS 201_4 executes the paper information merge, all the pieces of paper information stored in the paper information table 301A_5 held by the multifunction peripheral MFP5 are registered in the paper information table 301A_4. When the processing is finished, the PIDS 201_4 returns success information indicating to that effect to the integration-information merge 103B_4 (Step S726).

The integration-information merge 103B_4 acquires the success information (Step S727). The integration-information merge 103B_4 accesses a folder with a folder name "EIDS" and acquires a list of electronic information and a list of electronic documents stored in the folder (Step S728). The integration-information merge 103B_4 passes the list of the electronic information and the list of the electronic documents to the EIDS 202_4 and requests the EIDS 202_4 to execute electronic-information merge (Step S729). When the EIDS 202_4 executes the electronic-information merge as explained above, electronic information stored in the electronic-information table 302A_5 held by the multifunction peripheral MFP5 and electronic documents stored in the electronic-document DB 303_5 in association with a document ID set in "link to a repository" of the electronic information are registered in the electronic-information table 302A_4 and the electronic-document DB 303_4, respectively. When the processing is finished, the EIDS 202_4 returns success information indicating to that effect to the integration-information merge 103B_4 (Step S730). When the integration-information merge 103B_4 acquires the success information (Step S731), the integration-information merge processing is finished. The multifunction peripheral MFP4 causes the operation panel 20_4 to display a message such as "processing is completed".

Consequently, for example, even if the multifunction peripheral MFP5 leaves the image processing system and cannot be accessed, the multifunction peripheral MFP4 takes over and manages the kinds of information managed by the SRMS 200_5, the PIDS 201_5, and the EIDS 202_5 of the multifunction peripheral MFP5, respectively. Therefore, when paper is copied, it is possible to prevent a situation in which the scan application 101 cannot find out respective kinds of service information or cannot find out paper information and electronic information based on paper information acquired from a code image printed on the paper.

The present invention is not limited to the embodiment explained above. Various modifications explained below as examples are possible.

The various programs executed by the multifunction peripheral MFP explained above may be stored in the HDD 18 instead of the ROM 12a. The various programs may be stored on a computer connected to a network such as the Internet and provided by being downloaded through the network. The various programs may be provided by being recorded in computer-readable recording media such as a compact disk-read only memory (CD-ROM), a flexible disk (FD), a compact disk-recordable (CD-R), and a digital versatile disk (DVD) as files of an installable format or an executable format.

Functions of the print application 100, the scan application 101, the service integration application 103, the encoder 203, the decoder 204, and the repository 205 explained as the functions of the multifunction peripheral MFP in the embodiment are not limited to those explained above. At least two of these functions may be combined, a part of at least one of the functions may be incorporated in the other functions, or the function may be subdivided.

According to the embodiment, a different local ID is issued for each page and a code image of a paper ID including the different local ID is created for each page. However, the same local ID may be issued to all pages included in one electronic document to issue a paper ID including the local ID. A paper ID may be issued for each predetermined number of pages. A code image may be printed on at least one piece of paper among a plurality of pieces of paper. A code image may be printed only on a first page or a specific page. An identical code image may be printed on respective pages.

The service DB 300, the paper-information DB 301, the electronic-information DB 302, and the electronic document 303 included in the multifunction peripheral MFP in the embodiment may be stored in a storage device such as a hard disk or may be stored in recording media such as a CD-ROM, an FD, a CD-R, and a DVD detachably insertable in the multifunction peripheral MFP.

In the embodiment explained above, in "generation" of service information, a large value is set for a newer generation. However, a value set in "generation" is not limited to this. Any value may be set as long as it is possible to discriminate a latest generation with the value.

In the embodiment, the trust relationship total cancellation processing, the integration-information merge processing, and the integration-information collection processing are performed according to an operation input of the user on the operation panel 20. However, it is also possible that, for example, a detecting unit that detects that the multifunction peripheral MFP leaves the image processing system is provided and the trust relationship total cancellation processing, the integration-information merge processing, and the integration-information collection processing are performed according to the detection by the detecting unit.

In the embodiment, the multifunction peripheral MFP has both the function of the integration-information collection 103A and the function of the integration-information merge 103B in the service integration application 103. However, the multifunction peripheral MFP may have one of the functions.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
 a reading unit that acquires an image read from a first medium;
 a code acquiring unit that extracts a predetermined code image from the image acquired by the reading unit, and acquires medium identification information for identifying the first medium from the code image;
 an electronic-information control unit that manages electronic information that specifies a print object electronic document stored in an electronic-document storing unit and is stored in an electronic-information storing unit in association with electronic identification information for identifying the electronic information;

an information control unit that manages medium information for specifying a medium and is stored in an information storing unit in association with medium identification information for identifying the medium information;

a service-information storing unit that stores first service information including first control identification information for identifying the electronic-information control unit and second service information including second control identification information for identifying the information control unit;

a service-information control unit that manages the first service information and the second service information stored in the service-information storing unit; and a printing unit that prints an image based on the image acquired by the reading unit on a second medium, wherein the reading unit acquires the second service information from the service-information control unit using the medium identification information acquired by the code acquiring unit, acquires the medium information from the information control unit using the second service information, acquires, using the medium information, the first service information specifying the electronic-information control unit that manages electronic information specifying the electronic document as a print source of the first medium, acquiring the electronic document from the electronic-information control unit using the first service information, and requests the printing unit to perform printing using the electronic document, and the image processing apparatus further comprises an information integrating unit that acquires at least one of the electronic information, the medium information, and the first service information and the second service information managed by another electronic-information control unit, another information control unit, and another service-information control unit included in another image processing apparatus and integrates the acquired information in the image processing apparatus, wherein the service-information storing unit further stores third service information including third control identification information for identifying the service-information control unit, the service-information control unit manages the third service information stored in the service-information storing unit, and the information integrating unit acquires the third service information including the third control identification information for identifying the other service-information control unit included in the other image processing apparatus and registers the third service information in the service-information storing unit.

2. The image processing apparatus according to claim 1, wherein the information integrating unit acquires the first service information and the second service information managed by the other service-information control unit, which is included in the other image processing apparatus, and stored in another service-information storing unit and registers the respective kinds of service information in the service-information storing unit.

3. The image processing apparatus according to claim 1, wherein the information integrating unit acquires the medium information managed by the other information control unit, which is included in the other image processing apparatus, and stored in another information storing unit and registers the medium information in the information storing unit.

4. The image processing apparatus according to claim 1, wherein the information integrating unit acquires the electronic information managed by the other electronic-information control unit, which is included in the other image processing apparatus, and stored in another electronic-information storing unit and an electronic document specified by the electronic information and stored in another electronic-document storing unit, registers the electronic information in the electronic-information storing unit, and registers the electronic document in the electronic-document storing unit.

5. The image processing apparatus according to claim 1, wherein the first service information, the second service information, and the third service information include management identification information for identifying the service-information control unit that directly manages the service information, the first service information includes first belonging identification information for identifying the electronic-information control unit that presently manages the electronic information managed by the electronic-information control unit specified by the first control identification information included in the first service information and generation information that indicates whether the first belonging identification information can be used as latest service information in the identical first service information, the second service information includes second belonging identification information for identifying the information control unit that presently manages the medium information managed by the information control unit identified by the second control identification information included in the second service information and generation information that indicates whether the second belonging identification information can be used as latest service information in the identical second service information, the third service information includes third belonging identification information for identifying the service-information control unit that presently manages the service information managed by the service-information control unit identified by the third control identification information included in the third service information and generation information that indicates whether the third belonging identification information can be used as latest service information in the identical second service information, and the information integrating unit sets, when at least one kind of processing object service information among the first service information, the second service information, and the third service information having the management identification information for identifying the other service-information control unit is registered in the service-information storing unit, the generation information included in the processing object service information to indicate that the processing object service information cannot be used as the latest service information and registers the processing object service information in the service-information storing unit.

6. The image processing apparatus according to claim 5, wherein the information integrating unit replaces, when at least one kind of processing object service information among the first service information, the second service information, and the third service information having the management identification information for identifying the other service-information control unit is registered in the service-information storing unit, the management identification information included in the processing object service information with the management identification information for identifying the service-information control unit and registers the processing object service information in the service-information storing unit.

7. The image processing apparatus according to claim 5, wherein the information integrating unit sets, when the first service information having the management identification information for identifying the other service-information control unit is registered in the service-information storing unit, the first control identification information for identifying the electronic-information control unit, which is included in the image processing apparatus, in the first belonging identification information included in the first service information and registers the first service information in the service-information storing unit.

8. The image processing apparatus according to claim 5, wherein the information integrating unit sets, when the second service information having the management identification information for identifying the other service-information control unit is registered in the service-information storing unit, the second control identification information for identifying the information control unit, which is included in the image processing apparatus, in the second belonging identification information included in the second service information and registers the second service information in the service-information storing unit.

9. The image processing apparatus according to claim 5, wherein the information integrating unit sets, when the third service information having the management identification information for identifying the other service-information control unit is registered in the service-information storing unit, the third control identification information for identifying the service-information control unit, which is included in the image processing apparatus, in the third belonging identification information included in the third service information and registers the third service information in the service-information storing unit.

10. The image processing apparatus according to claim 5, wherein the service-information control unit can execute, when the management identification information included in the first service information, the second service information, and the third service information coincides with the third control identification information corresponding to the service-information control unit and when the generation information included in the first service information, the second service information, and the third service information indicates that the third service information can be used as the latest information, at least one of deletion, acquisition, and change of the service information in the service-information storing unit.

11. The image processing apparatus according to claim 5, wherein the information integrating unit acquires, when the third service information including the third control identification information for identifying the other service information control unit, which is included in the other image processing apparatus, is acquired, only the service information including the management identification information for identifying the other service control unit.

12. The image processing apparatus according to claim 1, wherein the information control unit can directly manage, when the management identification information included in the first service information, the second service information, and the third service information coincides with the third control identification information corresponding to the service-information control unit, the service information and can execute at least one of deletion, acquisition, and change of the service information in the service-information storing unit.

13. The image processing apparatus according to claim 1, further comprising a trust-relationship-storing unit that can store the third control identification information for identifying the other service-information control unit, wherein
the service-information control unit registers, when registration of the third service information for specifying the other service-information control unit is requested, the third control identification information included in the third service information in the trust-relationship storing unit and registers the third service information in the service-information storing unit.

14. The image processing apparatus according to claim 13, wherein the service-information control unit acquires, from the other image processing apparatus including the other service-information control unit identified by the third control identification information stored in the trust-relationship storing unit, the first service information concerning the other electronic-information control unit included in the other image processing apparatus and the second service information concerning the other information control unit and registers the first service information and the second service information in the service-information storing unit.

15. The image processing apparatus according to claim 13, wherein the service-information control unit deletes, when deletion of the other third control identification information for identifying the other service-information control unit registered in the trust-relationship storing unit is requested by the other service information control unit, the third control identification information from the trust-relationship storing unit and deletes service information among the first service information, the second service information, and the third service information registered in the service-information storing unit, which includes the management identification information that coincides with the third control identification information, from the service-information storing unit.

16. The image processing apparatus according to claim 1, further comprising an information collecting unit that causes a predetermined storing unit to store at least one of electronic information stored in the electronic information storing unit and an electronic document specified by the electronic information and stored in the electronic-document storing unit, the medium information stored in the information storing unit, and the first service information, the second service information, and the third service information stored in the service-information storing unit.

17. The image processing apparatus according to claim 16, wherein the information integrating unit acquires, from the predetermined storing unit, at least one of the electronic information, the medium information, and the first service information and the second service information managed by the other electronic-information control unit, the other information control unit, and the other service-information control unit included in the other image processing apparatus, respectively.

18. The image processing apparatus according to claim 1, further comprising a communication unit that performs communication with the other image processing apparatus, wherein
the reading unit acquires, using the medium identification information acquired by the code acquiring unit, the second service information from the other service-information control unit included in the other image processing apparatus through the communication unit, acquires, using the second service information, the medium information from the other information control unit included in the other image processing apparatus through the communication unit, acquires, using the medium information, the first service information for specifying the electronic-information control unit that manages electronic information for specifying the electronic document as a print source of the first medium, acquires, using the first service information, the electronic document from the electronic-information control unit included in the other image processing apparatus through the communication unit, and requests the printing unit to perform printing using the electronic document.

19. The image processing apparatus according to claim 1, wherein the reading unit acquires the image read from the first medium by scanning a first paper medium with a scanning unit.

20. An image processing method using an image processing apparatus that includes
- a reading unit that acquires an image read from a first medium,
- a code acquiring unit that extracts a predetermined code image from the image acquired by the reading unit, and acquires medium identification information for identifying the first medium from the code image,
- an electronic-information control unit that manages electronic information that specifies a print object electronic document stored in an electronic-document storing unit and is stored in an electronic-information storing unit in association with electronic identification information for identifying the electronic information,
- an information control unit that manages medium information for specifying a medium and is stored in an information storing unit in association with the medium identification information for identifying the medium information,
- a service-information storing unit that stores first service information including first control identification information for identifying the electronic-information control unit and second service information including second control identification information for identifying the information control unit,
- a service-information control unit that manages the first service information and the second service information stored in the service-information storing unit, and
- a printing unit that prints an image based on the image acquired by the reading unit on a second medium, the image processing method comprising:

print requesting including
- acquiring the second service information from the service-information control unit using the medium identification information acquired by the code acquiring unit,
- acquiring the medium information from the information control unit using the second service information,
- acquiring, using the medium information, the first service information specifying the electronic-information control unit that manages electronic information specifying the electronic document as a print source of the first medium,
- acquiring the electronic document from the electronic-information control unit using the first service information, and
- requesting the printing unit to perform printing using the electronic document;

information integrating including
- acquiring at least one of the electronic information, the medium information, and the first service information and the second service information managed by another electronic-information control unit, another information control unit, and another service-information control unit included in another image processing apparatus, and
- integrating the acquired information in the image processing apparatus; and further storing third service information including
- storing third service information including third control identification information for identifying the service-information control unit,
- managing the third service information stored in the service-information storing unit, and
- acquiring the third service information including the third control identification information for identifying the other service-information control unit included in the other image processing apparatus and registering the third service information in the service-information storing unit.

* * * * *